(12) United States Patent  (10) Patent No.: US 7,557,537 B2
Zick et al.  (45) Date of Patent: *Jul. 7, 2009

(54) ELECTRICAL COMPONENT HAVING A SELECTIVELY CONNECTABLE BATTERY CHARGER

(75) Inventors: Jonathan A. Zick, Waukesha, WI (US); George L. Santana, New Berlin, WI (US); David J. Rozwadowski, Greenfield, WI (US); Jeffrey M. Zeiler, Delafield, WI (US); Scott D. Bublitz, Hartland, WI (US); Melissa A. Ottens-Rendon, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/745,596

(22) Filed: May 8, 2007

(65) Prior Publication Data

US 2008/0012527 A1    Jan. 17, 2008

Related U.S. Application Data

(63) Continuation of application No. 10/926,883, filed on Aug. 26, 2004, and a continuation of application No. 10/926,744, filed on Aug. 26, 2004, said application No. 10/926,744 is a continuation-in-part of application No. 10/291,868, filed on Nov. 8, 2002, now Pat. No. 6,982,541, said application No. 10/926,883 is a continuation-in-part of application No. 10/291,868, filed on Nov. 8, 2002, now Pat. No. 6,982,541.

(60) Provisional application No. 60/540,313, filed on Jan. 28, 2004, provisional application No. 60/523,541, filed on Nov. 19, 2003, provisional application No. 60/379,068, filed on May 9, 2002, provisional application No. 60/344,431, filed on Nov. 9, 2001.

(51) Int. Cl.
*H01M 10/46* (2006.01)
(52) U.S. Cl. ...................................... 320/114
(58) Field of Classification Search ............... 320/107, 320/110, 111, 114, 115
See application file for complete search history.

(56) References Cited

U.S. PATENT DOCUMENTS

D91,497 S    2/1934 Raffetto (Continued)

FOREIGN PATENT DOCUMENTS

CN    93226185    5/1994

(Continued)

OTHER PUBLICATIONS

Bellman, Alfred H. et al., "Manpack: A New Solution to an Old Problem" *Signal* 31(7):6-10, Apr. 1977.

*Primary Examiner*—Edward Tso
(74) *Attorney, Agent, or Firm*—Michael Best & Friedrich LLP

(57) ABSTRACT

An electrical component, such as, for example, a radio, MP3 player, audio component, battery charger, radio/charger, MP3 player/radio, MP3 player/charger, or MP3 player/radio/charger. The electrical component includes a housing and an electrical circuit supported by the housing. In some aspects, the electrical component is an audio component and the electrical circuit is an audio circuit. In other aspects, the electrical component is a battery charger and the electrical circuit is a charging circuit. In further aspects, the electrical component is an MP3 player and the electrical circuit is a MP3 circuit. In yet further aspects, the electrical component is an combination of any or all of a radio, battery charger, and MP3 player and the electrical component can include any combination or all of the audio, radio, and MP3 circuits. A battery may be connectable to the housing and electrically connectable the electrical circuit.

15 Claims, 57 Drawing Sheets

U.S. PATENT DOCUMENTS

| | | |
|---|---|---|
| 2,058,407 A | 10/1936 | Brown |
| D134,136 S | 10/1942 | Sherman et al. |
| D134,818 S | 1/1943 | Fletcher |
| 2,439,408 A | 4/1948 | Mitchell |
| D163,645 S | 6/1951 | Shuler et al. |
| 2,565,273 A | 8/1951 | Shuler et al. |
| 2,582,330 A | 1/1952 | Hautala |
| 2,591,438 A | 4/1952 | Kinman et al. |
| 2,982,552 A | 5/1961 | Kent |
| 3,018,111 A | 1/1962 | Balmer et al. |
| 3,070,748 A | 12/1962 | Worobey et al. |
| 3,077,563 A | 2/1963 | Combs et al. |
| 3,079,510 A | 2/1963 | Hartwig |
| 3,089,072 A | 5/1963 | Jephcott |
| 3,267,510 A | 8/1966 | Cote |
| 3,458,794 A | 7/1969 | Bohnstedt et al. |
| 3,525,912 A | 8/1970 | Wallin |
| 3,533,119 A | 10/1970 | Dokos |
| 3,579,075 A | 5/1971 | Floyd |
| 3,629,793 A | 12/1971 | Ettischer et al. |
| 3,763,434 A | 10/1973 | Blesch et al. |
| 3,824,472 A | 7/1974 | Engel et al. |
| 3,852,652 A | 12/1974 | Jasinski |
| 3,883,789 A | 5/1975 | Achenbach et al. |
| 3,930,889 A | 1/1976 | Ruggiero et al. |
| 3,943,423 A | 3/1976 | Hoffman |
| 3,962,591 A | 6/1976 | Popka |
| 3,968,417 A | 7/1976 | Dials |
| 3,971,889 A | 7/1976 | Hays |
| D240,836 S | 8/1976 | Corvette |
| 3,984,645 A | 10/1976 | Kresch |
| 4,006,764 A | 2/1977 | Yamamoto et al. |
| 4,045,663 A | 8/1977 | Young |
| 4,050,493 A | 9/1977 | Cho |
| 4,072,800 A | 2/1978 | Gammer |
| 4,084,123 A | 4/1978 | Lineback et al. |
| 4,089,044 A | 5/1978 | Gatto et al. |
| 4,091,318 A | 5/1978 | Eichler et al. |
| 4,095,184 A | 6/1978 | Hochstein et al. |
| 4,101,818 A | 7/1978 | Kelly, III et al. |
| 4,147,163 A | 4/1979 | Newman et al. |
| 4,147,838 A | 4/1979 | Leffingwell |
| 4,194,157 A | 3/1980 | Uno |
| D254,738 S | 4/1980 | Hoshino et al. |
| 4,214,197 A | 7/1980 | Mann et al. |
| 4,225,970 A | 9/1980 | Jaramillo et al. |
| 4,279,342 A | 7/1981 | Van Pelt |
| 4,281,377 A | 7/1981 | Evans |
| 4,290,002 A | 9/1981 | Piotti |
| 4,300,087 A | 11/1981 | Meisner |
| 4,315,109 A | 2/1982 | Jacobson |
| 4,382,219 A | 5/1983 | Heine et al. |
| 4,390,926 A | 6/1983 | Hart |
| 4,395,619 A | 7/1983 | Harigai |
| D270,530 S | 9/1983 | Bowden, Jr. et al. |
| 4,424,006 A | 1/1984 | Armbruster |
| 4,447,749 A | 5/1984 | Reeb et al. |
| 4,458,111 A | 7/1984 | Sugihara |
| 4,483,664 A | 11/1984 | Armbruster |
| 4,489,268 A | 12/1984 | Beachy |
| 4,491,694 A | 1/1985 | Harmeyer |
| 4,504,774 A | 3/1985 | Hoffman |
| 4,535,475 A | 8/1985 | Ward |
| 4,554,411 A | 11/1985 | Armstrong |
| 4,571,740 A | 2/1986 | Kirby et al. |
| 4,574,285 A | 3/1986 | Bascou |
| 4,577,145 A | 3/1986 | Mullersman |
| 4,586,115 A | 4/1986 | Zimmerman et al. |
| 4,591,661 A | 5/1986 | Benedetto et al. |
| 4,605,993 A | 8/1986 | Zelina, Jr. |
| 4,628,242 A | 12/1986 | Scholefield |
| 4,645,996 A | 2/1987 | Toops |
| 4,673,861 A | 6/1987 | Dubovsky et al. |
| 4,684,870 A | 8/1987 | George et al. |
| 4,691,383 A | 9/1987 | DeMars |
| 4,694,486 A | 9/1987 | Yuter |
| 4,700,395 A | 10/1987 | Long |
| 4,709,201 A | 11/1987 | Schaefer et al. |
| 4,735,469 A | 4/1988 | Liggett |
| 4,737,702 A | 4/1988 | Koenck |
| 4,743,735 A | 5/1988 | Abura et al. |
| D296,243 S | 6/1988 | Ohashi |
| 4,751,452 A | 6/1988 | Kilmer et al. |
| 4,761,813 A | 8/1988 | Gammel |
| 4,766,361 A | 8/1988 | Pusateri |
| 4,816,735 A | 3/1989 | Cook et al. |
| 4,817,191 A | 3/1989 | Adams |
| 4,824,059 A | 4/1989 | Butler |
| 4,824,139 A | 4/1989 | Robbins |
| 4,835,409 A | 5/1989 | Bhagwat et al. |
| 4,857,702 A | 8/1989 | Cafaro |
| 4,870,702 A | 9/1989 | Azzouni |
| 4,875,878 A | 10/1989 | Meyer |
| 4,880,712 A | 11/1989 | Gordecki |
| 4,913,318 A | 4/1990 | Forrester |
| D307,829 S | 5/1990 | Hasuike |
| 4,927,021 A | 5/1990 | Taylor |
| 4,934,020 A | 6/1990 | Jackson |
| 4,939,912 A | 7/1990 | Leonovich, Jr. |
| 4,949,077 A | 8/1990 | Mbuthia |
| 4,949,386 A | 8/1990 | Hill |
| D310,529 S | 9/1990 | Yuen |
| 4,961,994 A | 10/1990 | Cariou et al. |
| 4,963,812 A | 10/1990 | Mischenko et al. |
| 4,993,061 A | 2/1991 | Hsieh |
| 4,998,055 A | 3/1991 | Nash et al. |
| 5,007,859 A | 4/1991 | Sangregory et al. |
| D320,210 S | 9/1991 | Mbuthia |
| 5,049,091 A | 9/1991 | Tanaka |
| D320,600 S | 10/1991 | Yuen |
| D321,513 S | 11/1991 | Totsuka et al. |
| 5,076,405 A | 12/1991 | Modica |
| 5,077,513 A | 12/1991 | Dea et al. |
| 5,090,562 A | 2/1992 | Grullemans |
| 5,091,732 A | 2/1992 | Mileski et al. |
| 5,111,127 A | 5/1992 | Johnson |
| RE33,970 E | 6/1992 | Butler |
| D327,468 S | 6/1992 | Dea et al. |
| 5,122,721 A | 6/1992 | Okada et al. |
| D328,297 S | 7/1992 | Ayers |
| 5,136,229 A | 8/1992 | Galvin |
| 5,138,245 A | 8/1992 | Mattinger et al. |
| 5,150,031 A | 9/1992 | James et al. |
| 5,151,727 A | 9/1992 | Sasaki |
| 5,155,428 A | 10/1992 | Kang |
| 5,164,652 A | 11/1992 | Johnson et al. |
| 5,164,830 A | 11/1992 | Kim |
| 5,170,851 A | 12/1992 | Kress et al. |
| 5,172,043 A | 12/1992 | Toops |
| D332,768 S | 1/1993 | Giard, Jr. |
| 5,179,747 A | 1/1993 | Zink |
| 5,187,422 A | 2/1993 | Izenbaard et al. |
| 5,191,277 A | 3/1993 | Ishikura et al. |
| 5,193,220 A | 3/1993 | Ichinohe et al. |
| 5,196,280 A | 3/1993 | Gyenes |
| 5,218,284 A | 6/1993 | Burns et al. |
| 5,220,269 A | 6/1993 | Chen et al. |
| 5,222,050 A | 6/1993 | Marren et al. |
| 5,235,822 A | 8/1993 | Leonovich, Jr. |
| 5,239,687 A | 8/1993 | Chen |
| 5,245,269 A | 9/1993 | Tooley et al. |
| 5,248,569 A | 9/1993 | Pine et al. |
| 5,254,927 A | 10/1993 | Chiang |
| 5,254,931 A | 10/1993 | Martensson |

| | | | | | |
|---|---|---|---|---|---|
| 5,256,953 | A | 10/1993 | Cimbal et al. | | |
| 5,262,710 | A | 11/1993 | Taylor | | |
| 5,298,821 | A | 3/1994 | Michel | | |
| 5,300,875 | A | 4/1994 | Tuttle | | |
| 5,317,249 | A | 5/1994 | Ford | | |
| 5,325,040 | A | 6/1994 | Bogut et al. | | |
| D348,461 | S | 7/1994 | Peersmann | | |
| D349,116 | S | 7/1994 | Peersmann | | |
| 5,339,956 | A | 8/1994 | Thomason | | |
| 5,343,136 | A | 8/1994 | Yamaguchi et al. | | |
| 5,344,339 | A | 9/1994 | Cheslock | | |
| 5,369,565 | A | 11/1994 | Chen et al. | | |
| 5,369,797 | A | 11/1994 | Tyree | | |
| 5,371,784 | A | 12/1994 | Yankura | | |
| 5,391,972 | A | 2/1995 | Gardner et al. | | |
| 5,394,073 | A | 2/1995 | Nagai | | |
| 5,396,162 | A | 3/1995 | Brilmyer | | |
| 5,404,419 | A | 4/1995 | Artis, Jr. | | |
| D358,579 | S | 5/1995 | Richards et al. | | |
| 5,413,499 | A | 5/1995 | Wright, Jr. et al. | | |
| 5,424,725 | A | 6/1995 | Wandt et al. | | |
| 5,434,018 | A | 7/1995 | Sasaki et al. | | |
| 5,447,041 | A | 9/1995 | Piechota | | |
| 5,459,388 | A | 10/1995 | Illingworth et al. | | |
| 5,460,906 | A | 10/1995 | Leon et al. | | |
| 5,462,814 | A | 10/1995 | Fernandez et al. | | |
| 5,465,198 | A | 11/1995 | Kellogg | | |
| 5,508,126 | A | 4/1996 | Braun | | |
| 5,510,693 | A | 4/1996 | Theobald | | |
| 5,552,692 | A | 9/1996 | McKillop | | |
| 5,572,592 | A | 11/1996 | Muckelrath | | |
| 5,584,055 | A | 12/1996 | Murui et al. | | |
| 5,587,250 | A | 12/1996 | Thomas et al. | | |
| 5,606,241 | A | 2/1997 | Patino et al. | | |
| 5,625,237 | A | 4/1997 | Saeki et al. | | |
| 5,633,096 | A | 5/1997 | Hattori | | |
| 5,640,078 | A | 6/1997 | Kou et al. | | |
| 5,651,485 | A | 7/1997 | Impastato, II | | |
| 5,656,917 | A | 8/1997 | Theobald | | |
| 5,657,210 | A | 8/1997 | Yamanaka | | |
| 5,680,026 | A | 10/1997 | Lueschen | | |
| 5,684,384 | A | 11/1997 | Barkat et al. | | |
| 5,685,421 | A | 11/1997 | Gilmore | | |
| 5,686,811 | A | 11/1997 | Bushong et al. | | |
| 5,689,171 | A | 11/1997 | Ludewig | | |
| 5,694,467 | A | 12/1997 | Young, III | | |
| D388,785 | S | 1/1998 | Yuen | | |
| 5,715,546 | A | 2/1998 | Kvalvik | | |
| 5,717,314 | A | 2/1998 | Wakefield | | |
| 5,741,149 | A | 4/1998 | Anthony | | |
| 5,752,205 | A | 5/1998 | Dzung et al. | | |
| 5,764,030 | A | 6/1998 | Gaza | | |
| 5,771,471 | A | 6/1998 | Alberth, Jr. et al. | | |
| 5,780,993 | A | 7/1998 | Tsang | | |
| 5,792,573 | A | 8/1998 | Pitzen et al. | | |
| 5,810,168 | A | 9/1998 | Eggering | | |
| 5,814,968 | A | 9/1998 | Lovegreen et al. | | |
| 5,834,921 | A | 11/1998 | Mercke et al. | | |
| 5,847,541 | A | 12/1998 | Hahn | | |
| 5,847,545 | A | 12/1998 | Chen et al. | | |
| 5,870,149 | A | 2/1999 | Comroe et al. | | |
| 5,889,383 | A | 3/1999 | Teich | | |
| 5,949,216 | A | 9/1999 | Miller | | |
| 5,969,592 | A | 10/1999 | Reed | | |
| 5,979,175 | A | 11/1999 | Ellison | | |
| 5,980,293 | A | 11/1999 | Nagano | | |
| 5,998,966 | A | 12/1999 | Gaza | | |
| 6,002,237 | A | 12/1999 | Gaza | | |
| 6,007,940 | A | 12/1999 | Spotnitz | | |
| D418,836 | S | 1/2000 | Matt et al. | | |
| 6,014,011 | A | 1/2000 | DeFelice et al. | | |
| 6,025,694 | A | 2/2000 | Mercke et al. | | |
| 6,042,416 | A | 3/2000 | Lopes | | |
| D423,518 | S | 4/2000 | Milligan et al. | | |
| 6,049,192 | A | 4/2000 | Kfoury et al. | | |
| 6,057,608 | A | 5/2000 | Bailey, Jr. et al. | | |
| 6,058,320 | A | 5/2000 | Yokota | | |
| 6,087,815 | A | 7/2000 | Pfeifer et al. | | |
| 6,091,225 | A | 7/2000 | Kim et al. | | |
| 6,104,292 | A | 8/2000 | Rombom et al. | | |
| 6,124,699 | A | 9/2000 | Suzuki et al. | | |
| 6,127,797 | A | 10/2000 | Walker | | |
| 6,127,802 | A | 10/2000 | Lloyd et al. | | |
| 6,154,008 | A | 11/2000 | Bradus et al. | | |
| 6,160,378 | A | 12/2000 | Helot et al. | | |
| 6,191,552 | B1 | 2/2001 | Kates et al. | | |
| 6,215,276 | B1 | 4/2001 | Smith | | |
| 6,223,835 | B1 | 5/2001 | Habedank et al. | | |
| 6,230,029 | B1 | 5/2001 | Hahn et al. | | |
| 6,233,343 | B1 | 5/2001 | Muranami et al. | | |
| D444,451 | S | 7/2001 | Bailey | | |
| D444,459 | S | 7/2001 | Matt et al. | | |
| 6,285,159 | B1 | 9/2001 | Ki et al. | | |
| 6,298,245 | B1 | 10/2001 | Usui et al. | | |
| 6,304,058 | B2 | 10/2001 | Watson et al. | | |
| 6,308,059 | B1 | 10/2001 | Domes | | |
| 6,326,764 | B1 | 12/2001 | Virtudes | | |
| 6,336,039 | B1 | 1/2002 | Usui et al. | | |
| 6,374,127 | B1 | 4/2002 | Park | | |
| 6,412,572 | B2 | 7/2002 | Habedank et al. | | |
| 6,424,842 | B1 | 7/2002 | Winstead | | |
| 6,427,070 | B1 | 7/2002 | Smith | | |
| 6,453,824 | B1 | 9/2002 | Dobbins | | |
| 6,456,837 | B1 | 9/2002 | Domes | | |
| 6,490,436 | B1 | 12/2002 | Kaiwa et al. | | |
| 6,496,688 | B2 | 12/2002 | Smith | | |
| 6,502,949 | B1 | 1/2003 | Horiyama et al. | | |
| 6,525,511 | B2 | 2/2003 | Kubale et al. | | |
| D474,175 | S | 5/2003 | Furusho et al. | | |
| D474,176 | S | 5/2003 | Furusho et al. | | |
| D474,177 | S | 5/2003 | Furusho et al. | | |
| 6,591,085 | B1 | 7/2003 | Grady | | |
| D479,223 | S | 9/2003 | Furusho et al. | | |
| D487,059 | S | 2/2004 | Glasgow et al. | | |
| 6,729,413 | B2 | 5/2004 | Turner et al. | | |
| 6,788,026 | B2 | 9/2004 | Muramatsu | | |
| 6,788,925 | B2 | 9/2004 | Domes | | |
| D500,487 | S | 1/2005 | Concari et al. | | |
| D507,235 | S | 7/2005 | Rozwadowski et al. | | |
| D511,136 | S | 11/2005 | Hirschburger et al. | | |
| D529,439 | S | 10/2006 | Glasgow et al. | | |
| D533,161 | S | 12/2006 | Concari et al. | | |
| D538,258 | S | 3/2007 | Ishibashi | | |
| 2002/0039016 | A1 | 4/2002 | You et al. | | |
| 2003/0071598 | A1 | 4/2003 | Kubale et al. | | |
| 2003/0090234 | A1 | 5/2003 | Glasgow et al. | | |
| 2003/0117107 | A1 | 6/2003 | Zick et al. | | |
| 2004/0072064 | A1 | 4/2004 | Turner et al. | | |
| 2005/0078834 | A1 | 4/2005 | Hirschburger et al. | | |
| 2005/0083639 | A1 | 4/2005 | Zick et al. | | |
| 2005/0225288 | A1 | 10/2005 | Cole, Jr. et al. | | |
| 2007/0024237 | A1 | 2/2007 | Cole, Jr. et al. | | |

FOREIGN PATENT DOCUMENTS

| | | |
|---|---|---|
| DE | 7342534 | 3/1974 |
| DE | 4234962 | 4/1994 |
| DE | 19905085 | 8/2000 |
| DE | 698 03 432 T2 | 8/2002 |
| EP | 0 090 480 A2 | 10/1983 |
| EP | 0 262 576 | 4/1988 |
| EP | 0 310 717 | 4/1989 |
| EP | 0 920 062 | 6/1999 |
| EP | 0 987 783 | 3/2000 |
| EP | 1 025 962 | 8/2000 |

| | | | | | | |
|---|---|---|---|---|---|---|
| EP | 1 158 645 A1 | 11/2001 | | JP | 408033026 | 2/1996 |
| EP | 1 213 815 A2 | 6/2002 | | JP | 08195191 | 7/1996 |
| EP | 1 265 334 A2 | 12/2002 | | JP | 0827669 | 11/1996 |
| EP | 1 311 012 | 5/2003 | | JP | 409092243 | 4/1997 |
| GB | 2195841 A | 4/1988 | | JP | 41003893 | 1/1998 |
| JP | 357128458 | 10/1982 | | JP | 2001-85069 | 3/2001 |
| JP | 61197646 | 12/1986 | | JP | 2003-234130 | 8/2003 |
| JP | 04150728 | 5/1992 | | WO | WO 97/43921 | 11/1997 |
| JP | 405159556 | 6/1993 | | WO | WO 03/105309 A1 | 12/2003 |
| JP | 07307580 | 11/1995 | | | | |

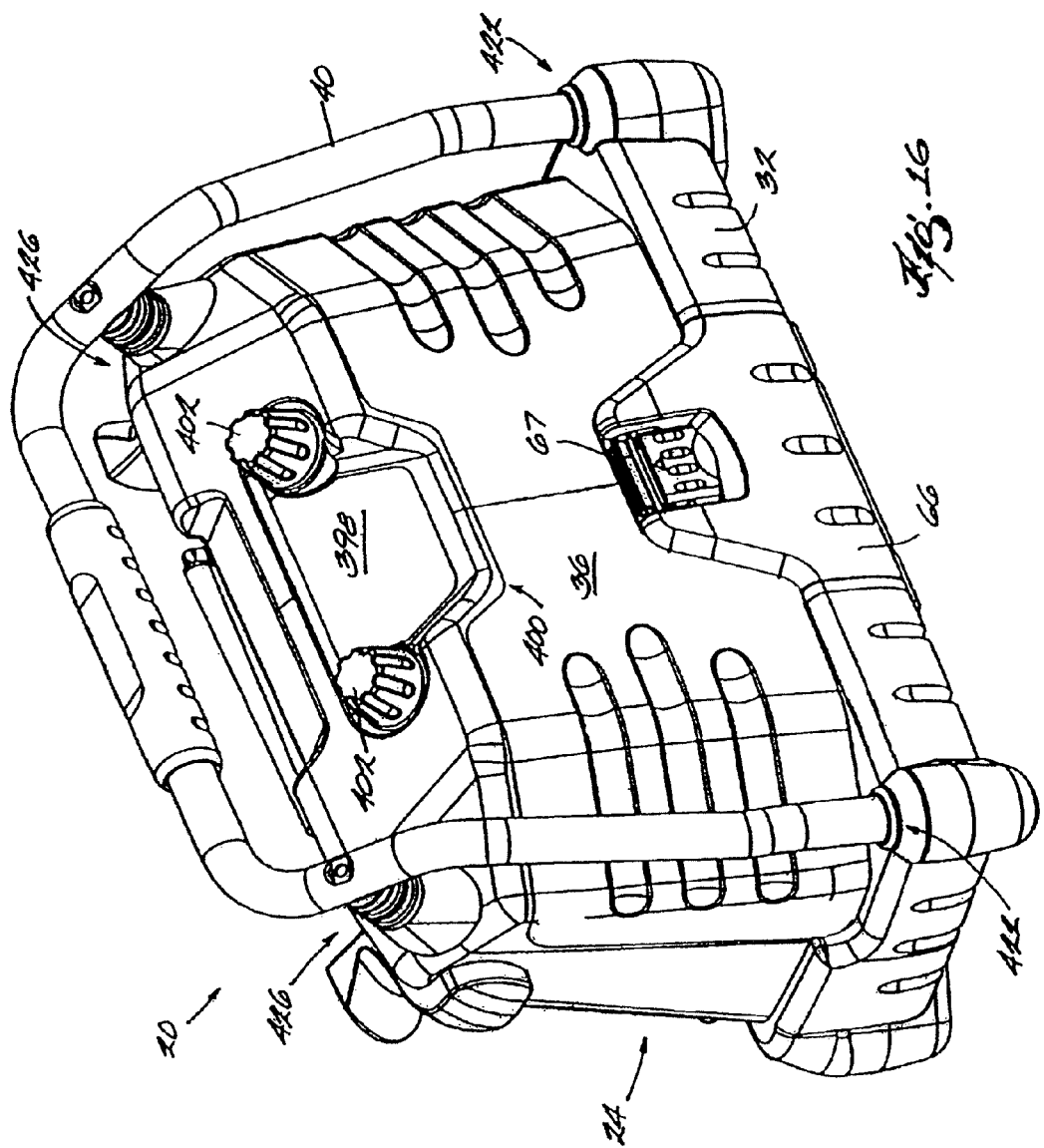

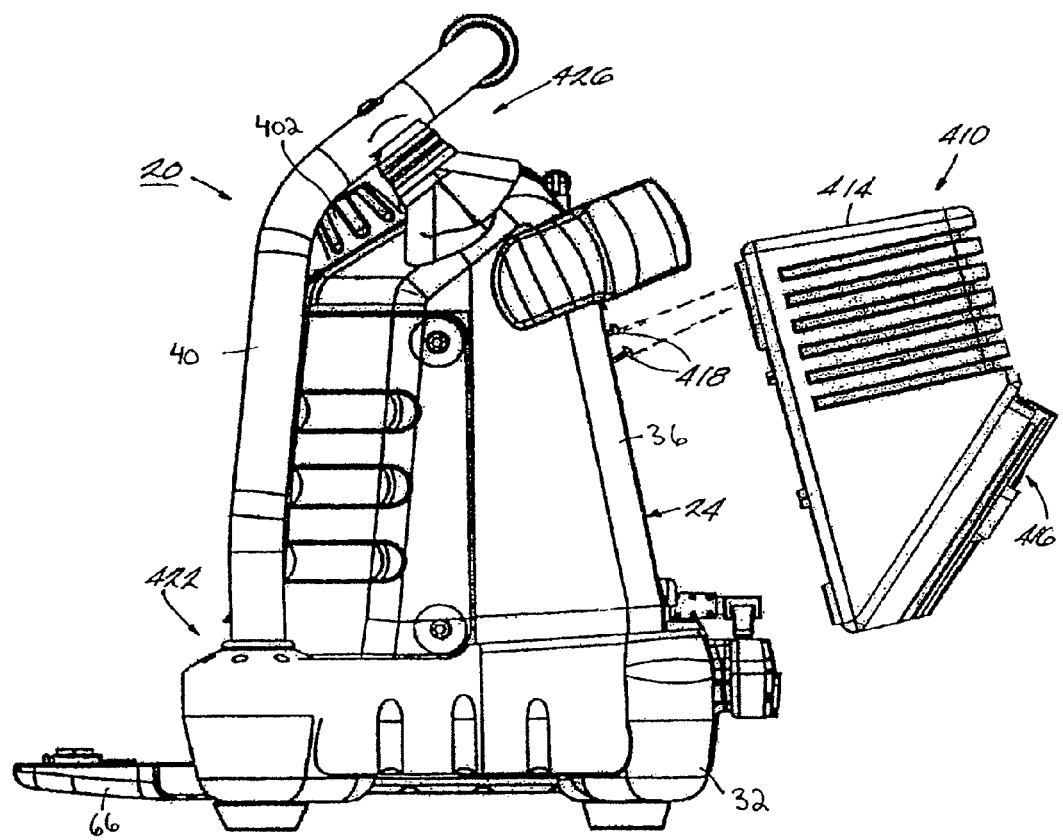

ELECTRICAL COMPONENT HAVING A SELECTIVELY CONNECTABLE BATTERY CHARGER

RELATED APPLICATIONS

The present application is a continuation of co-pending patent application Ser. No. 10/926,744, filed Aug. 26, 2004, and co-pending patent application Ser. No. 10/926,883, filed Aug. 26, 2004, both of which are continuation-in-part applications of patent application Ser. No. 10/291,868, filed Nov. 8, 2002, now U.S. Pat. No. 6,982,541, issued Jan. 3, 2006, which claims the benefit of Provisional Patent Application Ser. No. 60/379,068, filed May 9, 2002, and Provisional Patent Application Ser. No. 60/344,431, filed on Nov. 9, 2001. Co-pending patent application Ser. Nos. 10/926,744 and 10/926,883 also claim the benefit of Provisional Patent Application Ser. No. 60/523,541, filed Nov. 20, 2003, and Provisional Patent Application Ser. No. 60/540,313, filed Jan. 28, 2004, the entire contents of all are hereby incorporated by reference.

FIELD OF THE INVENTION

The present invention relates to electrical components and, more particularly, to, for example, a radio, a MP3 player, an audio component, a battery charger, a radio/charger, a MP3 player/radio, a MP3 player/charger or a MP3 player/radio/charger, and a battery charger selectively connectable to electrical components.

BACKGROUND OF THE INVENTION

An electrical component, such as, for example, a radio, an audio component, a battery charger, a radio/charger or a MP3 player includes a component housing supporting an electrical circuit, such as an audio circuit, a charging circuit, a MP3 circuit, respectively. In some electrical components, such as the radio, a battery is electrically connectable to the audio circuit to operate the audio circuit to produce audio signals. In some electrical components, such as the battery charger, a battery is electrically connectable to the charging circuit to be charged by the charging circuit. In other electrical components, such as the MP3 player, a battery is electrically connectable to the MP3 circuit to operate the MP3 circuit to produce MP3 audio signals.

SUMMARY OF THE INVENTION

Typically, the above-described electrical components can only accommodate one type or size of battery in the electrical component's battery receptacle. For example, the construction of the receptacle may limit the battery size. Also, the position and structure of the assembly to connect the battery to the electrical component may limit the battery size.

Also, with the above-described electrical components, the battery is difficult to remove from the battery receptacle.

In addition, the above-described electrical components, the battery is free to move within the battery receptacle and, therefore, may become disconnected during work site operations.

Further, existing radios, MP3 players and other audio components are not useable with a slide-on power tool battery.

Also, the above-described electrical components lack storage for accessories useable with the electrical component, such as, for example, a cell phone and an auxiliary audio component.

In addition, the electrical components are not rugged and may be damaged at a work site during normal and/or adverse working conditions.

In some constructions and in some aspects, the present invention provides an electrical component, such as, for example, a radio, an audio component, a battery charger, a radio/charger, a MP3 player, a MP3 player/radio, a MP3 player/charger or a MP3 player/radio/charger that substantially alleviates one or more of the above-described and other problems with existing electrical components. More particularly, in some constructions and in some aspects, the invention provides an electrical component, which accommodates batteries of different sizes. Also, in some constructions and in some aspects, the invention provides an electrical component in which the battery is biased out of the battery receptacle to move the battery to a more accessible position for removal. In addition, in some constructions and in some aspects, the invention provides an electrical component in which the battery is locked in a position relative to the electrical component housing. Further, in some constructions and in some aspects, the invention provides an electrical combination including an audio component and a slide-on power tool battery connectable to the audio component.

Also, in some constructions and in some aspects, the invention provides a combination including an electrical component and an accessory bag connectable to the electrical component to store accessories useable with the electrical component. In addition, in some constructions and in some aspects of the invention, the invention provides an electrical component having a rugged, durable construction and/or structure. Further, in some constructions and in some aspects, the invention provides a MP3 player in which the battery is locked in a position relative to the MP3 player housing.

In addition, in some constructions and in some aspects, the invention provides a MP3 player having a rugged, durable construction and/or structure. Further, in some constructions and in some aspects, the invention provides a combination including a MP3 player and a slide-on power tool battery connectable to the MP3 player. Also, in some constructions and in some aspects, the invention provides an electrical component with a MP3 circuit and a charging circuit.

In addition, in some constructions and in some aspects, the invention provides a MP3 player including a housing, a MP3 circuit for producing a MP3 audio signal, the MP3 circuit being supported by the housing, a battery being supportable by the housing and electrically connectable to the MP3 circuit, and locking assembly operable to lock the battery in a position relative to the housing.

Further, in some constructions and in some aspects, the invention provides a MP3 player including a housing, a blow-molded base connected to the housing, a handle connected to the housing and to the base, the handle having an upper portion positioned above the housing a side portion positioned to one side of the housing, the handle being configured to absorb impacts to the housing, and a MP3 audio circuit for producing a MP3 audio signal, the MP3 audio circuit being supported by the housing.

Also, in some constructions and in some aspects, the invention provides an electrical combination including a MP3 player including a housing having a support portion and a MP3 audio circuit for producing a MP3 audio signal, the MP3 audio circuit being supported by the housing, and a slide-on power tool battery supportable by the support portion of the housing, the slide-on power tool battery being operable to power a power tool.

In addition, in some constructions and in some aspect, the invention provides a MP3 player including a housing, a MP3 audio circuit supported by the housing and operable to produce a MP3 audio signal, the MP3 audio circuit being electrically connectable to a power source, and a charging circuit supported by the housing and connectable to a power tool battery and to a power source and operable to charge the battery, the power tool battery being operable to power a power tool.

Further, in some constructions and in some aspects, the invention provides an electrical component, such as an audio component, including an audio component housing, a circuit supported by the housing and operable to produce an audio signal, a battery being connectable to the housing and electrically connectable to the circuit, and a locking assembly operable to lock the battery in a position relative to the housing. The housing may define a receptacle, and the battery may be supportable in the receptacle. The audio component may further include a biasing member positioned in the receptacle, and the biasing member preferably biases the battery out of the receptacle. Preferably, the battery is a power-tool battery operable to power a power tool.

The locking assembly may include a locking projection on one of the battery and the housing and a recess defined by the other of the battery and the housing. Preferably, the locking projection is movable between a locked position, in which the projection engages the recess to lock the battery in a position relative to the housing, and an unlocked position, in which the battery is movable relative to the housing. The locking assembly may include an actuator operable to move the locking projection between the locked position to the unlocked position and/or between the locked position and the unlocked position. The locking assembly may also include a biasing member biasing the locking projection toward the locked position. Also, in some constructions and in some aspects, the invention provides an electrical component generally having a housing and a battery charger selectively connectable to the housing.

In addition, in some constructions and in some aspects, the invention provides an electrical component generally having a battery charger, a first battery for powering the electrical component and a second battery electrically connected to the battery charger, the battery charger being operable to charge the second battery.

Also, the invention provides an electrical component, such as a battery charger, including a charger housing, a charging circuit supported by the housing and selectively connectable with a power source, a battery being connectable to the housing and electrically connectable with the charging circuit such that the charging circuit is selectively operable to charge the battery, and a locking assembly operable to lock the battery in a position relative to the housing.

In addition, the invention provides an electrical component including a housing defining a receptacle, an electrical circuit supported by the housing, a battery being supportable in the receptacle and connectable to the electrical circuit, and a biasing member operable to bias the battery out of the receptacle to an ejected position. The biasing member may be supported within the receptacle. The housing may also include a cover selectively closing an open end of the receptacle. The cover may include a second biasing member selectively biasing the battery into the receptacle.

In some constructions, the electrical component may be an audio component, and the electrical circuit may be an audio circuit for producing an audio signal. In some constructions, the electrical component may be a battery charger, and the electrical circuit may be a charging circuit connectable to the battery and operable to charge a battery. The battery may be a power tool battery, such as, a slide-on power tool battery or a tower power tool battery.

The electrical component may also include an electrical connector assembly for connecting the battery to the electrical circuit. The electrical connector assembly may be supported in the receptacle. The electrical connector assembly may include a support portion supporting the battery. The support portion may be movable relative to the housing, and a biasing member may bias the support portion toward an open end of the receptacle to bias the battery to the ejected position.

The electrical component may also include a locking assembly operable to lock the battery in a position relative to the housing. In some constructions, the locking assembly may be a cover supported by the housing and selectively closing the open end of the receptacle to lock the battery in the receptacle.

In some constructions, the locking assembly may include a locking projection on one of the battery and the electrical connector assembly and a recess defined by the other of the battery and the electrical connector assembly. The locking projection may be movable between a locked position, in which the projection engages the recess to lock the battery in a position relative to the electrical connector assembly, and a unlocked position, in which the battery is movable relative to the electrical connector assembly.

In some constructions, the locking assembly may include a locking projection on one of the electrical connector assembly and the housing and a recess defined by the other of the electrical connector assembly and the housing. The locking projection may be movable between a locked position, in which the projection engages the recess to lock the electrical connector assembly in a position relative to the housing, and an unlocked position, in which the electrical connector assembly is movable relative to the housing. In these constructions, the locking assembly may also include an actuator movable between a locked position and an unlocked position. The locking projection is in the locked position thereof when the actuator is in the locked position thereof, and the locking projection is in the unlocked position thereof when the actuator is in the unlocked position thereof.

Further, the invention provides an electrical combination including an electrical component, such as an audio component, including an audio component housing having a support portion, and a circuit supported by the housing and operable to produce an audio signal, and a slide-on power tool battery supportable by the support portion of the housing and operable to power a power tool.

Also, the invention provides an electrical component including a housing defining a receptacle, an electrical circuit supported by the housing, and a connector assembly movably supported by the housing and connecting a battery to the electrical component. The battery may be one of a first battery having a first dimension and a second battery having second dimension. The first dimension is different than the second dimension. The receptacle may selectively receive one of the first battery and the second battery. The receptacle may accommodate only one of the first battery and the second battery at a time. The connector assembly is preferably movable relative to the housing to selectively accommodate the first battery and the second battery.

The connector assembly may include a support portion movable relative to the housing, and the battery is preferably supportable on the support portion. One of the battery and the support portion may include a projection and the other of the battery and the support portion may define a recess. The projection is preferably engageable in the recess to connect the battery to the connector assembly.

The connector assembly may also include a connector terminal assembly connected to the electrical circuit and movable relative to the housing. The battery may include a battery terminal assembly, and the battery terminal assembly is preferably connectable to the connector terminal assembly to connect the battery to the electrical circuit. The support portion and the connector terminal assembly may be preferably movable relative to the housing.

In addition, the invention provides an electrical component including a housing defining a receptacle having an open end, the housing includes a cover selectively closing the open end of the receptacle, and an electrical circuit supported by the housing, a first battery being supportable in the receptacle and connectable to the electrical circuit, the first battery having a first dimension, a second battery being supportable in the receptacle and connectable to the electrical circuit, the second battery having a second dimension, the first dimension being different than the second dimension, the receptacle selectively receiving one of the first battery and the second battery.

The electrical component may further include a movable support portion positioned in the receptacle for selectively supporting one of the first battery and the second battery. One of the support portion and the one of the first battery and the second battery may include a projection and the other of the support portion and the one of the first battery and the second battery may define a recess, the projection may be engageable in the recess to support the one of the first battery and the second battery on the support portion. The movable support portion may include a track with a protrusion and a recess and at least one electrical connector thereon. The track and electrical connector may be movable in relation to the housing. The electrical component may further include a locking assembly supported by the housing and operable to lock one of the first battery and the second battery to the housing.

Further, the invention provides a combination including an electrical component having a housing defining a well portion in a rear of the housing, and an electrical circuit supported by the housing, and an accessory bag selectively connectable to the housing at least partially within the well portion.

The accessory bag may include a handle. The accessory bag may define an opening to facilitate passing of electrical cords from inside the accessory bag to outside the accessory bag. The accessory bag may further include at least one flap for selectively covering the opening. The accessory bag may alternatively include at least one zipper for selectively closing the opening.

The combination may further include at least one housing connector supported on the housing and at least one bag connector supported on the accessory bag. The housing connector and the bag connector may be operable to selectively connect to one another to selectively support the accessory bag on the housing. The combination may further include an electrical plug supported on the housing and electrically connected to the electrical circuit.

Independent features and independent advantages of the invention will become apparent to those skilled in the art upon review of the detailed description, claims and drawings.

BRIEF DESCRIPTION OF THE DRAWINGS

FIG. 16 is a front perspective view of the electrical component shown in FIG. 13.

FIG. 17 is a side view of another alternative construction of an electrical component and a separate battery charger embodying aspects of the invention.

Figure 1:
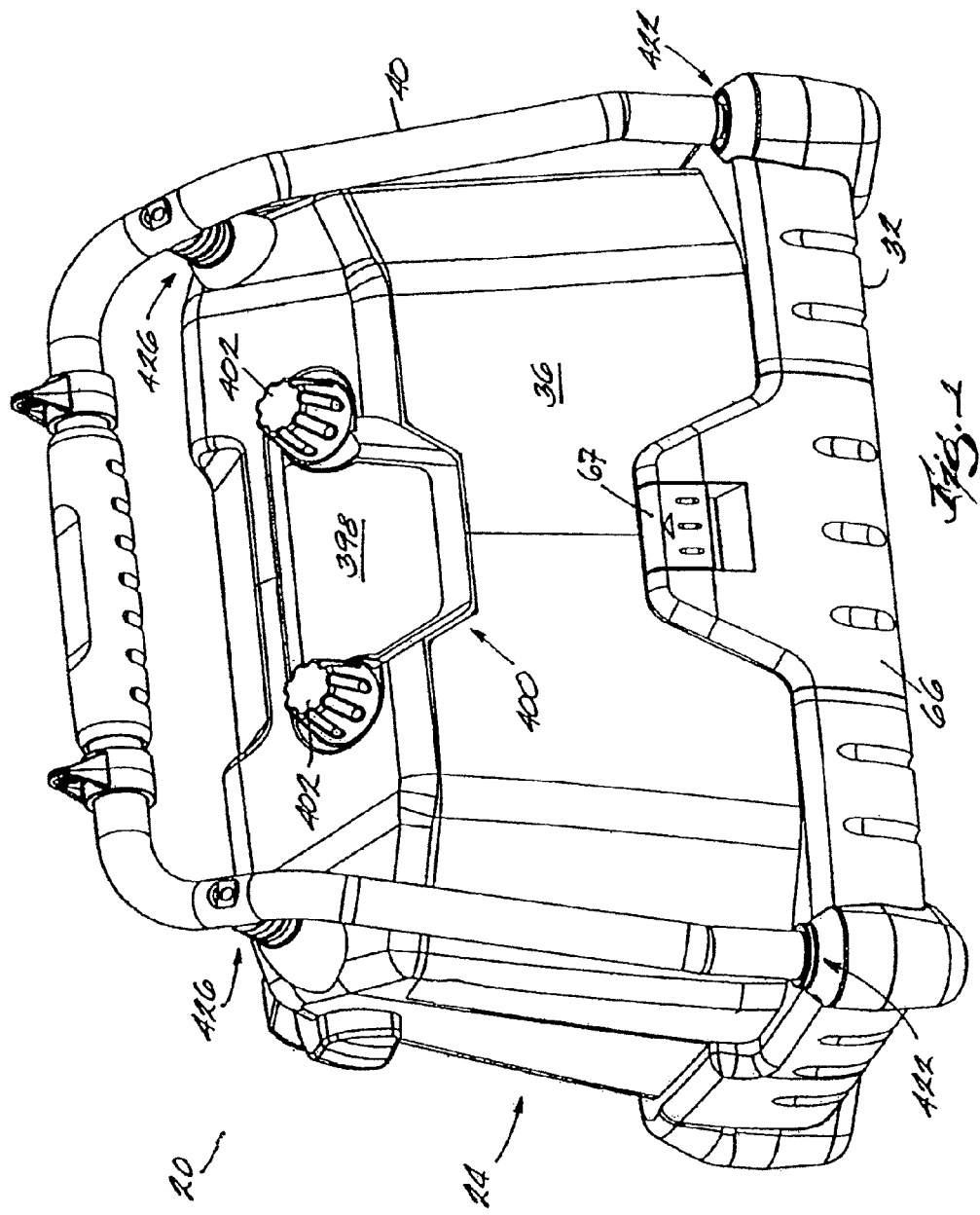
FIG. 1 is a front perspective view of an electrical component embodying the invention.

Before at least one embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

FIG. 1 illustrates an electrical component 20, such as a combination radio and power tool battery charger. It should be understood that, in other constructions, the electrical component 20 may include another audio component, such as, for example, a tape player, a CD player, a MP3 player (discussed in greater detail below), a jukebox, etc. It should also be understood that, in some constructions and for some aspects, the electrical component 20 may be another electrical component, such as, for example, an audio component, a battery charger, a power tool, a cell phone charger, a power supply for other electrical equipment, etc.

Figure 2:
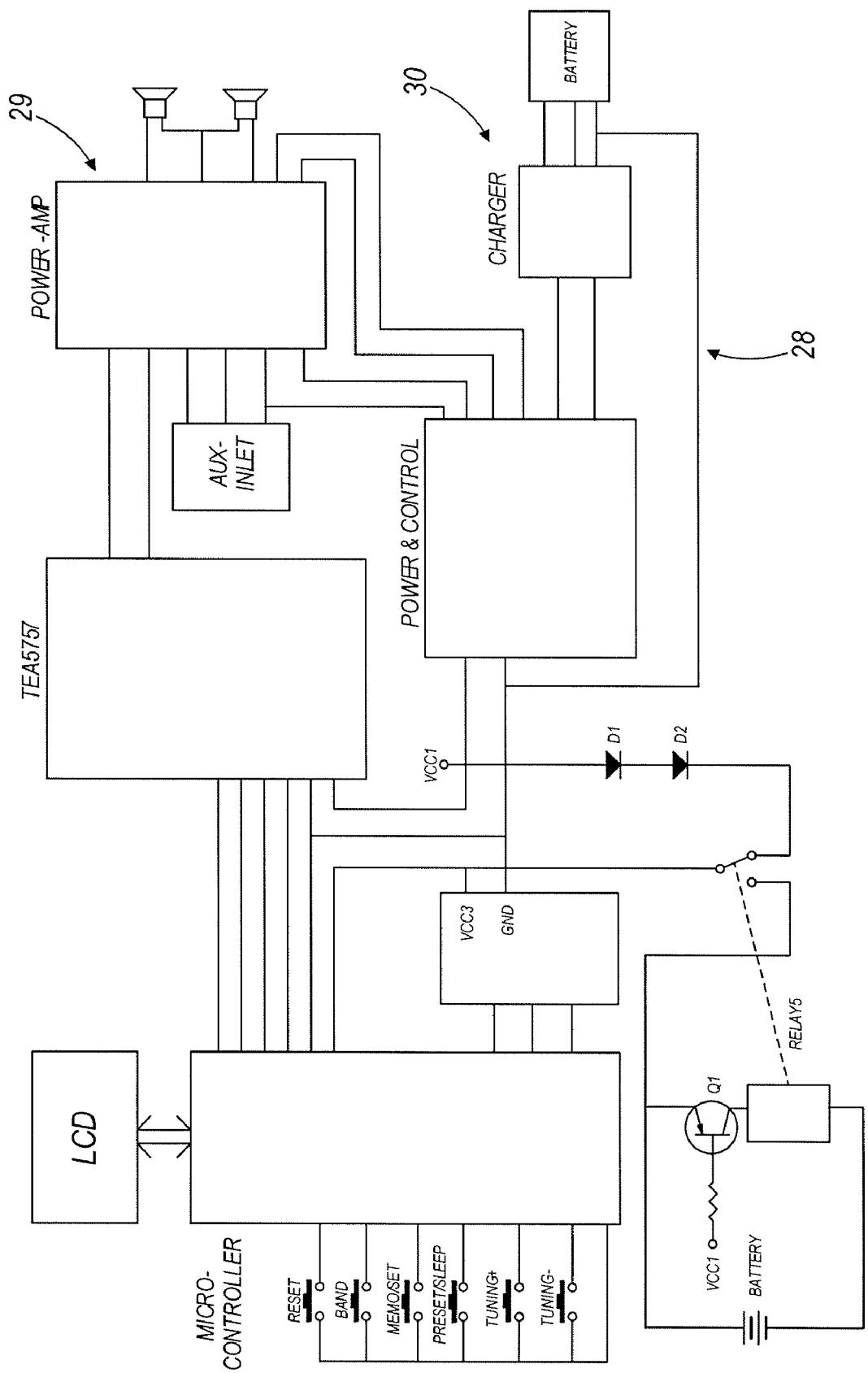
FIG. 2 is a schematic diagram of an electrical circuit for the electrical component.

The electrical component 20 includes an electrical component housing 24 and an electrical circuit 28 (schematically illustrated in FIG. 2) supported by the housing 24. In the illustrated construction, the electrical circuit 28 is a combination radio and battery charging circuit having an audio circuit portion 29, operable to produce an audio signal, and a charging circuit portion 30, operable to charge a battery. It should be understood that, in other constructions and for some aspects, the electrical circuit 28 may be any type of electrical circuit, such as, for example, an audio circuit for producing an audio signal or a charging circuit for charging a battery.

Figure 21:
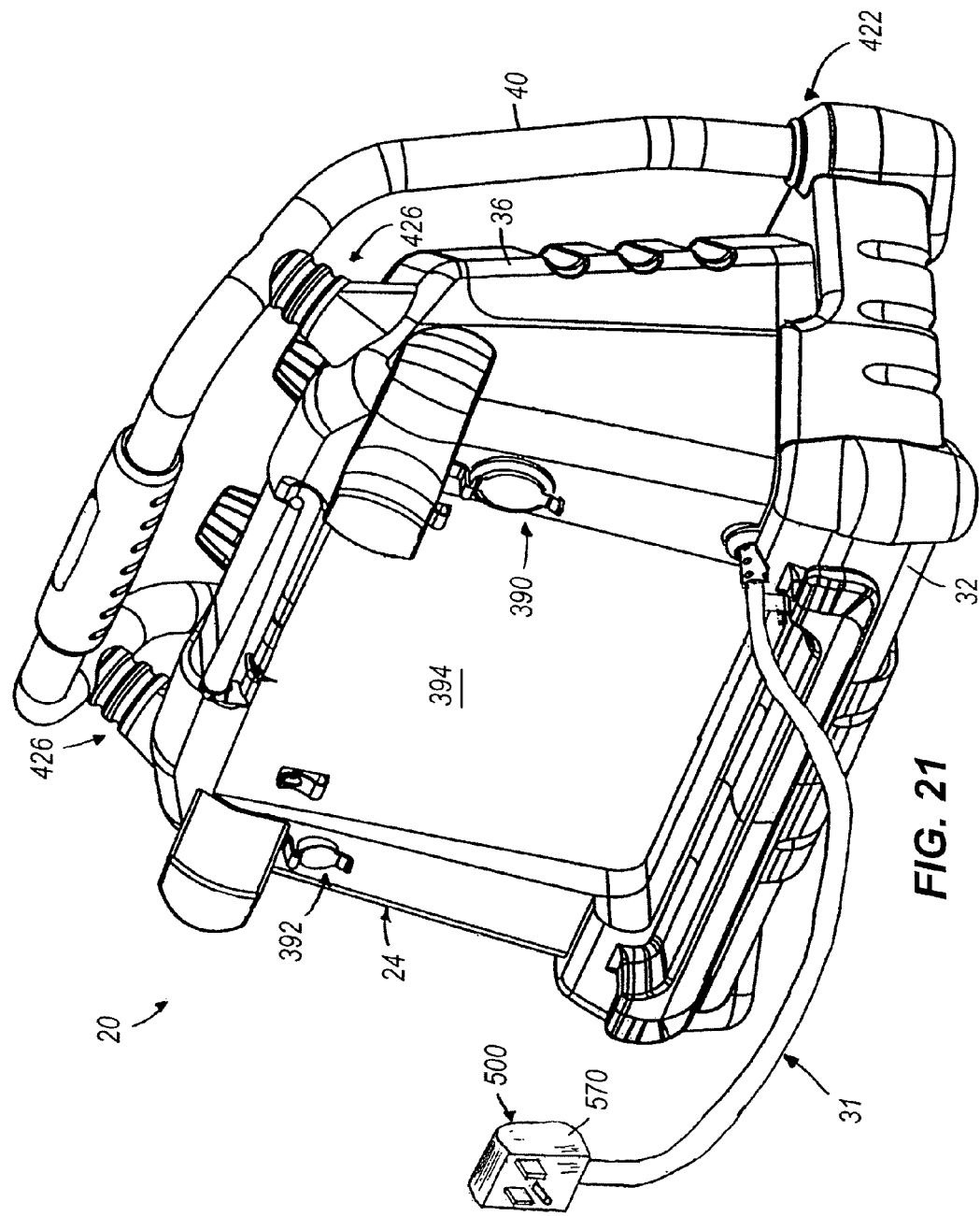
FIG. 21 is a rear perspective view of the electrical component shown in FIG. 1, shown with a power cord.

The electrical circuit 28 is connectable to a power source, which supplies power to the electrical circuit 28. The power source may include an AC power source, such as line power (through a power cord 31 (discussed in greater detail below, see FIG. 21)), or a DC power source, such as a battery. In the illustrated construction, the audio circuit portion 29 is selectively powered by an AC power source or by a DC power source. The AC power source can be the primary power source for the electrical circuit 28, and the DC power source can be a secondary or back-up power source. Also, in the illustrated construction, the charging circuit portion 30 is connectable to a power source to charge a battery. In some constructions, an AC power source may not be included, in which case, the DC power source is the sole power source and the electrical component is powered by the DC power source only.

As explained below in more detail, the electrical circuit 28 includes a power amplifier circuit portion for amplifying an input, such as a signal from an auxiliary component, to the audio circuit portion 29. The electrical circuit 28 also includes a power supply portion which may be connected through a power outlet on the electrical component 20 to power other electrical devices (including the auxiliary component).

As shown in FIG. 1, the housing 24 includes a base portion 32, a main portion 36, and a handle portion 40. The base portion 32, the main portion 36, and the handle portion 40 are designed to have impact absorbing characteristics which protect the electrical component 20 from impacts at a jobsite, such as from falling from a height or having another object impact the electrical component 20, which might normally damage the elements of the electrical component 20, such as, for example, the elements of the electrical circuit 28, and/or create an electrical hazard in the electrical component 20. For example, the housing 24 may be formed of energy/impact absorbing materials, such as, for example, high-density polyethylene (HDPE), and/or formed with energy/impact absorbing structures, such as, for example, bars, base edges, bumpers, bushings, ribs, honeycombs, energy-absorbing shapes, etc. In the illustrated construction, at least the base portion 32 is blow-molded from an energy/impact absorbing material, such as, for example, high-density polyethylene (HDPE).

Figure 3:
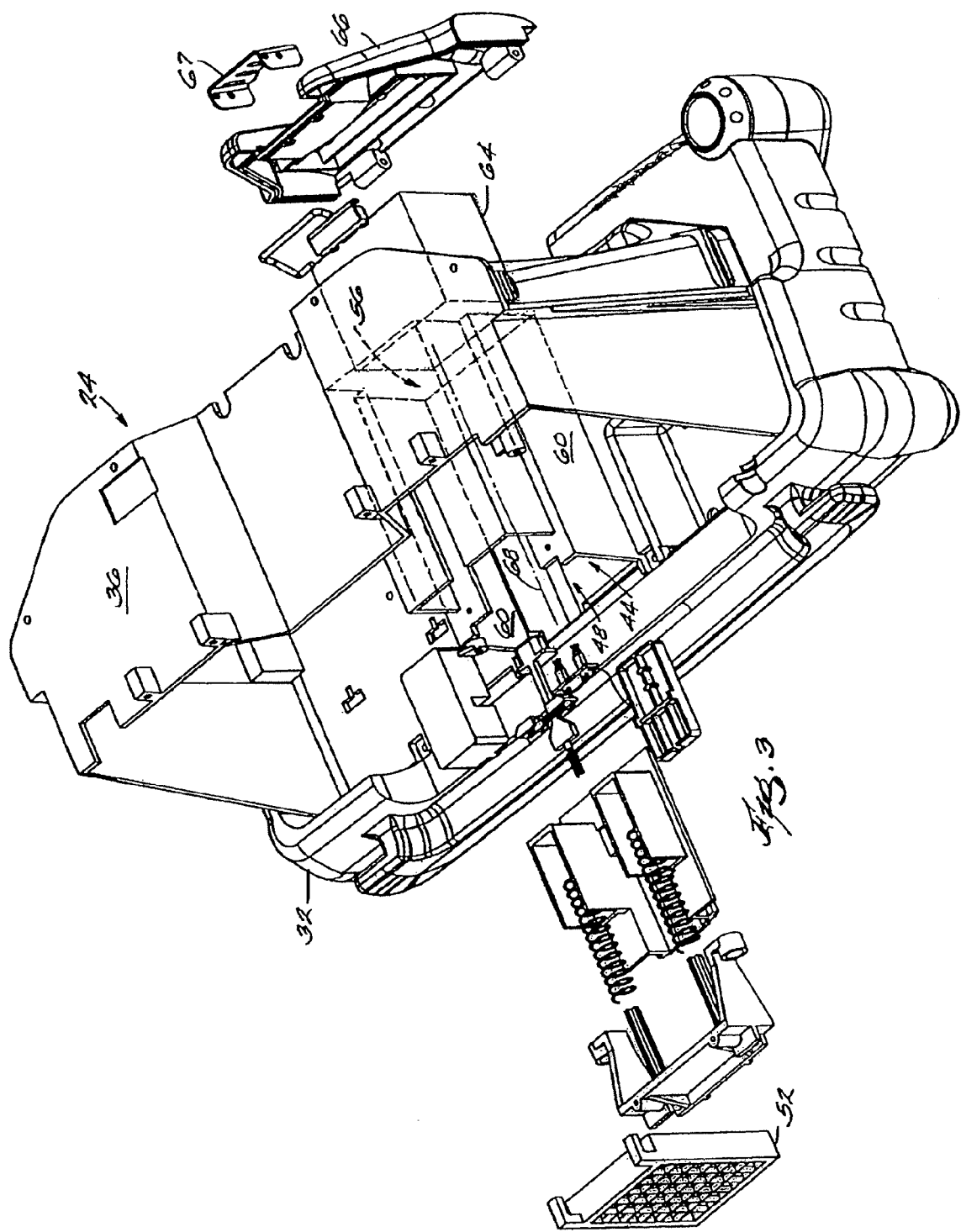
FIG. 3 is an exploded rear perspective view of a portion of the electrical component shown in FIG. 1.

As shown in FIG. 3, the housing 24 defines a receptacle 44 having a closed end 48, defined by a bumper 52 (discussed below), an open end 56, and side walls 60 extending from the closed end 48 to the open end 56. A battery 64 is inserted into the receptacle 44 along an insertion axis 68. The battery 64 is electrically connected to the electrical circuit 28 to, in the illustrated construction, selectively provide power to the electrical circuit 28 or be charged by the charging circuit portion 30 of the electrical circuit 28. However, the battery 64 is monitored by and disconnected from the electrical circuit 28, as necessary, to prevent deep discharge of the battery 64. Such deep discharge prevention is described in U.S. Pat. No. 6,211,652, issued on Apr. 3, 2001, which is hereby incorporated by reference.

For purposes of description, "forward" is defined as being in the direction of the open end 56 along the insertion axis 68. Similarly, "rearward" is defined relative to "forward" as being in the direction of the closed end 48 and away from the open end 56 along the insertion axis 68.

Figure 4:
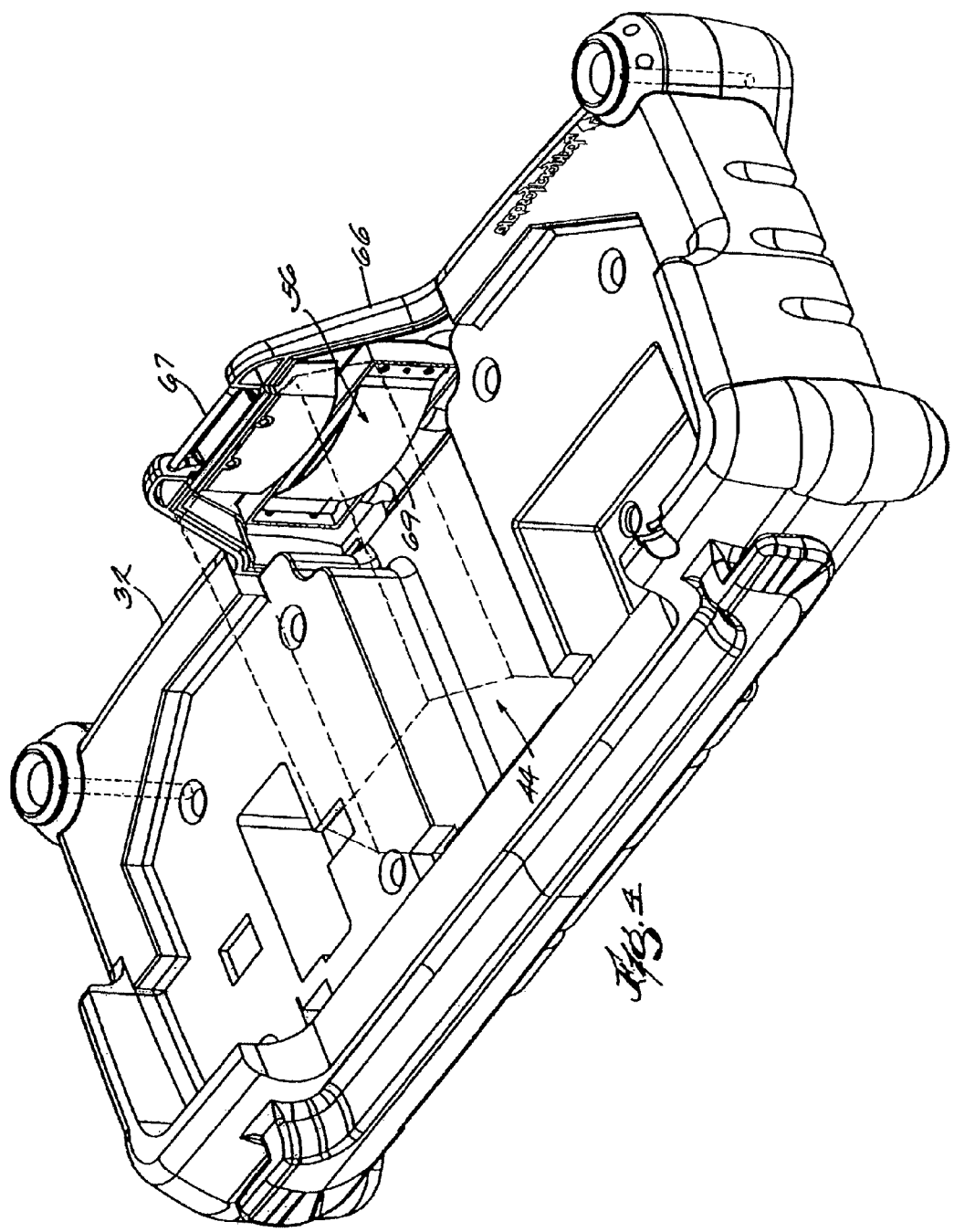
FIG. 4 is a rear perspective view of a portion of the electrical component shown in FIG. 1.

As shown in FIG. 4, the housing 24 includes a cover 66 pivotally connected to the base portion 32 for selectively closing the open end 56 of the receptacle 44. A latching member 67 is selectively lockable to the main portion 36 (see FIG. 1) to lock the cover 66 in a closed position (shown in FIG. 1). A cover biasing member 69 is mounted on the interior surface of the cover 66. When the cover 66 is closed, the biasing member 69 engages and biases the battery 64 (see FIG. 3) into the receptacle 44 to maintain proper electrical connection, as described below in more detail, during normal operations or during and after an impact condition.

Figure 5:
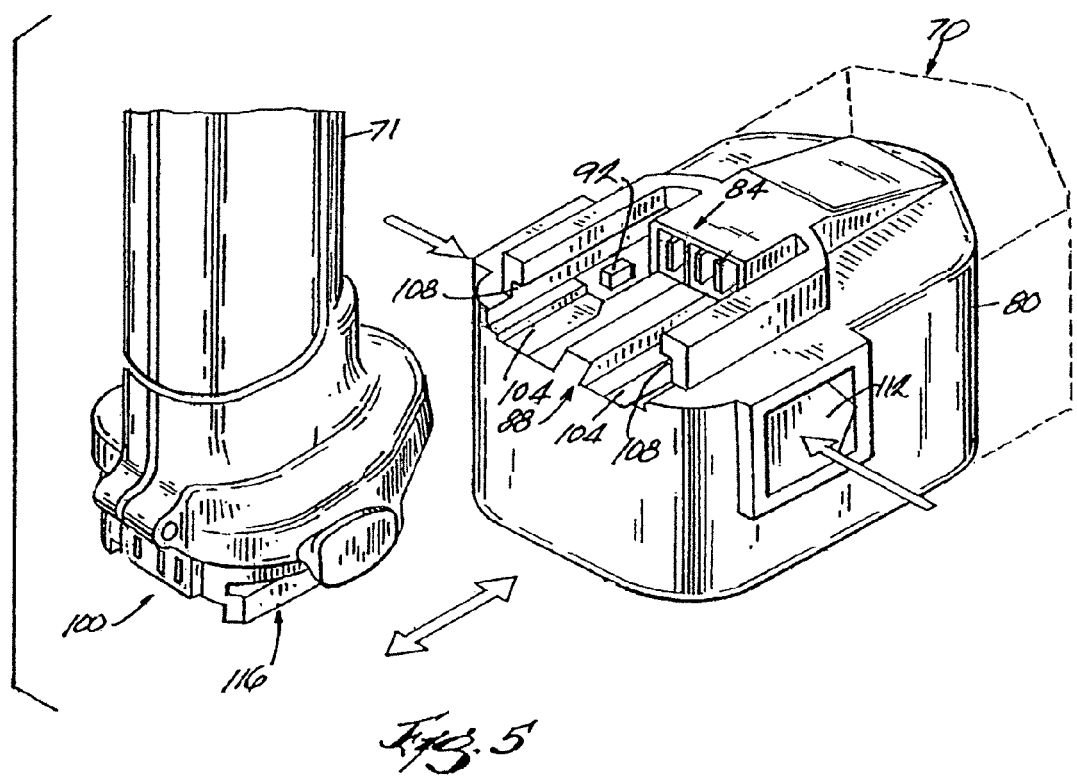
FIG. 5 is a perspective view of a battery and a portion of a power tool.

As shown in FIG. 5 and in the illustrated construction, the battery 64 is a slide-on power tool battery 70 operable to power a power tool 71, such as, for example, a drill, a circular saw, a reciprocating saw, etc. The slide-on battery 70 is slidably mountable on the power tool 71. In the illustrated construction, the slide-on battery 70 includes a battery housing 80 supporting a number of battery cells (not shown), a battery terminal assembly 84, a battery support portion 88, and locking members or locking tabs 92 (one shown). The terminal assembly 84 facilitates electrical connection between the battery cells and a motor (not shown) of the power tool 71 and/or the circuit 28 of the electrical component 20.

In the illustrated construction, the support portion 88 of the slide-on battery 70 has a generally C-shaped cross-section provided by grooves 104 and rails 108 which extend parallel to the insertion axis 68 (see FIG. 3). The locking tabs 92 are supported in the C-shaped support portion 88 and are movable perpendicular to the insertion axis 68 by depressing locking tab actuators or buttons 112 (one shown).

In the illustrated construction, the power tool 71 includes a generally T-shaped power tool support portion 116 and a power tool terminal assembly 100. The support portion 88 of the battery 70 is complementary to the support portion 116 of the power tool 71, and, therefore, the complementary components physically and electrically connect the battery 70 to the power tool 71. The locking tabs 92 engage in recesses (not shown) on the power tool support portion 116 to provide a battery locking assembly between the battery 70 and the power tool 71.

It should be understood that, in other constructions (not shown), the battery 70 may be a different type of slide-on power tool battery, such as, for example, a battery having a T-shaped cross-section. In such constructions, the power tool and the electrical component would have a complementary C-shaped cross-section support portion.

It should also be understood that slide-on batteries have a variety of sizes depending on the number and orientation of the cells in the battery housing. In the illustrated construction, the slide-on battery 70 has a first dimension, such as an axial length, and another slide-on battery (shown in phantom in FIG. 5) has a second dimension, such as a second axial length, which is different than that of the first slide-on battery 70.

In addition, it should be understood that the electrical component 20 is usable with batteries having different battery chemistries (i.e., Lithium-based chemistries (Li, Li-ion, etc.), Nickel Metal Hydride (NiMH), Nickel Cadmium (NiCd), etc.). The electrical circuit 28 and the charging circuit portion 30 may include identification circuitry and structure necessary to identify the chemistry of the battery 70 to ensure proper charging and operation of the battery 70.

In an alternative construction and in some aspects, the electrical component 20 is usable with a tower power tool battery 72 (see FIG. 12), discussed below in more detail. Also, in other constructions (not shown) and in some aspects, the electrical component 20 may be used with other types and sizes of batteries.

Figure 6:
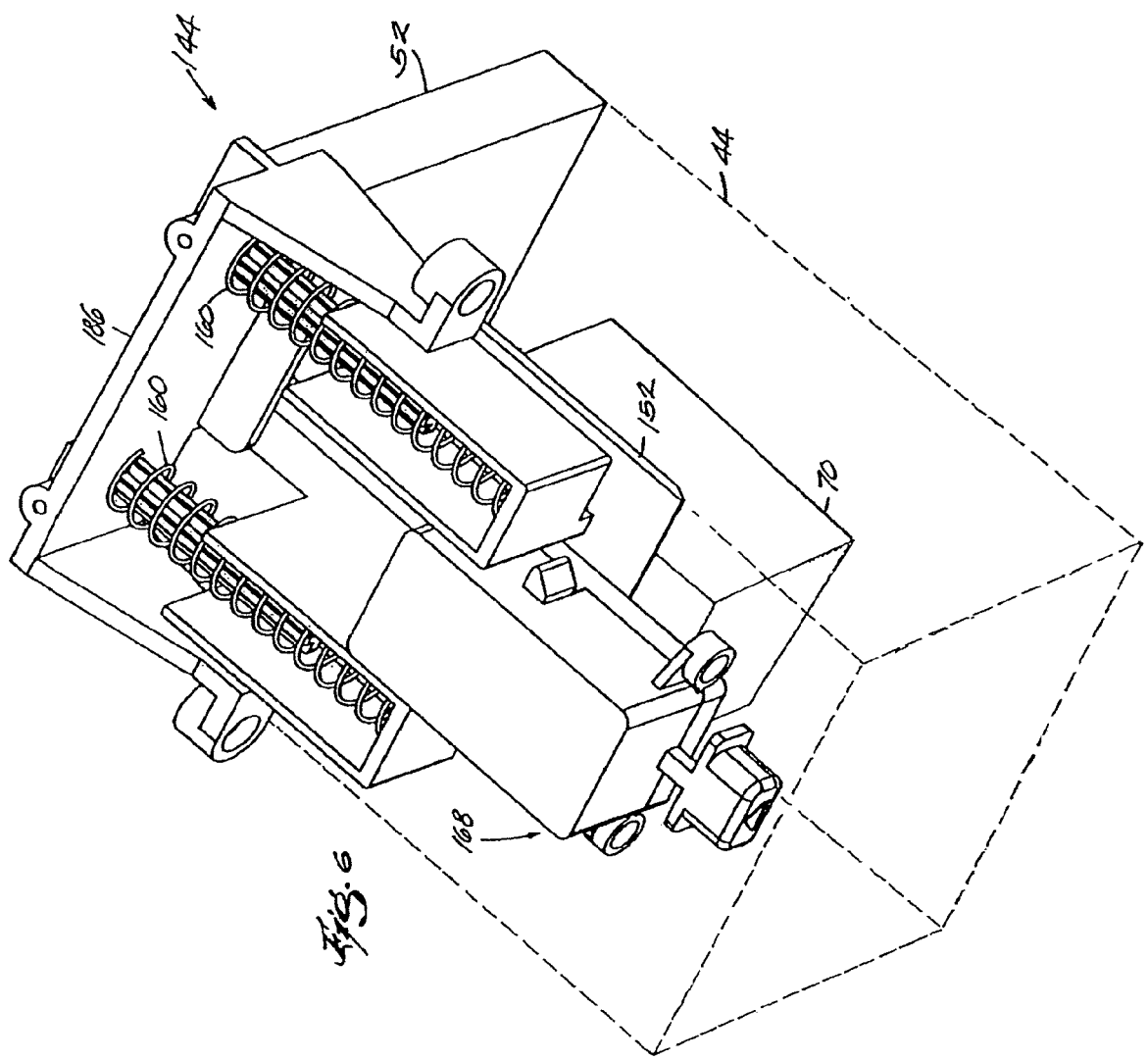
FIG. 6 is a top perspective view of an electrical connector assembly shown in FIG. 3.
Figure 7:
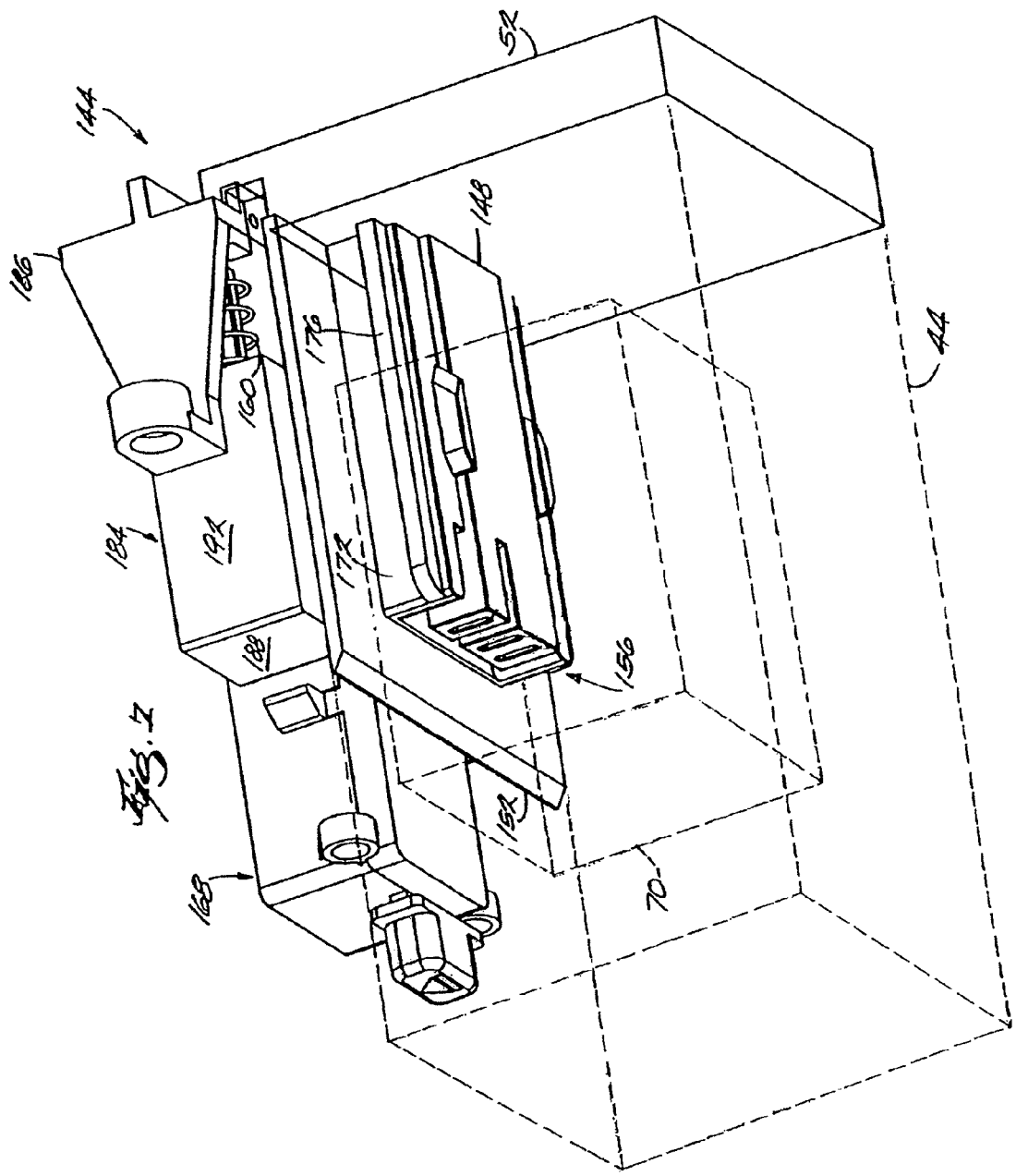
FIG. 7 is a bottom perspective view of the electrical connector assembly shown in FIG. 6.

As shown in FIGS. 6 and 7, the housing 24 supports an electrical connector assembly 144 positioned in the receptacle 44. The connector assembly 144 includes a support portion 148, a body portion 152, a terminal assembly 156, biasing members 160, the bumper 52, and a locking assembly 168. In the illustrated construction, the support portion 148 and the terminal assembly 156 move within the receptacle 44 relative to the housing 24, in a direction parallel to the insertion axis 68 (see FIG. 3), upon the insertion and the ejection of the battery 70 into and out of the receptacle 44, respectively. In part, this movement accommodates batteries of different sizes.

As shown in FIG. 7, the support portion 148 of the connector assembly 144 is substantially similar to the support portion 116 of the power tool 71 (see FIG. 5) with which the battery 70 is normally used. The support portion 148 includes grooves 172 and protrusions 176 which extend parallel to the insertion axis 68 (see FIG. 3). The grooves 172 and protrusions 176 of the connector assembly 144 are complementary to the grooves 104 and rails 108 of the battery 70 and, therefore, support the battery 70 on the support portion 148.

The terminal assembly 156 is mounted on the support portion 148 and is electrically connectable to the battery terminal assembly 84 to connect the battery cells to the electrical circuit 28. In the illustrated construction, the terminal assembly 156 is movable with the support portion 148 relative to the housing 24.

Figure 8:
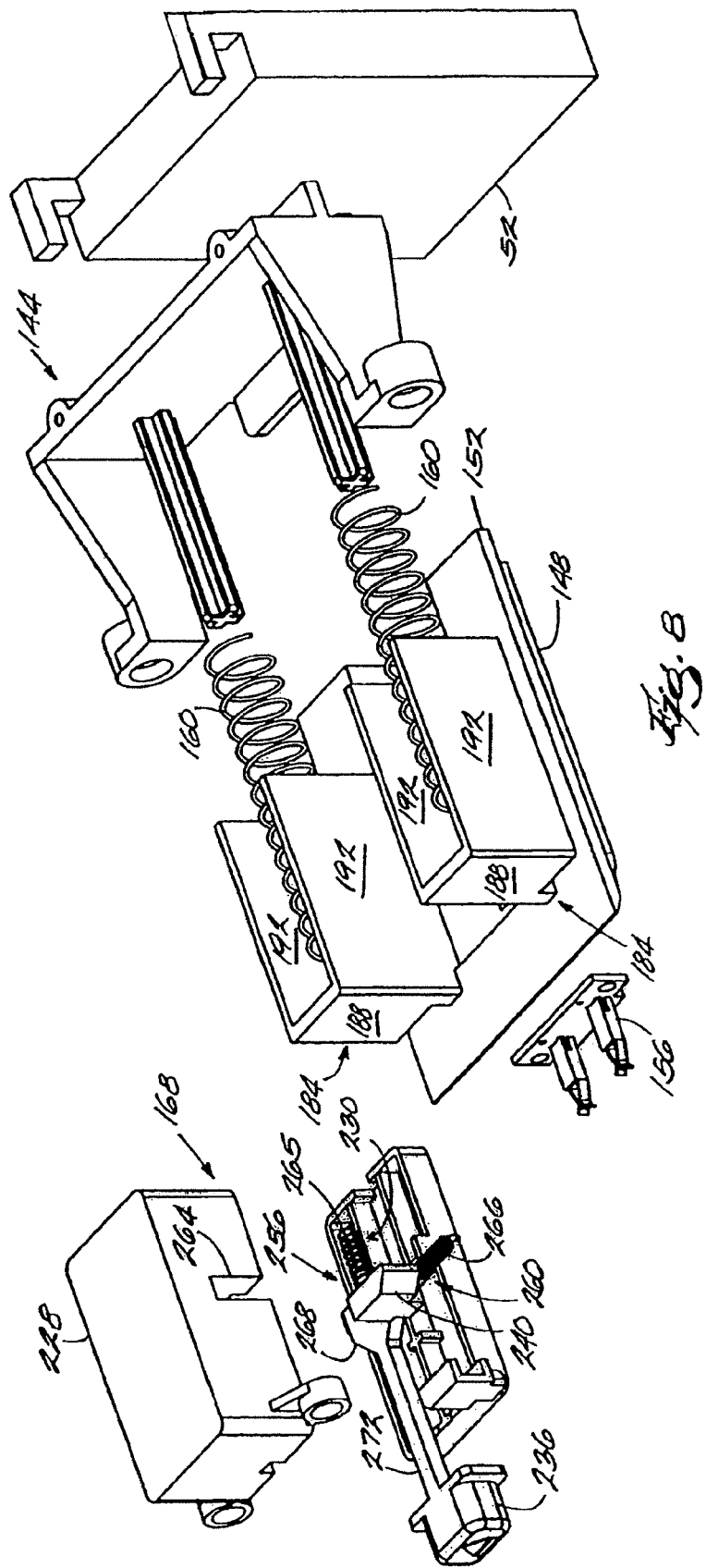
FIG. 8 is an exploded top perspective view of the electrical connector assembly shown in FIG. 6.

As shown in FIGS. 7 and 8, the support portion 148 is mounted on the underside of the body portion 152 and guide channels 184 are provided on the body portion 152. The biasing members 160 are positioned in the channels 184. The channels 184 maintain the alignment of the biasing members 160 during compression and expansion of the biasing members 160. The biasing members 160 bias the support portion 148 and the body portion 152 (and the battery 70, when supported on the support portion 148) toward the open end 56 of the receptacle 44. In the illustrated construction, the biasing members 160 are compression springs. In other constructions (not shown), the biasing members 160 may be other types of springs or other structure, such as, for example, elastomeric material.

In the construction shown in FIG. 8, the locking assembly 168 locks the support portion 148, the body portion 152, and the attached battery 70 in an axial position relative to the housing 24. The locking assembly 168 includes a housing 228, a biasing assembly 230, an actuator 236, and locking protrusions 240 (one shown). The locking assembly 168 has at least one locked condition (shown in FIG. 6), in which the support portion 148 and attached battery 70 are locked in an axial position relative to the housing 24, and an unlocked condition, in which the support portion 148 and attached battery 70 are axially movable relative to the housing 24.

The housing 228 defines (see FIG. 8) a first path 256, parallel to the insertion axis 68 and along which the actuator 236 travels, and a second path 260, generally perpendicular to the insertion axis 68 and along which the locking protrusions 240 travel. The housing 228 defines openings 264 (one shown) in both sides through which the locking protrusions 240 selectively protrude.

The biasing assembly 230 includes an actuator biasing member 265 and a locking protrusion biasing member 266. The actuator biasing member 265 lies in the first path 256 and biases the actuator 236 toward the open end 56 of the receptacle 44 and toward a position corresponding to a locked condition of the locking assembly 168. The locking protrusion biasing member 266 lies in the second path 260 and, in the illustrated construction, biases the locking protrusions 240 toward the retracted, unlocked position.

The actuator 236 controls movement of the locking protrusions 240. In the illustrated construction, the actuator 236 biases the locking protrusions 240 toward the locked position and allows the locking protrusions 240 to move to the unlocked position. The actuator 236 is positioned between the locking protrusions 240 and has a wide portion 268 and a narrow portion 272. The locking protrusion biasing member 266 biases the locking protrusion 240 inward toward the actuator 236. The locking protrusions 240 lie in the second path 260 and are operable to selectively extend out of the openings 264 (a locked position) and retract into the openings 264 (the unlocked position).

In the locked position, the wide portion 268 of the actuator 236 contacts the locking protrusions 240 and moves the locking protrusions 240 out of the openings 264 against the biasing force of the locking protrusion biasing members 266. In the locked position, the locking protrusions 240 prevent the end walls 188 of the guide channels 184 from moving forward of the locking protrusions 240, and, therefore, limit the movement of the support portion 148 and body portion 152 (and the battery 70, when supported on the support portion 148) toward the open end 56 of the receptacle 44. Thus, the support portion 148, the body portion 152, and the battery 70 are locked in an axial position relative to the electrical component housing 24. In the locked condition of the connector assembly 144, the support portion 148 is capable of moving in the space between the bumper 52 and the locking protrusions 240. This movement enables the electrical component 20 to receive different sized batteries 70 within the receptacle 44.

As the battery 70 is inserted, the support portion 148 is moved rearwardly until the openings 264 are uncovered. When this occurs, the actuator 236 moves forwardly and moves the locking protrusions 240 to extend out of the openings 264. The locking protrusions 240 extend into the axial path of the guide channels 184 and prevent the support portion 148 and the body portion 152 (and the battery 70, when supported on the support portion 148) from moving forwardly beyond the position of the locking protrusions 240.

To unlock the locking assembly 168, the actuator 236 is pressed inwardly. As the actuator 236 is depressed against the actuator biasing member 265, the wide portion 268 of the actuator 236 slides out of contact with the locking protrusions 240. The locking protrusion biasing members 266 move the locking protrusions 240 inwardly as the narrow portion 272 slides between the locking protrusions 240, and the locking protrusions 240 retract into the openings 264, eventually terminating contact with the end walls 188 (the unlocked position). This allows the support portion 148 to move towards the open end 56 of the receptacle 44 to place the battery 70 in a more readily accessible position for removal from the receptacle 44 (the ejected position). In the illustrated construction, the biasing members 160 move the support portion 148 and the battery 70 forwardly to the more accessible position.

In other constructions (not shown), the locking assembly 168 may be a ratchet-type locking assembly having more than one axially-spaced locked position of the support portion 148 relative to the housing 24. As the battery is inserted, the support portion 148 may be moved through the locked positions to the most appropriate locked position based on, for example, the length of the battery 70.

In other constructions (not shown), the actuator and the locking protrusion may cooperate in another manner such as through cooperating structure, such as, for example, a pin and a groove.

In other constructions, for example, the actuator and the locking protrusion may operate in a different manner, such as, the actuator may move the locking protrusion to the unlocked position and the actuator may allow the locking protrusion to move to the locked position.

In other constructions (not shown), the actuator 236 may move in a different manner, such as, for example, vertically, laterally, or pivotally, to allow movement of and/or to move the locking protrusions 240 between the locked position and the unlocked position.

In other constructions (not shown), the locking protrusions 240 may move in a different manner, such as, for example, vertically, axially, or pivotally, between the locked position and the unlocked position.

Figure 9:
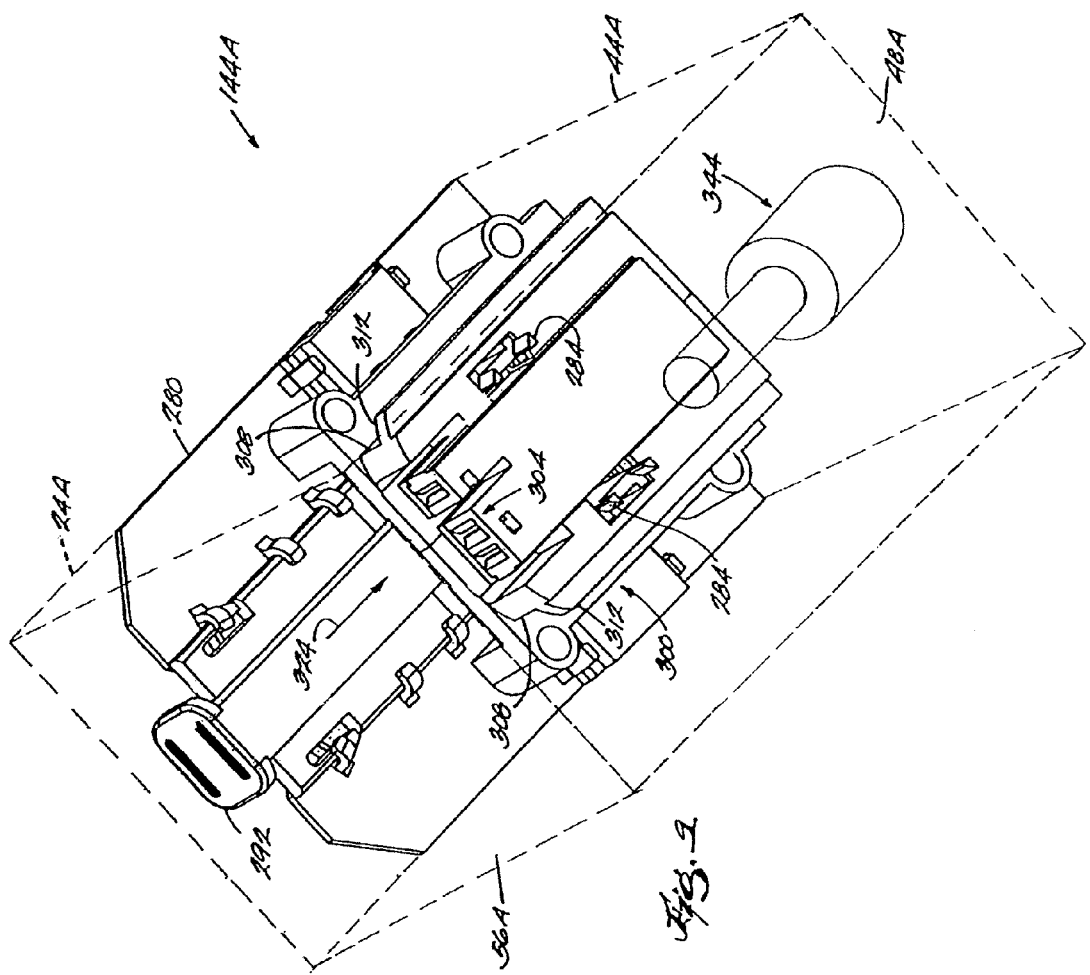
FIG. 9 is a bottom perspective view of an alternative construction of an electrical connector assembly for the electrical component.
Figure 10:
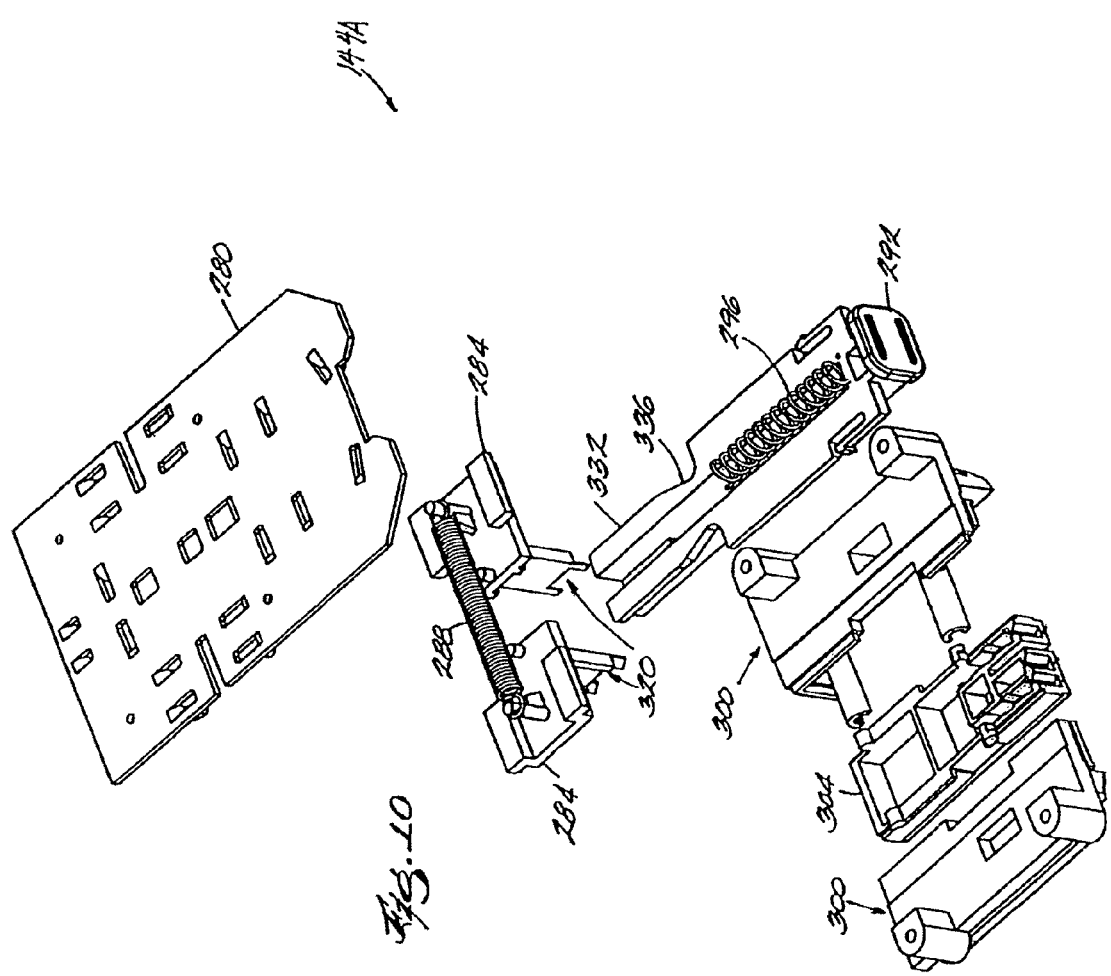
FIG. 10 is an exploded top perspective view of the electrical connector assembly shown in FIG. 9.

An alternative construction of an electrical connector assembly 144A is illustrated in FIGS. 9 and 10. Reference is made to the above discussion regarding the structure, operation, and alternatives of the electrical component 20 illustrated in FIGS. 1-8. Common elements are identified by the same reference numbers "A".

In the previously-described construction (FIGS. 6-8), the electrical connector assembly 144 is locked to the housing 24 and the battery 70 is supported on the connector assembly 144. In this alternative construction, the battery 70 is locked to the electrical connector assembly 144A. As shown in FIG. 9, the electrical connector assembly 144A is supported by the housing 24A and is positioned in the receptacle 44A. The electrical connector assembly 144A is operable to support the battery 70 in the receptacle 44A, lock the battery 70 relative to the housing 24A, and electrically connect the battery 70 to the electrical circuit 28.

In the illustrated construction, the connector assembly 144A includes a mounting plate 280, latching members or locking members 284, a locking member biasing member or spring 288 (see FIG. 10), an actuator 292, an actuator biasing member or spring 296 (see FIG. 10), a support portion 300, and a terminal assembly 304. The locking members 284, actuator 292, and support portion 300 are mounted to the mounting plate 280, and the terminal assembly 304 is mounted to the support portion 300. The mounting plate 280 is mounted to the housing 24A. The connector assembly 144A has a locked condition, in which the battery 70 is locked to the electrical connector assembly 144A to lock the battery 70 in a position relative to the housing 24A, and an unlocked condition, in which the battery 70 is movable relative to the electrical connector assembly 144A.

The support portion 300 of the connector assembly 144A is complementary to the battery support portion 88 so that the battery 70 is supportable on the support portion 300. The support portion 300 includes grooves 308 and protrusions 312 which extend parallel to the insertion axis 68A. The grooves 308 and protrusions 312 of the support portion 300 are complementary to the grooves 104 and rails 108 of the battery 70, and, therefore, the battery 70 is supported on the connector assembly 144A and electrically connected (by the terminal assembly 304) to the electrical circuit 28A when the battery 70 is inserted into the receptacle 44A.

As shown in FIG. 10, the spring 288 biases the locking members 284 inwardly toward each other. Each locking member 284 includes a recess 320, which receives one of the locking tabs 92 (see FIG. 5) of the battery 70 as the battery 70 is inserted into the receptacle 44A and onto the support portion 300. The battery 70 locks to the electrical connector assembly 144A when the locking tabs 92 engage the recesses 320.

The actuator 292 of the electrical connector assembly 144A is positioned between the locking members 284 and travels along a path 324 parallel to the insertion axis 68. The actuator 292 has a wide portion 332 and a narrow portion 336 positionable between the locking members 284. The actuator 292 is biased to a position corresponding to a locked condition of the connector assembly 144A (and to the locked position of the locking members 284) by the actuator spring 296. When the actuator 292 is in the position corresponding to the locked condition, the wide portion 332 of the actuator 292 is between the locking members 284, and the locking members 284 are biased laterally outwardly to engage the locking tabs 92 of the battery 70.

When the actuator 292 is depressed, the narrow portion 336 is positioned between the locking members 284. The locking members 284 move inwardly under the biasing force of the spring 288 to disengage from the locking tabs 92 of the battery 70 (the unlocked position of the locking members 284 and the unlocked condition of the connector assembly 144A).

The terminal assembly 304 of the connector assembly 144A is mounted to the support portion 300 and is electrically connected to the electrical circuit 28A. The terminal assembly 304 is connectable to the battery terminal assembly 84 to connect the battery 70 to the circuit 28A.

As shown in FIG. 9, a biasing member or ejector 344 is supported on the closed end 48A of the receptacle 44A. The ejector 344 is oriented generally parallel to the insertion axis 68 and is preferably a spring loaded cylinder. The ejector 344 contacts the rear of the battery 70 as the battery 70 is inserted into the receptacle 44A and exerts a biasing force on the rear of the battery 70 toward the open end 56 of the receptacle 44A. As the battery 70 is inserted into the receptacle 44A, the ejector 344 is compressed until the battery 70 is locked to the connector assembly 144A. When the battery 70 is unlocked from the connector assembly 144A, the biasing force of the ejector 344 moves the battery 70 toward the open end 56A to a more accessible position (the ejected position).

Figure 11:
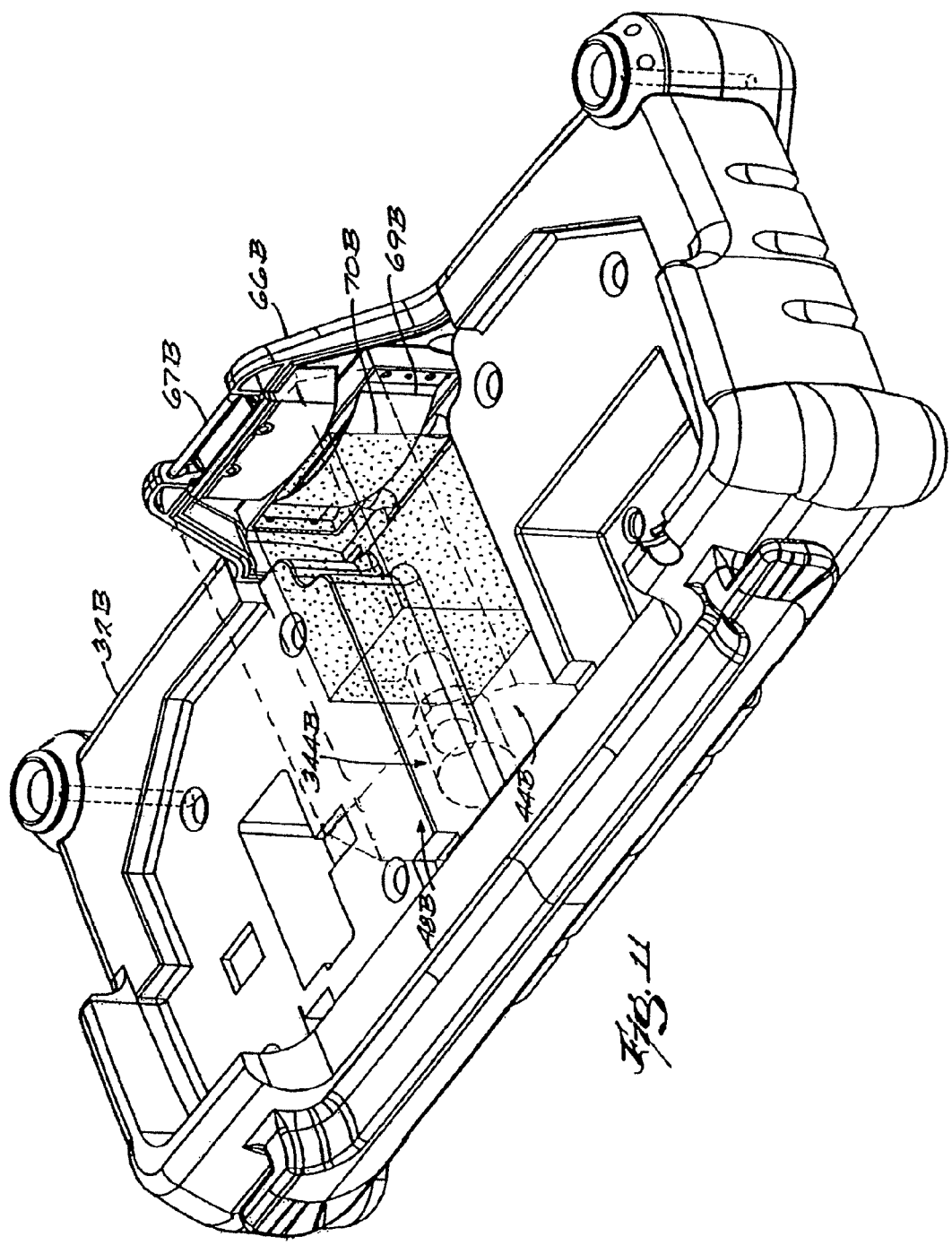
FIG. 11 is a perspective view of an alternative construction of a biasing assembly for the electrical component.

An alternative construction of a portion of an electrical component 20B is illustrated in FIG. 11. Reference is made to the above discussion regarding the structure, operation, and alternatives of the electrical component 20 illustrated in FIGS. 1-10. Common elements are identified by the same reference numbers "B".

As shown in FIG. 11, a separate locking assembly, such as the locking assembly 168 or 168A, described above, is not provided. In this construction, the cover 66B is used to lock the battery 70 to the electrical component 20B.

In this construction, the cover 66B includes the cover biasing member 69B, which engages the battery 70 and biases the battery 70 rearwardly into the receptacle 44B as the cover 66B is closed. The ejector 344B contacts and exerts a forward biasing force on the rear of the battery 70. When the latch 67B is engaged, the battery 70 is locked in a position relative to the housing 24B.

In FIGS. 1-11 and in the above description, a slide-on type power tool battery 70 is illustrated and described with respect to the electrical component. It should be understood that other battery types, such as, for example, a tower type power tool battery 72 (shown in FIG. 12) or a battery for another piece of electrical equipment (not shown), can be utilized with the electrical component 20.

Figure 12:
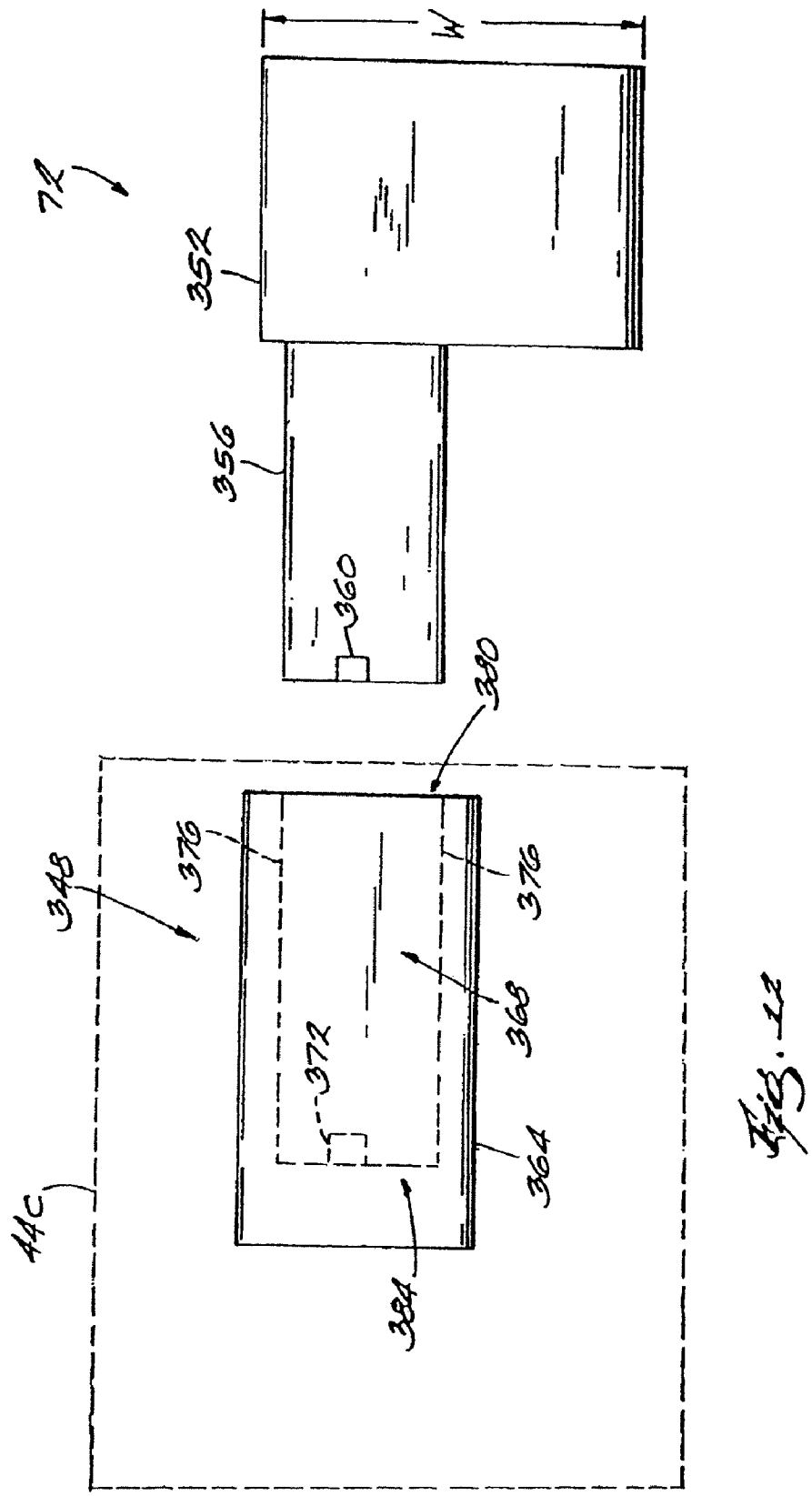
FIG. 12 is a side elevation view of a battery and an alternative construction of a support portion for the electrical component.

An alternative construction of a portion of an electrical component 20C is illustrated in FIG. 12. Reference is made to the above discussion regarding the structure, operation, and alternatives of the electrical component 20 illustrated in FIGS. 1-11. Common elements are identified by the same reference numbers "C".

As shown in FIG. 12, the electrical component 20C includes a tower support portion 348, replacing the slide-on power tool support portion 148 and 300 in the above-described constructions, to receive the tower power tool battery 72. The battery 72 includes a base portion 352, a tower portion 356, and a battery terminal assembly 360 and is usable with a tower power tool (not shown). The support portion 348 is mounted in the receptacle 44C and includes a housing 364 defining a cavity 368 and a support portion terminal assembly 372. The cavity 368 has side walls 376, an open end 380, and a closed end 384. The cavity 368 accommodates the tower portion 356 of the battery 72 to allow the tower portion 356 to insert into the open end 380 of the cavity 368. The support portion terminal 372 is mounted in the cavity 368 and is electrically connected to the electrical circuit 28C.

The tower power tool battery 72 is inserted into the cavity 368 and is supported by the tower power tool support portion 348. When the battery 72 is fully inserted into the cavity 368, the battery terminal assembly 360 contacts the support portion terminal 372, electrically connecting the battery 72 to the electrical circuit 28C.

The support portion 348 may be supported in the receptacle 44 in manners similar to the above-described constructions for the slide-on battery 70. In some constructions (similar to that shown in FIGS. 6-8), the support portion 348 may be movable in the housing 24C to accommodate different types and sizes of tower batteries, and the support portion 348 may be locked in an axial position relative to the housing 24C. In such constructions, the support portion 348 may be biased forwardly to, in the unlocked condition, move the battery 72 to a more accessible position (the ejected position). In some other constructions (similar to that shown in FIGS. 9-10 for the slide-on battery 70), the battery 72 may be locked to the support portion 348, and an ejector (not shown) may be provided to bias the battery 72 out of the receptacle 44C to a more accessible position (the ejected position).

Figure 13:
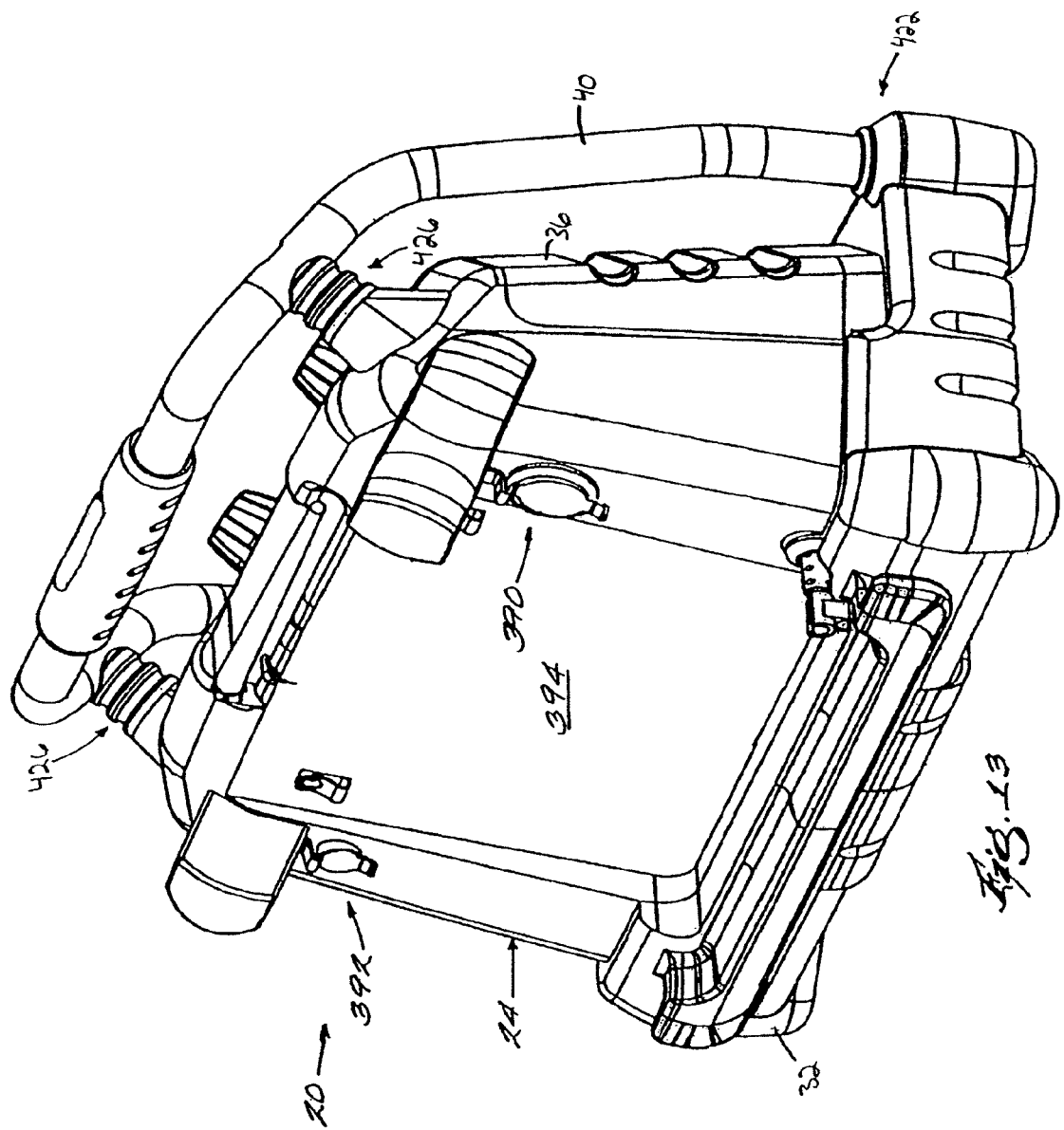
FIG. 13 is a rear perspective view of an alternative construction of an electrical component embodying the invention.

As shown in FIG. 13, the electrical component 20 also includes a DC outlet 390 for supplying power to DC electrical equipment, such as, for example, a cell phone, a cell phone charger, an auxiliary audio component, an automotive power accessory, etc. The power supply portion of the electrical circuit 28 supplies power to the DC outlet 390. The DC outlet 390 is electrically connected to the battery 70 and, therefore, is operable to electrically connect and supply power from the battery 70 to the electrical equipment. The DC outlet 390 is also connectable to the AC power source through the electrical circuit 28 to connect the electrical equipment to the AC power source. The electrical circuit 28 is protected by a double fuse design having a resettable thermal fuse and a replaceable fuse.

The electrical component 20 also includes an auxiliary plug 392 for connecting an auxiliary component (not shown), such as, for example, a tape player, a CD player or a MP3 player, to the audio circuit portion 29. The power amplifier portion of the electrical circuit 28 amplifies the input of the auxiliary component. The electrical circuit 28 thus provides a loop for an auxiliary component in which the power supply portion powers the auxiliary component and the power amplifier portion receives and amplifies the input from the auxiliary component.

Figure 14:
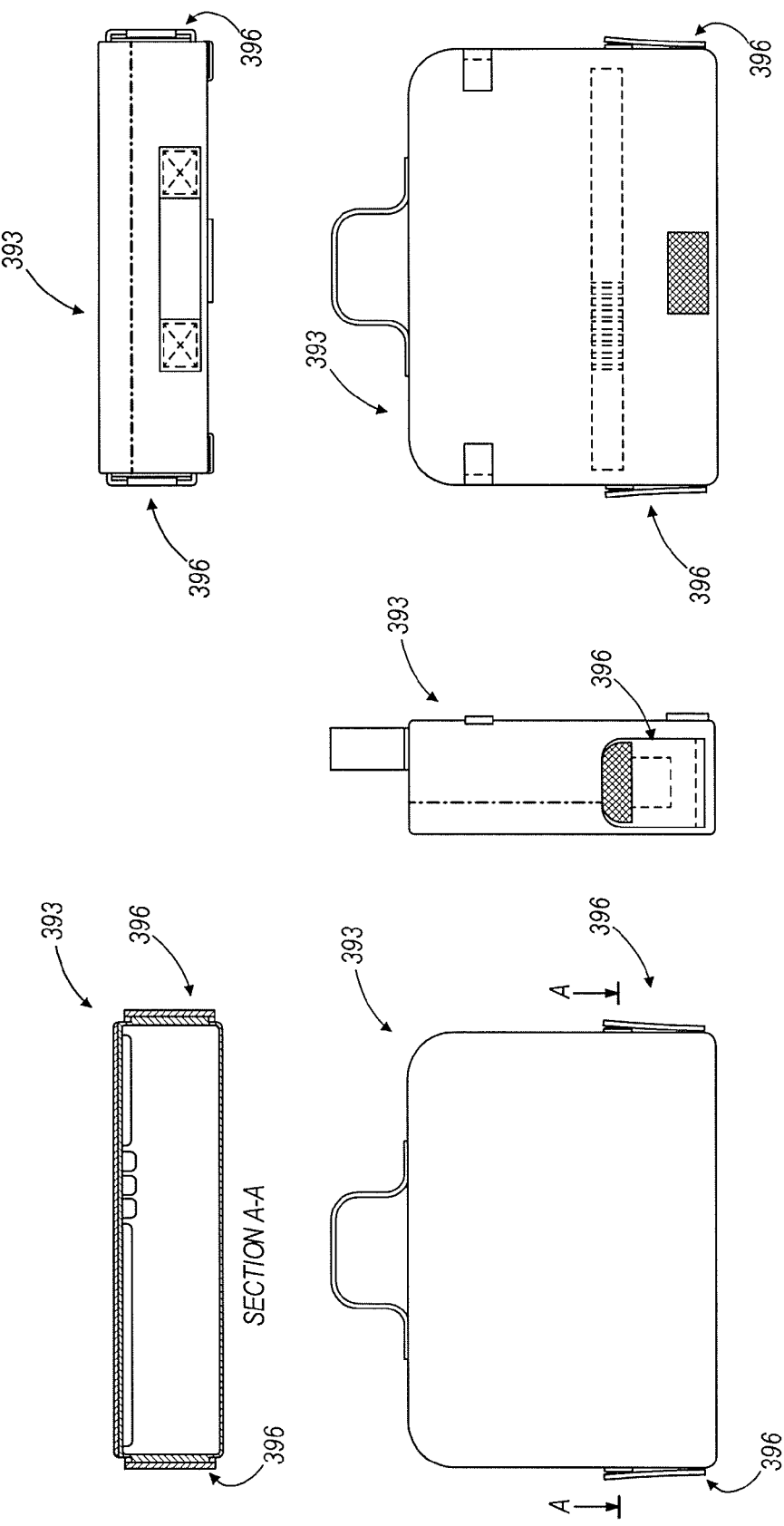
FIG. 14 are views of an accessory bag for use with the electrical component.

As shown in FIG. 14, the electrical component 20 also includes an accessory bag 393 selectively mountable in a rear well portion 394 (see FIG. 13) of the housing 24. The accessory bag 393 is selectively detachable and attachable to the electrical component 20, and items, such as, the DC electrical equipment and supplies, can be stored in the accessory bag 393. The accessory bag 393 includes openings 396 through which cords pass to connect auxiliary components in the accessory bag 393 to the DC outlet 390 and/or to the auxiliary plug 392. The opening 396 may be substantially closed (for example, by zippers or VELCRO® strips) during operation to substantially enclose the contents of the accessory bag 393.

Figure 15:
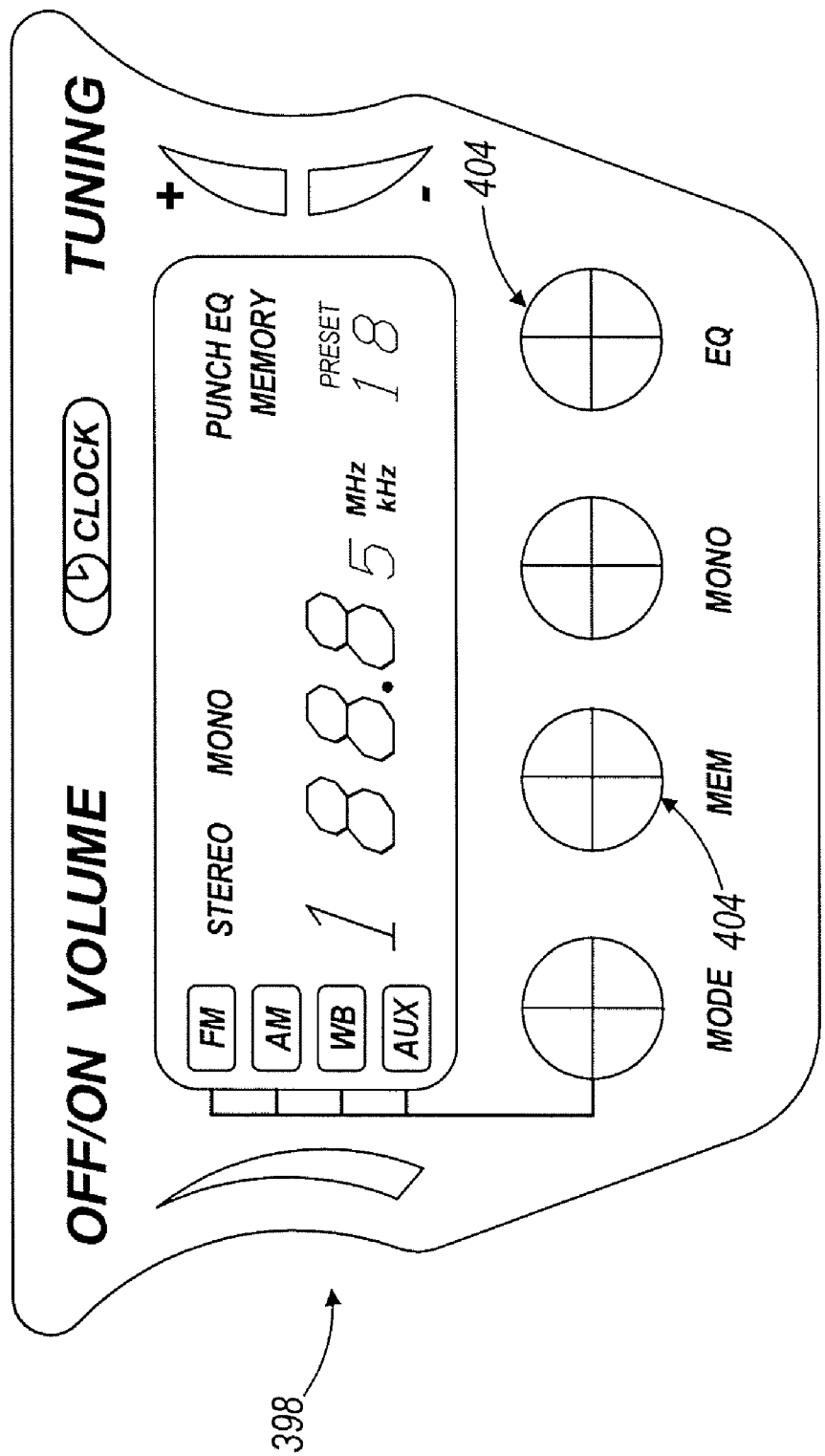
FIG. 15 is a front view of a display for the electrical component.

The electrical circuit 28 also includes (see FIG. 15) a display portion 398 positioned on the front of the electrical component 20. The display portion 398 is preferably a backlit LCD display capable of displaying the status and operating condition of the electrical component 20 and of the electrical circuit 28. For example, the display portion 398 displays the operating mode of the audio circuit portion 29 (i.e., AM, FM, AUX, etc.). If the audio circuit portion is operating in a radio mode, the display portion 398 displays the current station. The display portion 398 may also include a clock or other informational displays.

The electrical component 20 also includes (see FIGS. 1 and 15) a control portion 400 for controlling the operation and operating mode of the electrical component 20 and of the electrical circuit 28. The control portion 400 includes (see FIG. 1) adjustment knobs 402 for adjusting the volume and for tuning the radio. The control portion 400 also includes (see FIG. 15) control buttons 404 for controlling other operations, such as pre-set radio station selection, equalization setting, etc. Preferably, the electrical component 20 includes a "PUNCH EQ" feature having several pre-set equalization settings. The "PUNCH EQ" button 404 is a color lit button using different colors (red, yellow, green) representing the different equalization setting and to indicate the current equalization setting.

Referring to FIG. 17, an alternative construction of the electrical component 20 is illustrated. Reference is made to the above discussion regarding the structure, operation, and alternatives of the electrical component 20 illustrated in FIGS. 1-16. The electrical component 20 in this construction may not include a charging circuit portion to charge a battery 64. A separate battery charger 410 may be used with the electrical component 20. The charger 410 may be supported on the housing 24, in the accessory bag 393 or may be independently mountable in the rear well portion 394 of the housing 24 in a manner similar to the support of the accessory bag 393. The charger 410 may be mounted on the housing 24 in any location an in any manner. In the illustrated construction, the battery charger 410 includes a charger housing 414 providing a battery support portion 416 on which a battery 64 is supportable. A charging circuit (not shown) is supported by the charger housing 414 and is connectable to the battery 64 and to a power source (not shown). The charging circuit may be connected to the power source through an outlet on the electrical component 20 (i.e., the DC outlet 390 or an AC outlet (not shown) on the electrical component 20) or on the power cord for the electrical component 20 or through a power source outlet (i.e., a wall plug). In other constructions (not shown), the battery charger 410 may be connectable to the power source through cooperating terminal assemblies (not shown) on the battery charger 410 and on the electrical component 20.

In the illustrated construction, the electrical component 20 includes headed fasteners 418 which are received in openings (not shown) defined in the housing 414 of the battery charger 410 to connect the battery charger 410 to the electrical component 20. The openings may include a wide portion for receiving the head of a fastener 418 and a narrow slot portion into which the fastener 418 slides to prevent the fastener 418 from being removed from the opening to thereby prevent the battery charger 410 from being disconnected from the electrical component 20. The electrical component 20 and separate battery charger 410 provide a connectable housing assembly.

In some constructions, the charger 410 may be supported in the accessory bag 393, which is then mounted to the housing 24. In other constructions, the charger 410 may be slidably mounted to the housing 24 by a slot and projection connection (not shown). For example, one of the housing 24 and the charger 410 includes a slot and the other of the housing 24 and the charger 410 includes a projection. The slot and the projection are slidably engaged to mount the charger 410 to the housing.

For example, the charger 410 can be connected to the housing 24 in a manner similar to the manner in which a battery 70 is connected to a power tool, such as a groove and rail connection. In such a groove and rail connection, one of the housing 24 and the charger 410 include a groove, such as the groove 104 on the battery 70 (see FIG. 5), and the other of the housing 24 and the charger 410 include a rail, such as the rail 116 of the power tool (see FIG. 5). The groove and rail of the housing 24 and the charger 410 are engageable to mount the charger 410 to the housing 24.

In constructions in which the charger 410 is slidably mounted to the housing 24, one of the housing 24 or the battery charger 410 may include a locking device (not shown)

for selectively locking the charger 410 to the housing 24. A snap locking device may be used when the charger 410 is mounted to the housing 24 in any manner.

The battery charger 410 includes a charger housing 414 providing a battery support portion 416 on which a battery 64 is supportable. A charging circuit (not shown) is supported by the charger housing 414 and is connectable to the battery 64 and to a power source (not shown). The charger 410 may include a power cord (not shown) that is electrically connected to the charging circuit and that extends from the charger housing 414 and is connectable to the power source through an outlet on the electrical component 20 (i.e., the DC outlet 390 or an AC outlet (not shown) on the electrical component 20.

In other constructions (not shown), the battery charger 410 may be connectable to the power source through cooperating terminal assemblies (not shown) on the battery charger 410 and on the electrical component 20. For example, the housing 24 and the charger 410 may include complementary plug connectors (not shown) that engage each other when the charger 410 is connected to the housing 24, thereby electrically connecting the battery charging circuit to the power source.

In yet other constructions, the charger 410 may be connected to the power source by mounting the charger 410 to the housing in a manner similar to mounting a battery to the charger 410. In such constructions, the housing 24 and the charger 410 may have a groove and rail type connection and include terminals to electrically connect the charger 410 to the power source.

The electrical component 20 may accommodate different types of battery chargers and, therefore, be capable of charging different types and sizes of batteries, including slide-on power tool batteries 64 (with the battery charger 410 and supported on the battery support portion 416), other types of slide-on power tool batteries (not shown, with another type of slide-on battery charger (not shown)) and tower power tool batteries (with a tower battery charger (not shown)) and batteries for other electrical components and/or other electrical equipment (with respective compatible battery chargers (not shown)).

The electrical component 20 may also accommodate a plurality of battery chargers and, therefore, be capable of charging a plurality of batteries. The battery chargers may be different types of battery charger, thereby allowing various types and sizes of batteries to be charged by the electrical component 20.

Figure 17A:
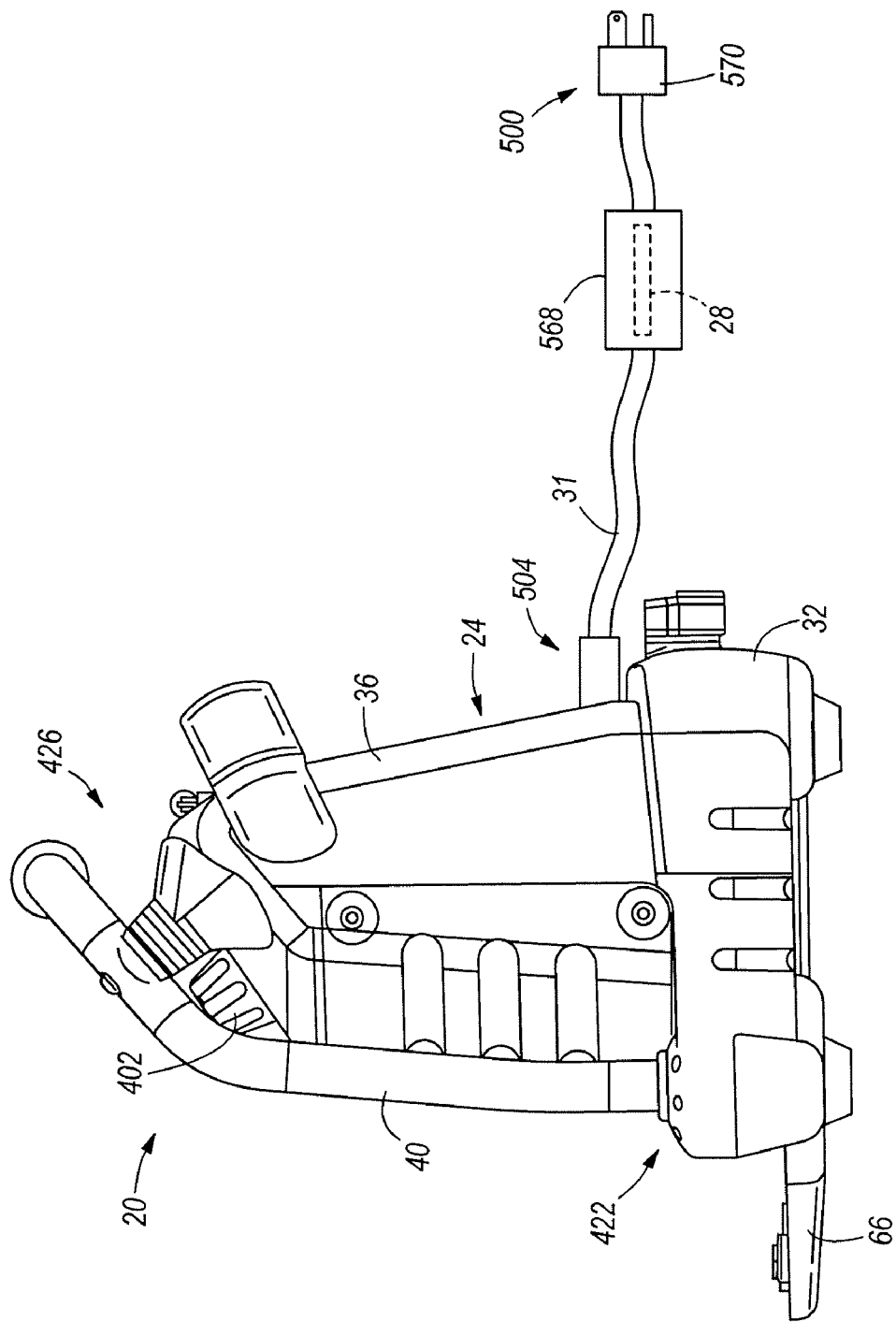
FIG. 17A is a side view of another alternative construction of an electrical component, shown with a battery charging circuit positioned along and in series with a power cord.

Referring to FIG. 17A, another alternative construction of the electrical component 20 is illustrated. Reference is made to the above discussion regarding the structure, operation, and alternatives of the electrical component 20 illustrated in FIGS. 1-16. The electrical component 20 in this construction may not include a charging circuit within the housing 24 to charge a battery 64. A separate battery charging circuit may be used with the electrical component 20 and may be positioned along the power cord 31 rather than within the housing 24 of the electrical component 20.

In the illustrated construction, the battery charging circuit 28 is housed within a circuit housing 568 and may be integrally formed with the power cord 31 or may be selectively connectable to the cord 31 via a plug-type connection (not shown but similar to the wall plug 500) or a quick-lock connection (not shown but similar to the quick-lock connection 504 discussed above). The battery charging circuit 28 may be positioned anywhere along the power cord 31, and the circuit housing 568 may be connectable to and supportable by the housing 24 of the electrical component 20 (in a manner similar to the manners discussed above with respect to the alternative construction illustrated in FIG. 17). In other constructions or in other operations, the circuit housing 568 may not be connected to the housing 24 of the electrical component 20, but may simply be on some other surface, such as, for example, the ground, a work bench/table, etc., with the electrical component 20.

In the illustrated construction, the battery charging circuit 28 is electrically connected to the electrical component 20 via the power cord 31 and is electrically connected to a battery 70 positioned within the receptacle 44 of the electrical component 20 to charge the battery 70.

In some constructions (not shown), a battery support portion (not shown) and a battery terminal (not shown) may be supported by the circuit housing 568 to support a battery(s) 70 and electrically connect the battery(s) 70 to the charging circuit 28 to charge the battery(s) 70.

In constructions in which the power cord 31 is connected to the housing 24 of the electrical component 20 via a plug or a quick-lock connection 504 and the battery charging circuit 28 and housing 568 are integral with the power cord 31, the power cord 31 and the associated battery charging circuit 28 can be replaced or disconnected from the housing 24, for example in case of power cord 31 and/or battery charging circuit 28 damage, for storage purposes, for transportation purposes, for replacement of the power cord 31 with a different type of power cord, such as, for example, a regular power cord 31 without a battery charging circuit positioned along the power cord 31, etc. In other constructions in which the power cord 31 is connected to the housing 24 and to the battery charging circuit 28 via respective plug or quick-lock connections 504, the power cord 31 and the battery charging circuit 28 can be replaced or disconnected from each other and/or disconnected from the housing 24, for example, in case of power cord 31 and/or battery charging circuit 28 damage, for storage purposes, for transportation purposes, etc.

Figure 17B:
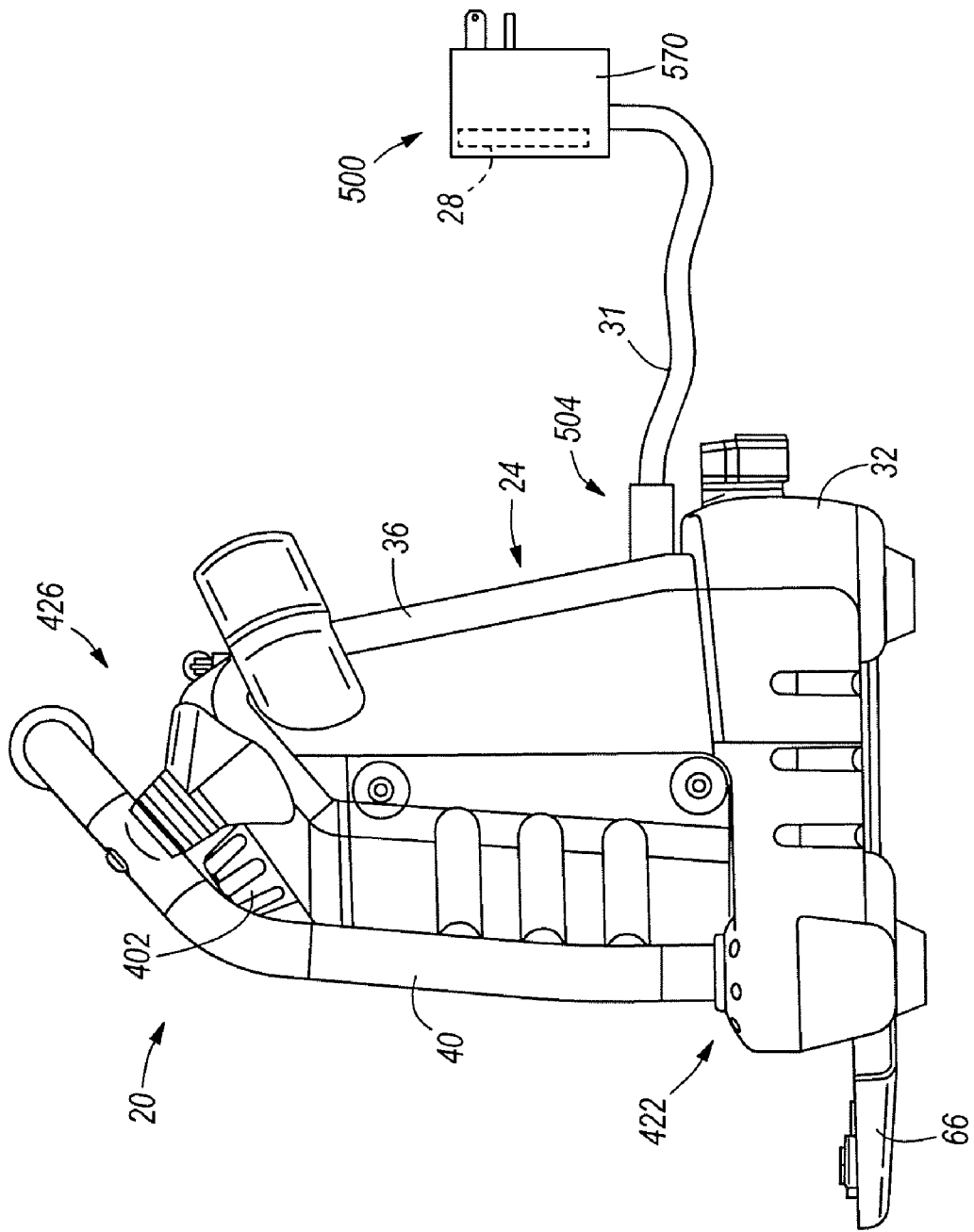
FIG. 17B is a side view of another alternative construction of an electrical component, shown with a battery charging circuit positioned in a wall plug of a power cord.

Referring to FIG. 17B, an alternative construction of the electrical component 20 is illustrated. Reference is made to the above discussion regarding the structure, operation, and alternatives of the electrical component 20 illustrated in FIGS. 1-17A. The electrical component 20 in this construction may not include a charging circuit within the housing 24 to charge a battery 64. A separate battery charging circuit 28 may be used with the electrical component 20 and may be positioned at the power source outlet or wall plug 500. The battery charging circuit 28 may be integrally formed with the wall plug 500 and housed within the wall plug housing 570 (see FIGS. 13 and 17A and 17B) or may be separately housed in a circuit housing (not shown) and selectively connectable to the wall plug 500 via a plug-type connection, a quick-lock connection 504, fasteners, or other manners of connection.

In the illustrated construction, the battery charging circuit 28 is electrically connected to the electrical component 20 via the power cord 31 and is electrically connected to a battery 70 positioned within the receptacle 44 of the electrical component 20 to charge the battery 70.

In other constructions (not shown), a battery support portion (not shown) and a battery terminal (not shown) may be integral with wall plug housing 570 and positioned at the wall plug 500 with the charging circuit 28 to support a battery(s) 70 and electrically connect the battery(s) 70 to the charging circuit 28 to charge the battery(s) 70.

The power cord 31 may be connected to the housing 24 of the electrical component 20 by either a quick-lock connection 504, as illustrated. In case of power cord 31 damage, charging circuit damage or wall plug 500 damage, etc., any number of the power cord 31, charging circuit 28 and the wall plug 500 can be replaced. Any number of the power cord 31, charging circuit 28 and wall plug 500 can be disconnected from the housing 24 for storage purposes, transportation purposes, etc. The power cord 31 may also be removed for storage and transportation purposes and reconnected after storage and transportation or may be replaced with a different type of power cord 31, such as, for example a regular power cord 31 that does not have a battery charging circuit positioned with the wall plug 500.

In other constructions, the power cord 31 may be hard wired with the electrical component 20.

Figure 18:
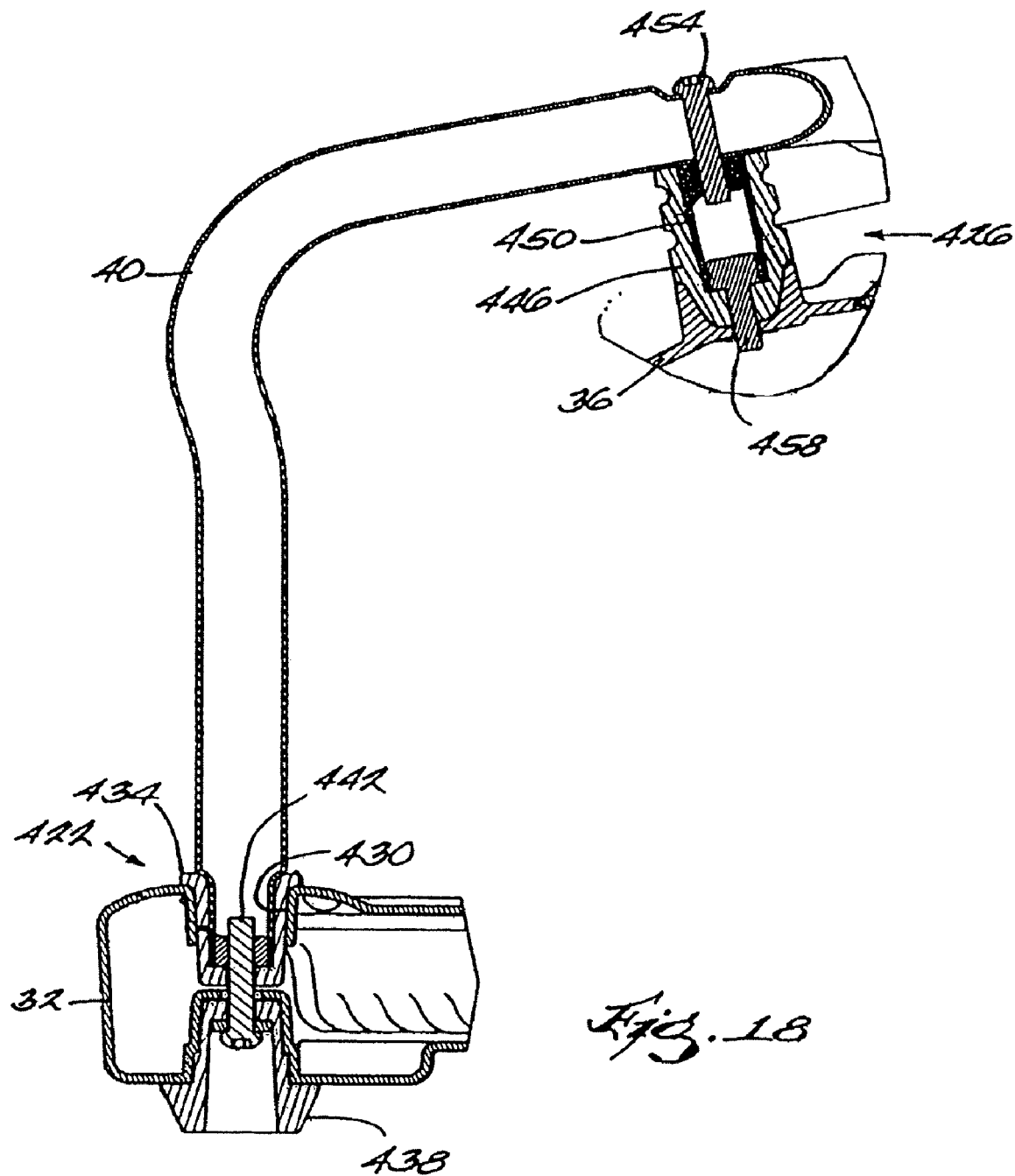
FIG. 18 is a side cross-sectional view of a portion of the electrical component shown in FIG. 1 illustrating the connection of the handle and the housing.
Figure 19:
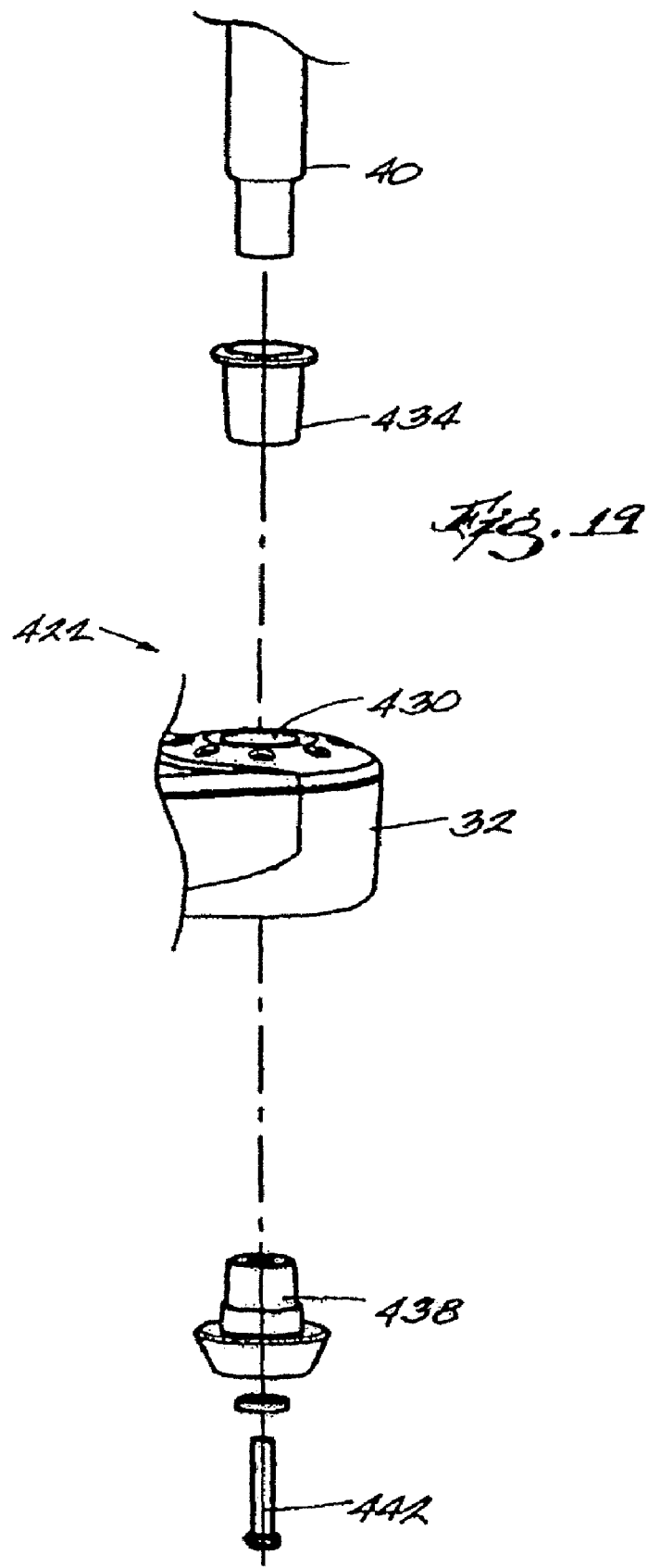
FIG. 19 is an exploded perspective view of a lower portion of the connection shown in FIG. 18.
Figure 20:
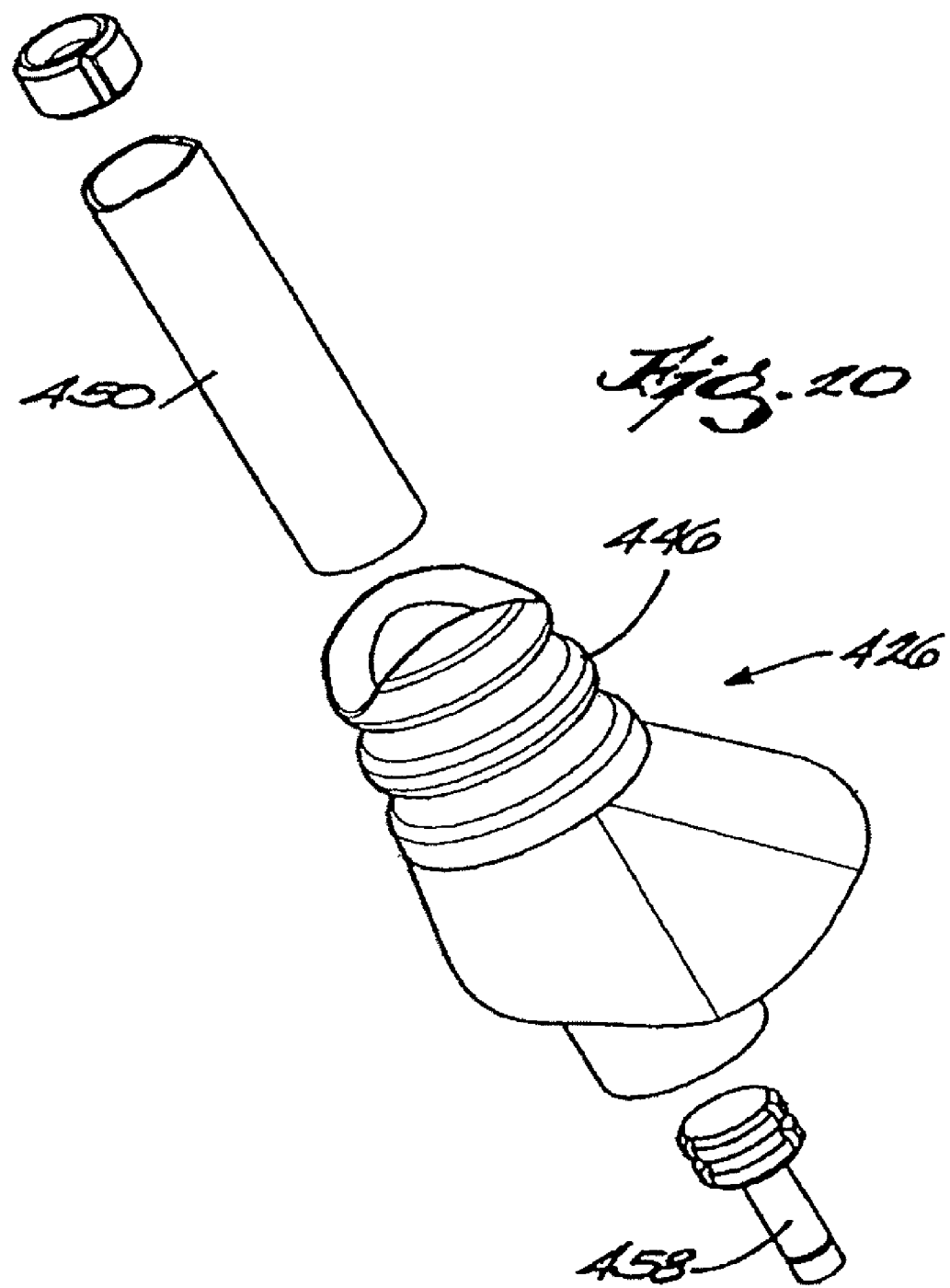
FIG. 20 is an exploded perspective view of an upper portion of the connection shown in FIG. 18.

FIGS. 18-20 illustrate the connection of the handle portion 40 to the base portion 32 and to the main portion 36 of the housing 24. In the illustrated construction, the handle portion 40 is connected to both the base portion 32 and the main portion 36 at two locations by base connecting assemblies 422 and main connecting assemblies 426, respectively. The base connecting assemblies 422 are similar to one another, and the main connecting assemblies 426 are similar to each other. Therefore, only one base connecting assembly 422 and one main connecting assembly 426 will be described in detail.

As shown in FIGS. 18-19, the base portion 32 defines a base aperture 430, and the base connecting assembly 422 includes an upper insert 434 and a lower insert 438 received in the base aperture 430. A threaded member 442 connects the lower insert 438 to one end of the handle portion 40 and to the upper insert 434 so that the handle portion 40 is flexibly mounted to the base portion 32.

As shown in FIGS. 18 and 20, the main connecting assembly 426 includes a flexible member 446 surrounding a tube 450. Fasteners 454 and 458 connect the handle portion 40 and the main portion 36, respectively, to the flexible member 446 and the tube 450 so that the handle portion 40 is flexibly mounted to the main portion 36. The main connecting assembly 426 absorbs shocks to the upper portion of the handle portion 40.

As discussed above and with reference to FIGS. 21-27, the electrical component 20 may be connected to an AC power source via the power cord 31. The power cord 31 includes a wall plug 500 at one end for engaging a complementary electrical outlet (not shown) and is connected to the housing 24 of the electrical component 20 at the other end. In the illustrated construction, the power cord 31 is connected to the housing 24 and to the electrical circuit 28 with a quick-lock connection 504. In other embodiments, the power cord 31 may be hard-wired to the electrical component 20 and electrically connected to the electrical circuit 28.

With reference to FIGS. 21-25, the electrical component 20 defines a support portion 508 that supports a circuit electrical connector 512. The support portion 508 supports the power cord 31, when connected to the housing 24. The support portion 508 defines at least one and, preferably, more than one housing thread 516.

The power cord 31 includes (see FIG. 24) a cord electrical connector housing 520 supporting a cord electrical connector 524 and a wall plug 500 connected by a conductive wire 528 to the cord electrical connector 524. The cord electrical connector 524 is electrically connectable to the circuit electrical connector 512, and the plug 500 is connectable to a power source, such as, for example, an electrical outlet, to electrically connect the electrical circuit 28 to the power source.

The power cord 31 is removably connectable to the housing 24 and also includes a mounting portion 532 supporting and surrounding the cord electrical connector housing 520 and the cord electrical connector 524. The mounting portion 532 is rotatable relative to the cord electrical connector housing 520 and relative to the cord electrical connector 524. The mounting portion 532 defines at least one and, preferably, more than one cord thread 536. The cord threads 536 are complementary to and engage with the housing threads 516.

The electrical component 20 and the power cord 31 include a locking assembly for positively locking the power cord 31 to the housing 24 of the electrical component 20. The locking assembly includes a first locking member or slider 540. In one construction (see FIGS. 23 and 25), the slider 540 is supported on the support portion 508. The slider 540 includes (see FIGS. 23 and 25) a locking protrusion 544. The slider 540 is slidable along an axis generally parallel to the axis of the support portion 508 between a locking position (shown in solid lines in FIG. 23) and an unlocked position (shown in phantom lines in FIG. 23). A spring (not shown) biases the slider 540 toward the locking position (in a direction indicated by arrow A).

The locking assembly also includes a second locking member or locking recess 548. In the construction illustrated in FIGS. 21-25, the mounting portion 532 also defines the locking recess 548. The locking recess 548 is engageable by the locking protrusion 544 of the slider 540 to prevent rotation of the mounting portion 532 relative to the support portion 508. The slider 540 and the recess 548 thus provide the locking assembly for the power cord 31 and the electrical component 20.

It should be understood that, in other constructions (not shown), a slider (similar to the slider 540) may be supported on the mounting portion 532, and a locking recess (similar to the locking recess 548) may be defined by the support portion 508. In such a construction, the slider on the mounting portion 532 engages the locking recess defined by the support portion 508 to positively lock the power cord 31 to the housing 24.

It should also be understood that, in other constructions (not shown), a slider (similar to the slider 540) may be supported on the housing 24, and a locking recess (similar to the locking recess 548) may be defined by the power cord 31. In such a construction, the slider on the housing 24 engages the locking recess defined by the power cord 31 to positively lock the power cord 31 to the housing 24.

Figure 22:
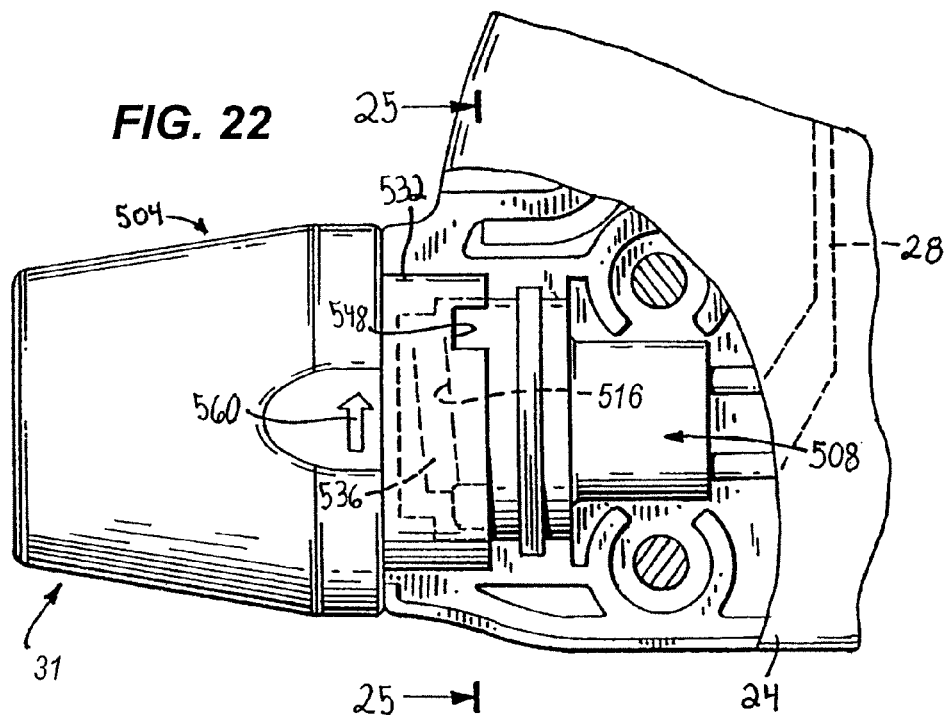
FIG. 22 is a partial side view of the electrical component and the power cord shown in FIG. 21, shown with a portion cut away.
Figure 23:
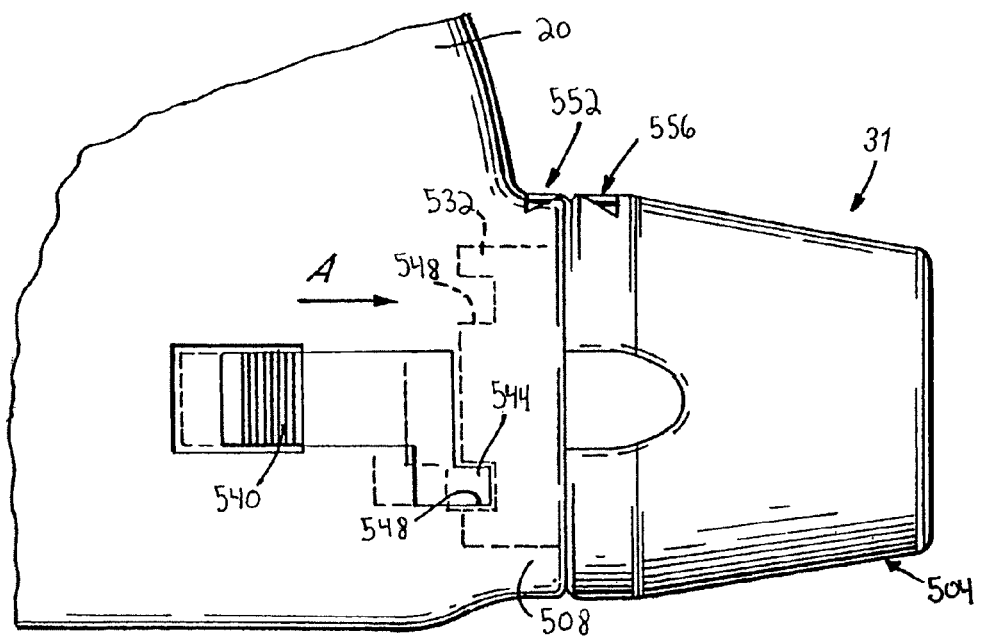
FIG. 23 is a partial side view of the electrical component and the power cord shown in FIG. 21.
Figure 24:
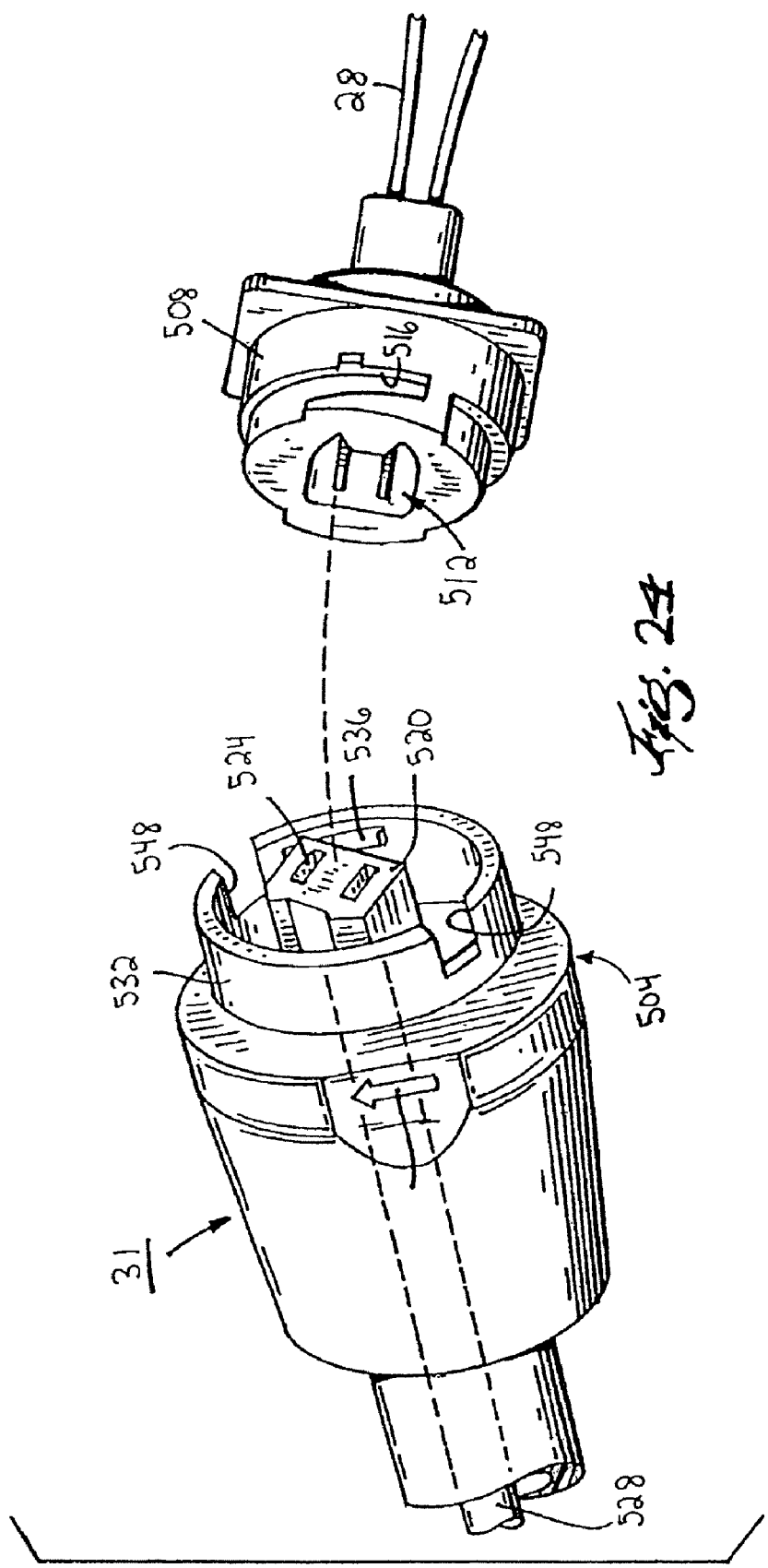
FIG. 24 is a perspective view of a portion of the electrical component and the power cord shown in FIG. 21 and illustrating the power cord disconnected from the electrical component.
Figure 25:
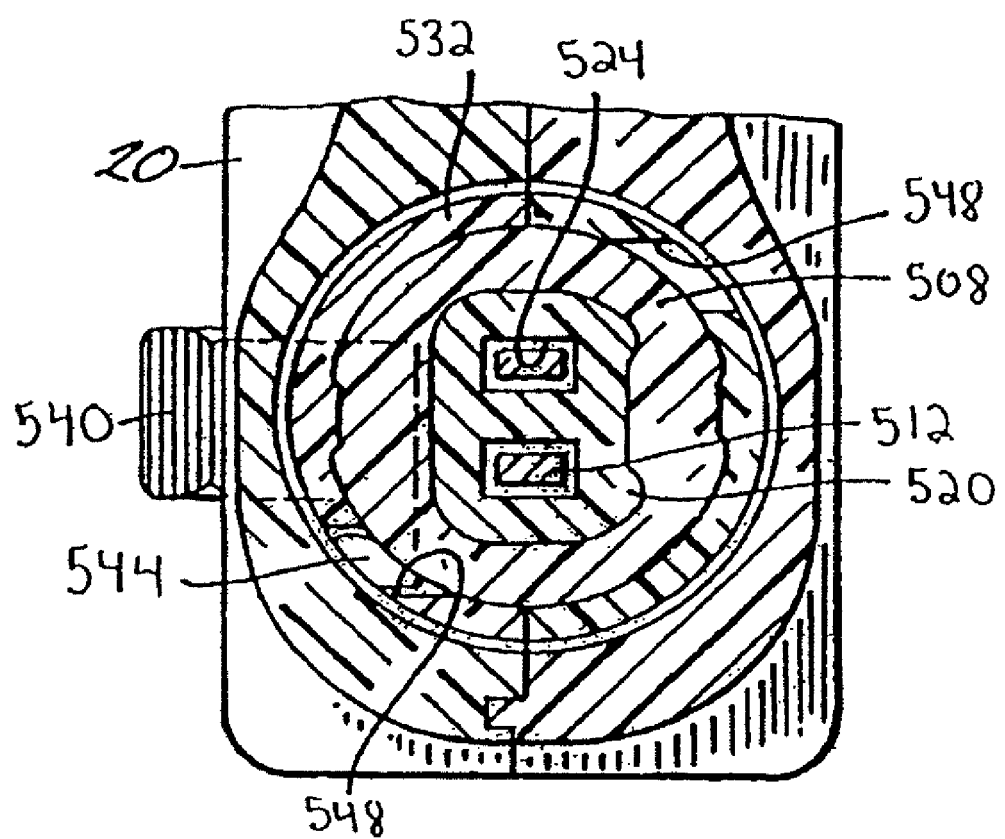
FIG. 25 is a cross-sectional view taken generally along line 25-25 in FIG. 22.

As shown in FIG. 23, indicator members or arrows 552 and 556 are formed on the support portion 508 and the mounting portion 532, respectively, to provide an indication to the operator as to the locked condition of the power cord 31. When the arrow 552 formed on the support portion 508 is aligned with the arrow 556 formed on the mounting portion 532, the power cord 31 is in a locked condition (the cord threads 536 are engaged with the housing threads 516). As shown in FIG. 22, a directional arrow 560 formed on the mounting portion 532 indicates the direction of rotation of the mounting portion 532 to the unlocked condition.

To mount the power cord 31, the slider 540 is moved to the unlocked position (in the direction opposite to arrow A in FIG. 23). The mounting portion 532 is inserted into the support portion 508, and the cord electrical connector 524 is connected to the circuit electrical connector 512. The mounting portion 532 is then rotated in the direction opposite to the arrow 560 (in FIG. 22) relative to the support portion 508 and relative to the electrical connectors 508 and 512 so that the threads 516 and 536 engage. When the arrows 552 and 556 are aligned, the power cord 31 has been rotated to the locked condition. The slider 540 is then released and moves under the force of the biasing spring to the locked position (in the direction arrow A in FIG. 23). The locking protrusion 544 engages in the locking recess 548 to prevent the mounting portion 532 from rotating relative to the support portion 508 and to prevent the threads 516 and 536 from being disengaged. In this manner, the power cord 31 is positively locked to the housing 24.

In the illustrated construction, the slider 540 is held in the unlocked position by an operator until the power cord 31 has been rotated to the locked condition. The operator then releases the slider 540, allowing the slider 540 to move to the locking position.

In other constructions (not shown), the insertion of the mounting portion 532 into the support portion moves the slider 540 to the unlocked position. The mounting portion 532 cooperates with the slider 540 to move the slider 540 to the unlocked position. In such constructions, once the power cord 31 is rotated to the locked condition, the slider 504 is allowed to move to the locking position.

To remove the power cord 31 from the housing 24, the mounting procedure is simply reversed. The slider 540 is moved to the unlocked position (in the direction opposite to arrow A in FIG. 23) so that the locking protrusion 544 is removed from the locking recess 548. The mounting portion 532 is rotated in the direction of the arrow 560 (in FIG. 22) relative to the support portion 508 so that the threads 516 and 536 disengage. The mounting portion 532 is then removed from the support portion 508, and the cord electrical connector 524 is disconnected from the circuit electrical connector 512. The removability of the power cord 31 facilitates replacement of a damaged cord or replacement of the power cord 31 with a different type of cord, such as, for example a battery charging power cord (discussed in greater detail below). The power cord 31 may also be removed for storage or transportation purposes and reconnected to the electrical component 20 after storage or transportation is complete. Also, the positive locking arrangement between the power cord 31 and the housing 24 ensures that the power cord 31 does not disengage from the housing 24, for example, if the electrical component 20 is hung by the power cord 31 (e.g., an operator holds the power cord 31 while lowering or lifting the electrical component 20).

Figure 26:
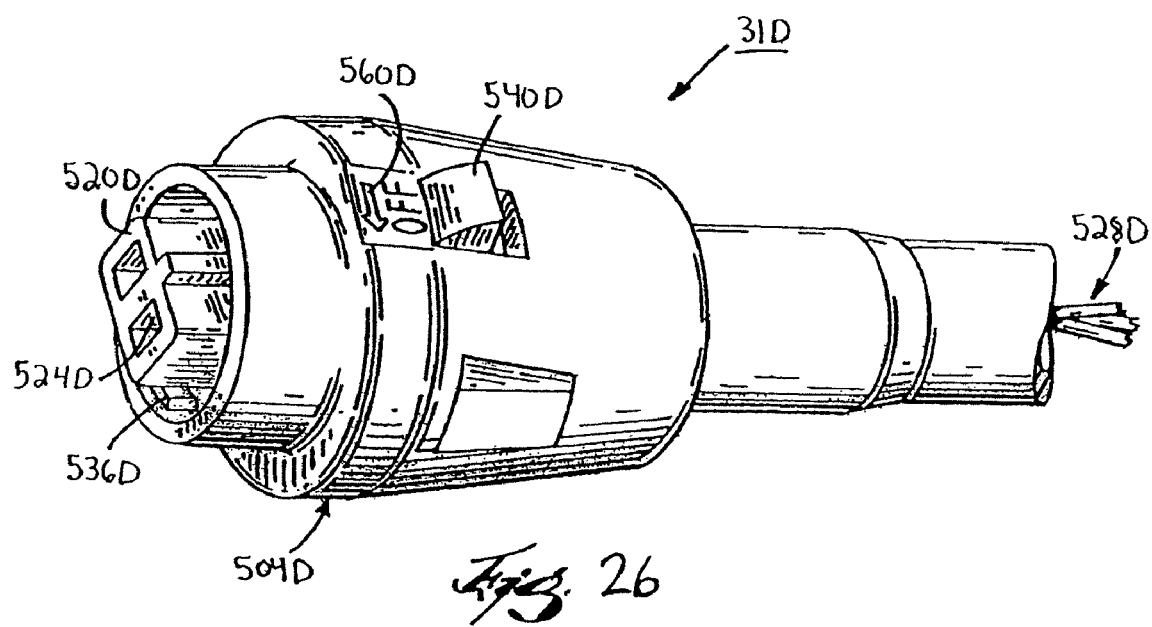
FIG. 26 is a perspective view of an alternative construction of the power cord shown in FIG. 21.
Figure 27:
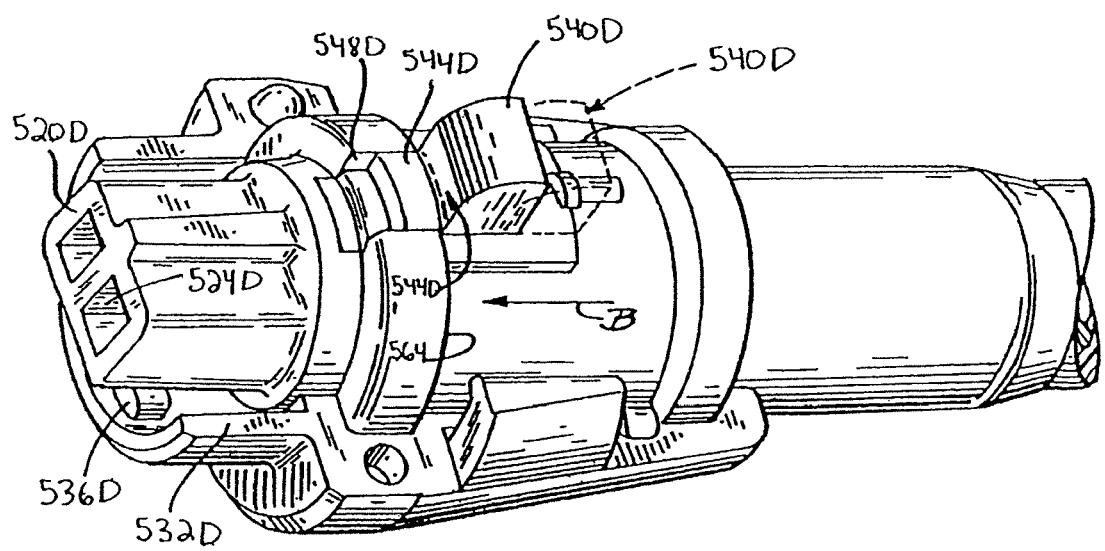
FIG. 27 is a perspective view of the power cord shown in FIG. 26 with portions cut away.

FIGS. 26 and 27 illustrate an alternative construction of a power cord 31D embodying the invention. Reference is made to the above discussion regarding the structure, operation, and alternatives of the electrical component 20 illustrated in FIGS. 1-25. Common elements are identified by the same reference numbers "D".

In the alternative construction, the locking assembly includes a first locking member or slider 540D supported on the mounting portion 532D of the power cord 31D. The slider 540D includes (see FIG. 27) a locking protrusion 544D. The slider 540D is slidable along an axis generally parallel to the axis of the mounting portion 532D between a locking position (shown in solid lines in FIG. 27) and an unlocked position (shown in phantom lines in FIG. 27). A spring (not shown) biases the slider 540D toward the locking position (in a direction indicated by arrow B).

The locking assembly also includes a second locking member or locking recess 548D formed on the cord electrical connector housing 520D of the power cord 31D. The locking recess 548D is engageable by the locking protrusion 544D of the slider 540D to prevent rotation of the mounting portion 532D relative to the cord electrical connector housing 520D and relative the support portion 508D (when the power cord 31D is connected to the housing 24). The slider 540D and the recess 548D thus provide the locking assembly for the power cord 31D and the electrical component 20.

To mount the power cord 31D, the slider 540D is moved to the unlocked position (in the direction opposite to arrow B in FIG. 27). The mounting portion 532D is inserted into the support portion (not shown but similar to the circuit electrical connector 508), and the cord electrical connector 524D is connected to the circuit electrical connector (not shown but similar to the circuit electrical connector 512). The mounting portion 532D is then rotated in the direction opposite to the arrow 560D (see FIG. 26) relative to the support portion and relative to the circuit electrical connector and the cord electrical connector 524D so that the housing threads (not shown but similar to the housing threads 516) and the cord threads 536D engage. When the arrows of the indicator (not shown) are aligned, the power cord 31D has been rotated to the locked condition. The slider 540D is then released and moves under the force of the biasing spring to the locking position (in the direction arrow B in FIG. 27). The locking protrusion 544D engages in the locking recess 548D to prevent the mounting portion 532D from rotating relative to cord electrical connector housing 520D and relative to the support portion and to prevent the cord threads 536D and the housing threads from being disengaged. In this manner, the power cord 31D is positively locked to the housing 24.

In the construction illustrated in FIGS. 26 and 27, the slider 540D is held in the unlocked position by engagement with a ridge 564 formed on the cord electrical connector housing 520D until the power cord 31D has been rotated to the locked condition. The slider 540D is then disengaged from the ridge 564, allowing the slider 540D to move to the locking position.

To remove the power cord 31D from the housing 24, the mounting procedure is simply reversed. The slider 540D is moved to the unlocked position (in the direction opposite to arrow B in FIG. 27) so that the locking protrusion 544D is removed from the locking recess 548. The mounting portion 532 is rotated in the direction of the arrow 560D (in FIG. 26) relative to the cord electrical connector housing 520D and relative to the support portion so that the housing threads and the cord threads 536D disengage. The mounting portion 532D is then removed from the support portion, and the cord electrical connector 524D is disconnected from the circuit electrical connector. The power cord 31D or a new power cord (not shown but similar to the power cord 31D) may then be connected to the electrical component 20 in the manner described above.

The invention thus provides, in some aspects, a power cord 31 or 31D which may be easily removed and replaced for storage purposes, for transportation purposes or if the power cord 31 or 31D is damaged. Also, in some aspects, the invention provides a power cord 31 or 31D which is positively locked to the housing 24 to ensure electrical and physical connection of the power cord 31 or 31D and the electrical component 20.

It should be understood that, in other constructions (not shown), the first locking member 540 or 540D may engage the locking recess 548 or 548D in a direction other than parallel to the axis, such as, for example, in a radial direction. Further, the first locking member 540 or 540D may be supported for movement other than sliding movement, such as, for example, pivotal movement.

Figure 28:
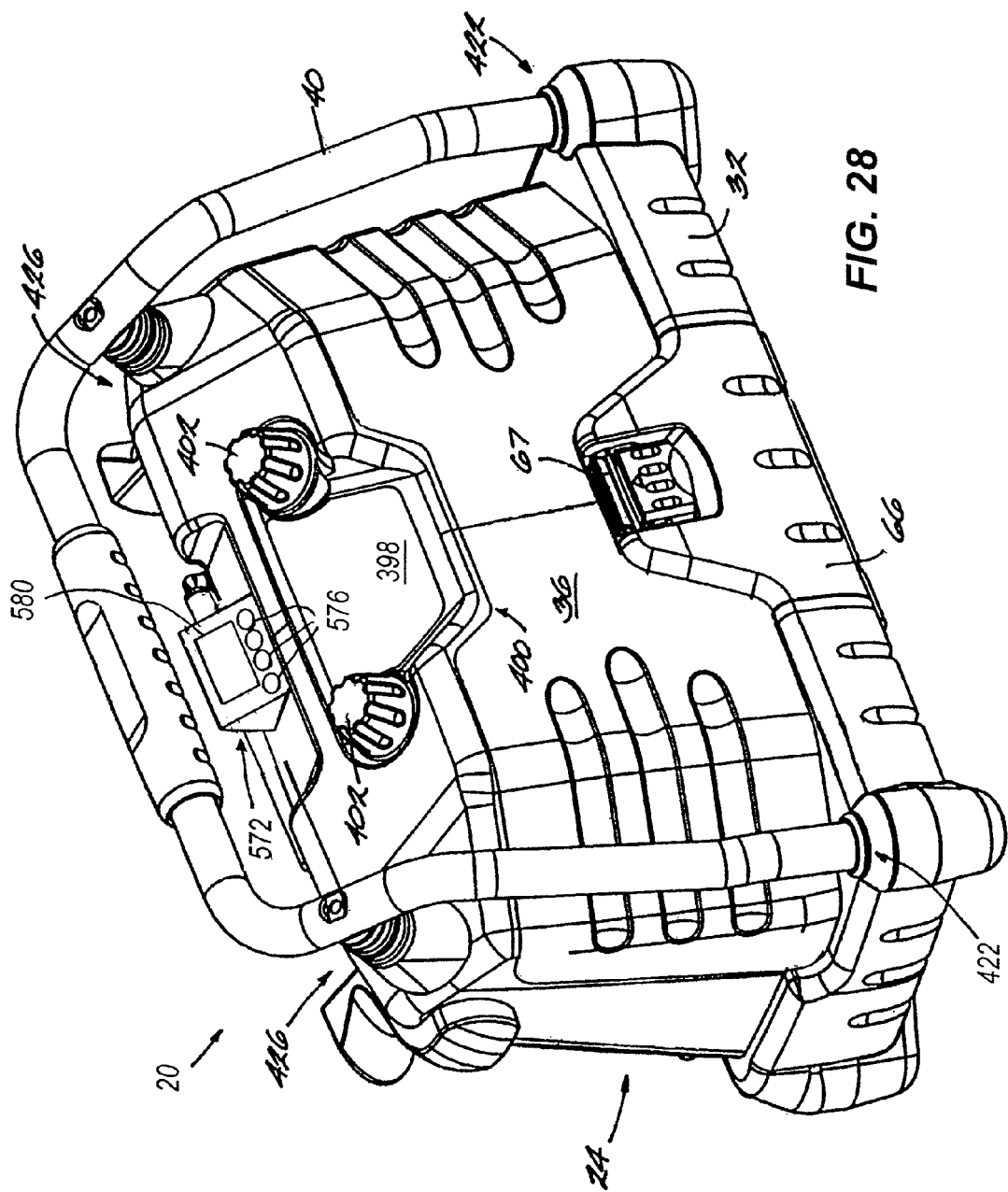
FIG. 28 is a front perspective view of the electrical component, shown with a MP3 player.
Figure 29:
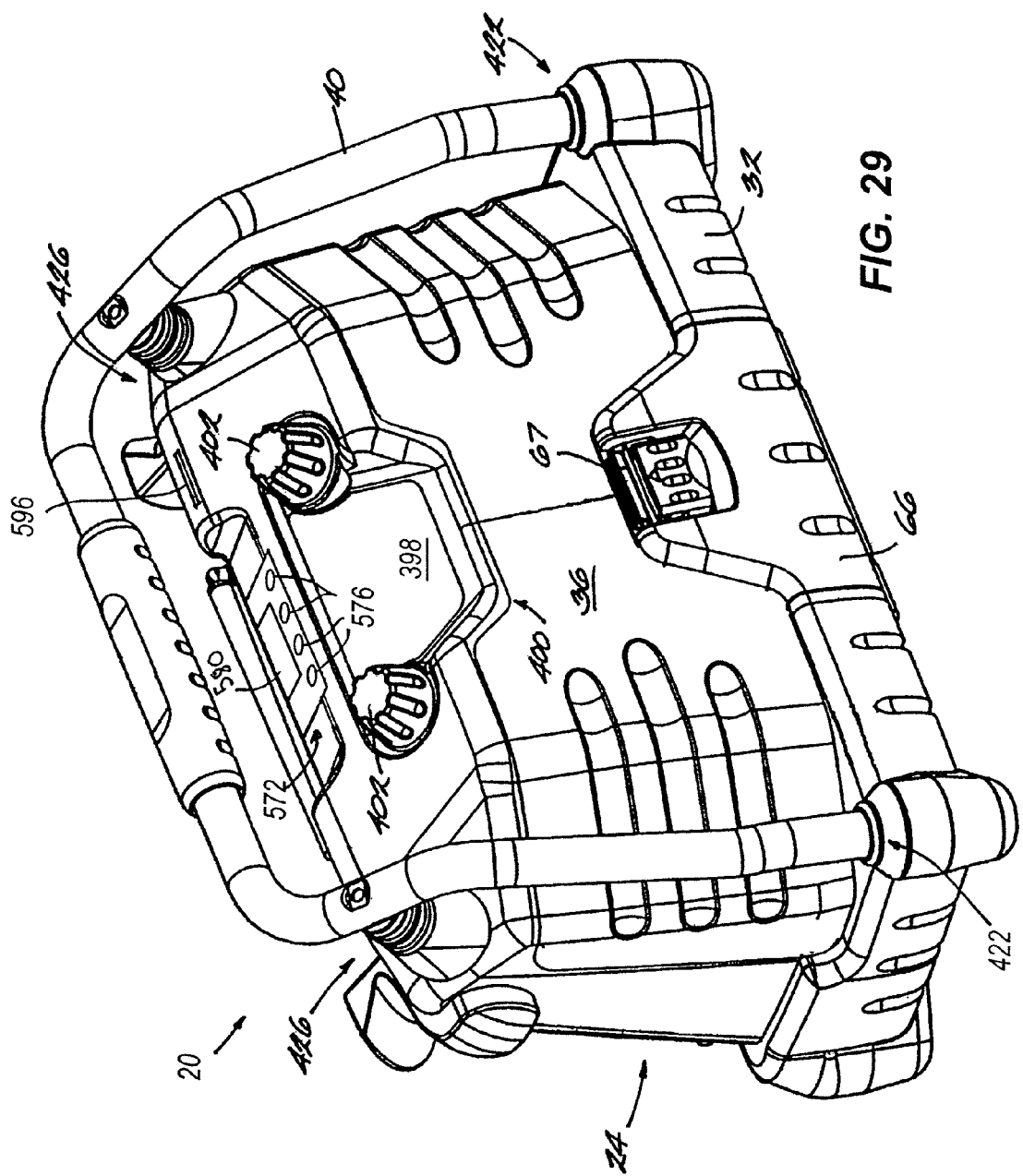
FIG. 29 is a front perspective view of the electrical component, shown with a MP3 player.
Figure 30:
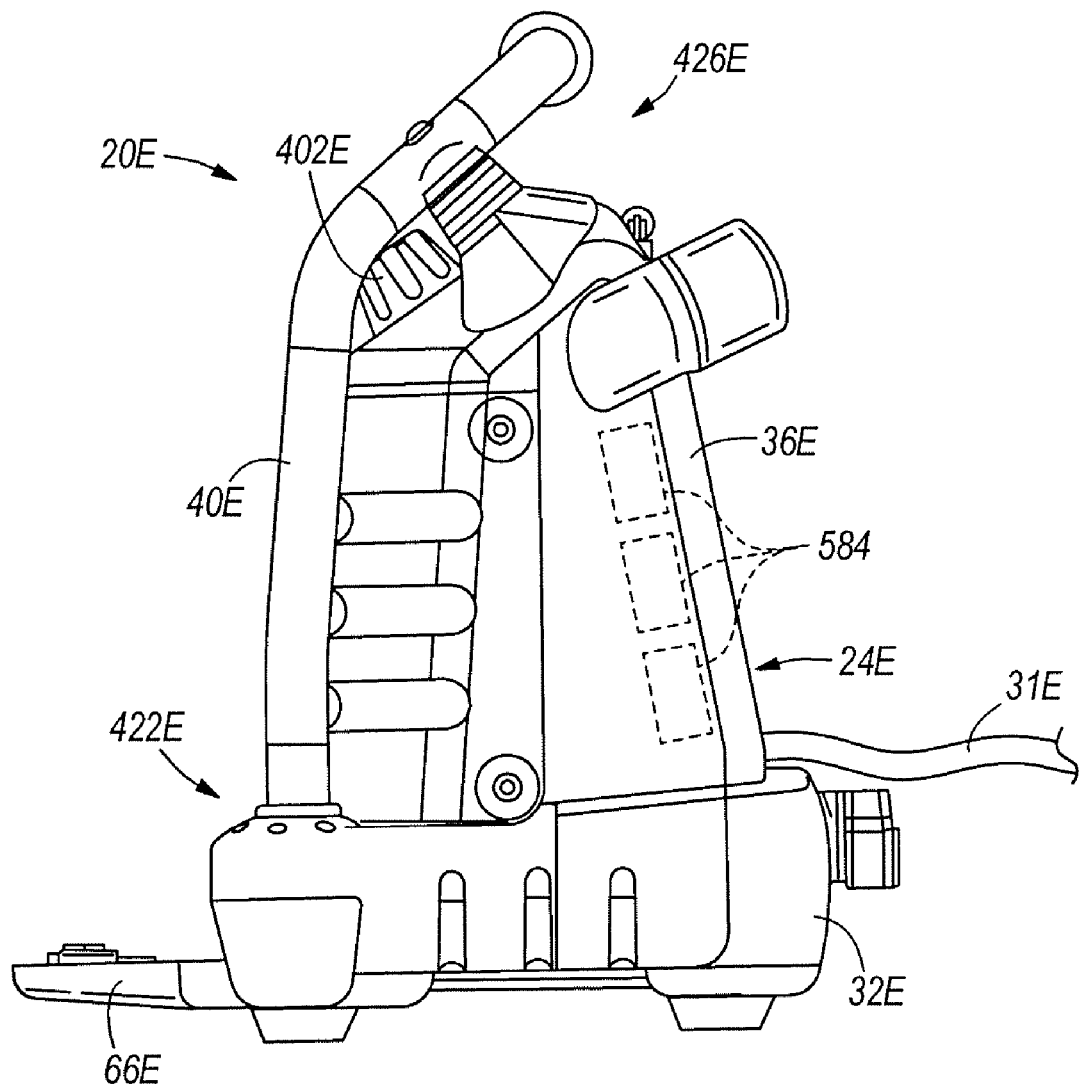
FIG. 30 is a side view of an alternative construction of an electrical component, shown with a plurality of power cells.
Figure 31:
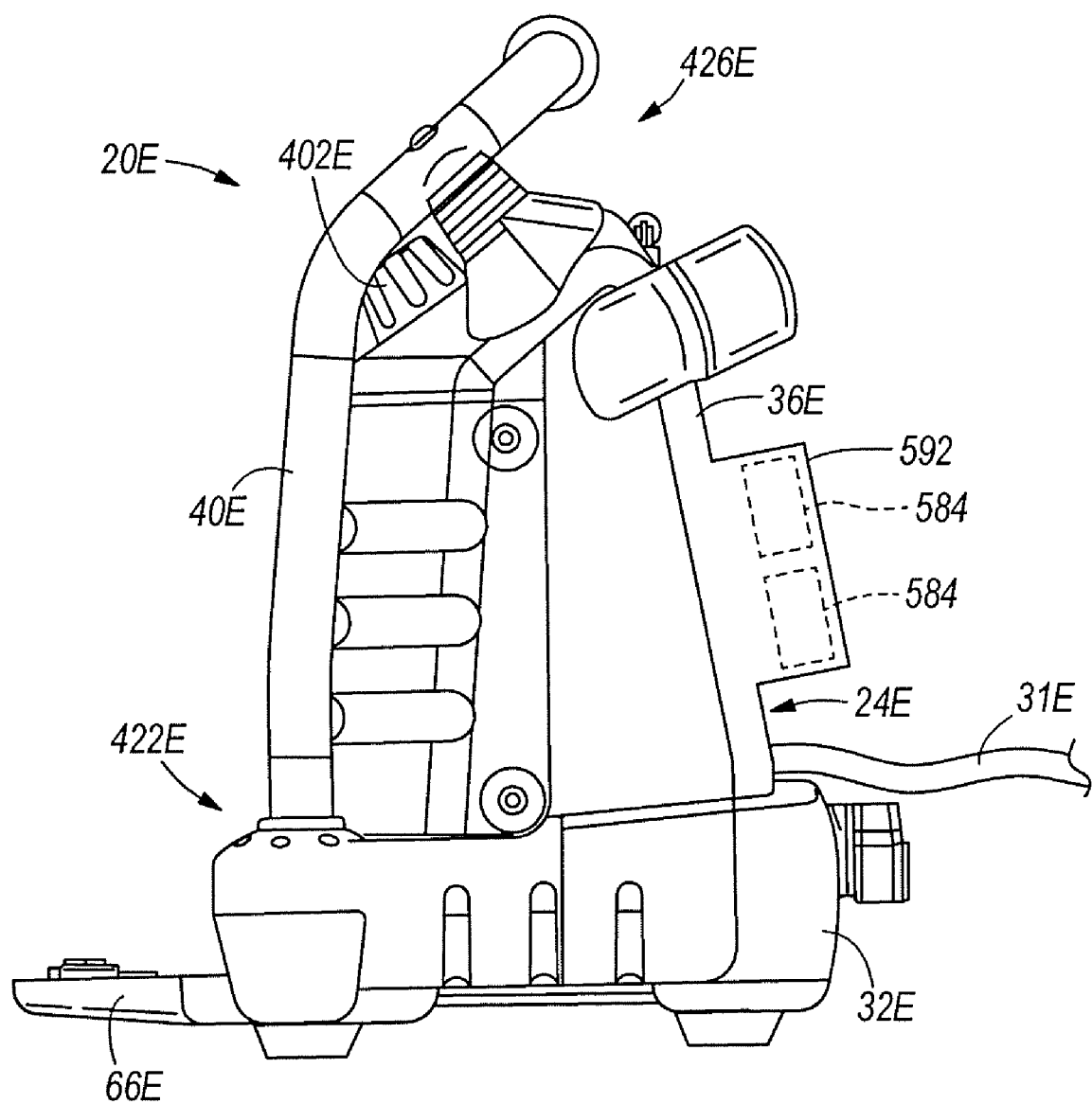
FIG. 31 is a side view of an alternative construction of an electrical component, shown with a plurality of power cells.
Figure 32:
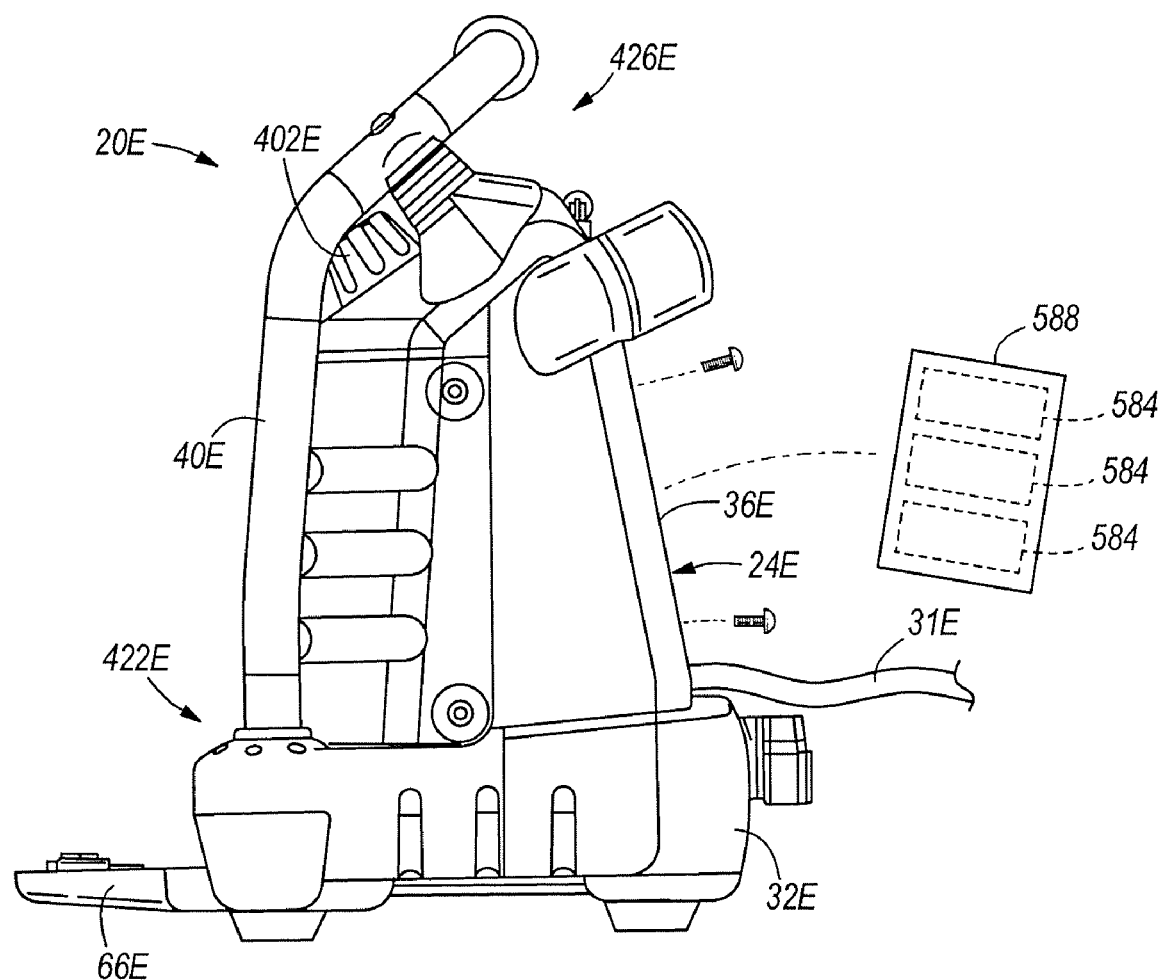
FIG. 32 is a side view of an alternative construction of an electrical component, shown with a power cell housing and a plurality of power cells positioned within the power cell housing.
Figure 33:
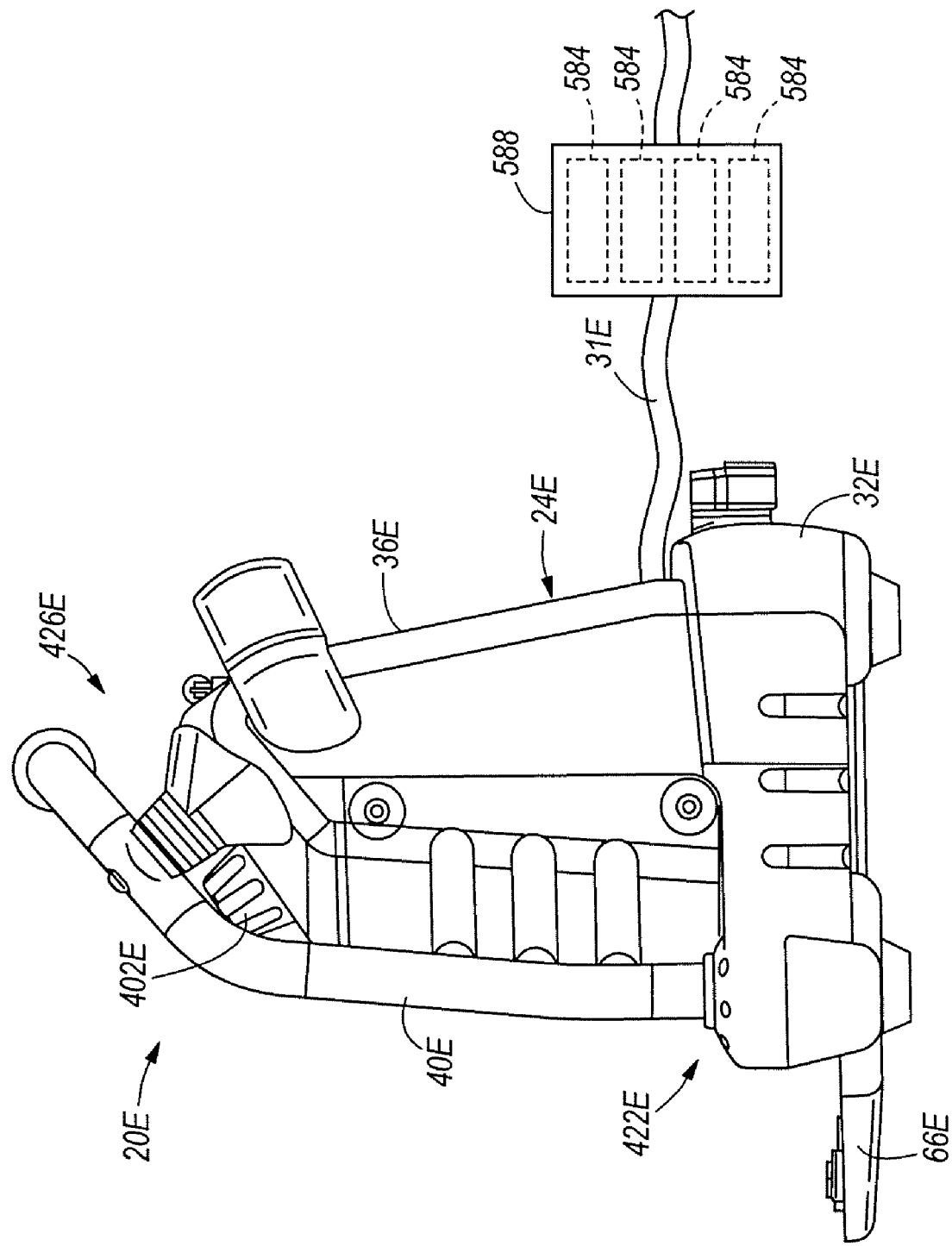
FIG. 33 is a side view of an alternative construction of an electrical component, shown with a power cell housing, a plurality of power cells positioned within the power cell housing and the power cell housing and the power cells being positioned along and in series with the power cord.
Figure 34:
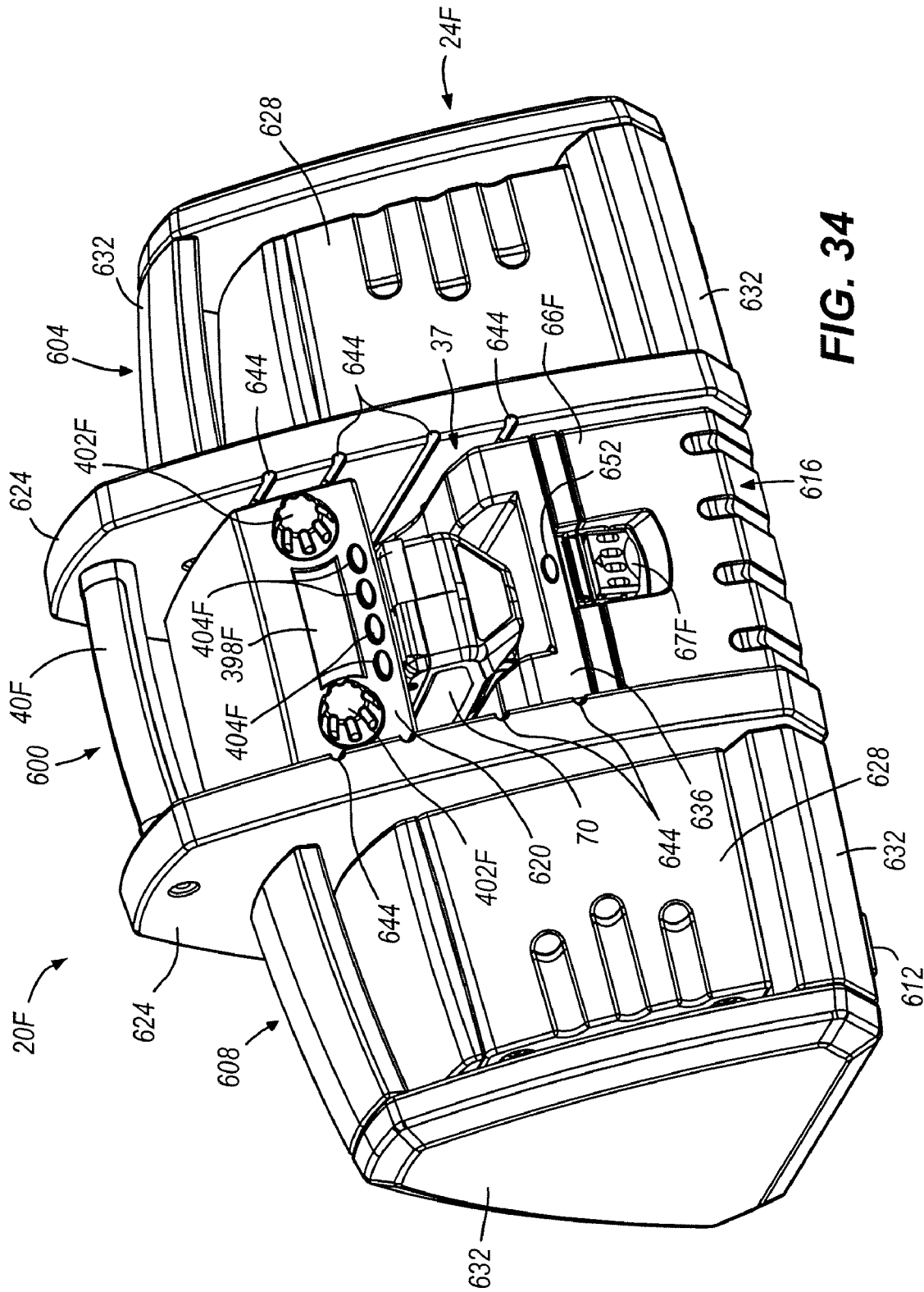
FIG. 34 is a front perspective view of an alternative construction of an electrical component.
Figure 35:
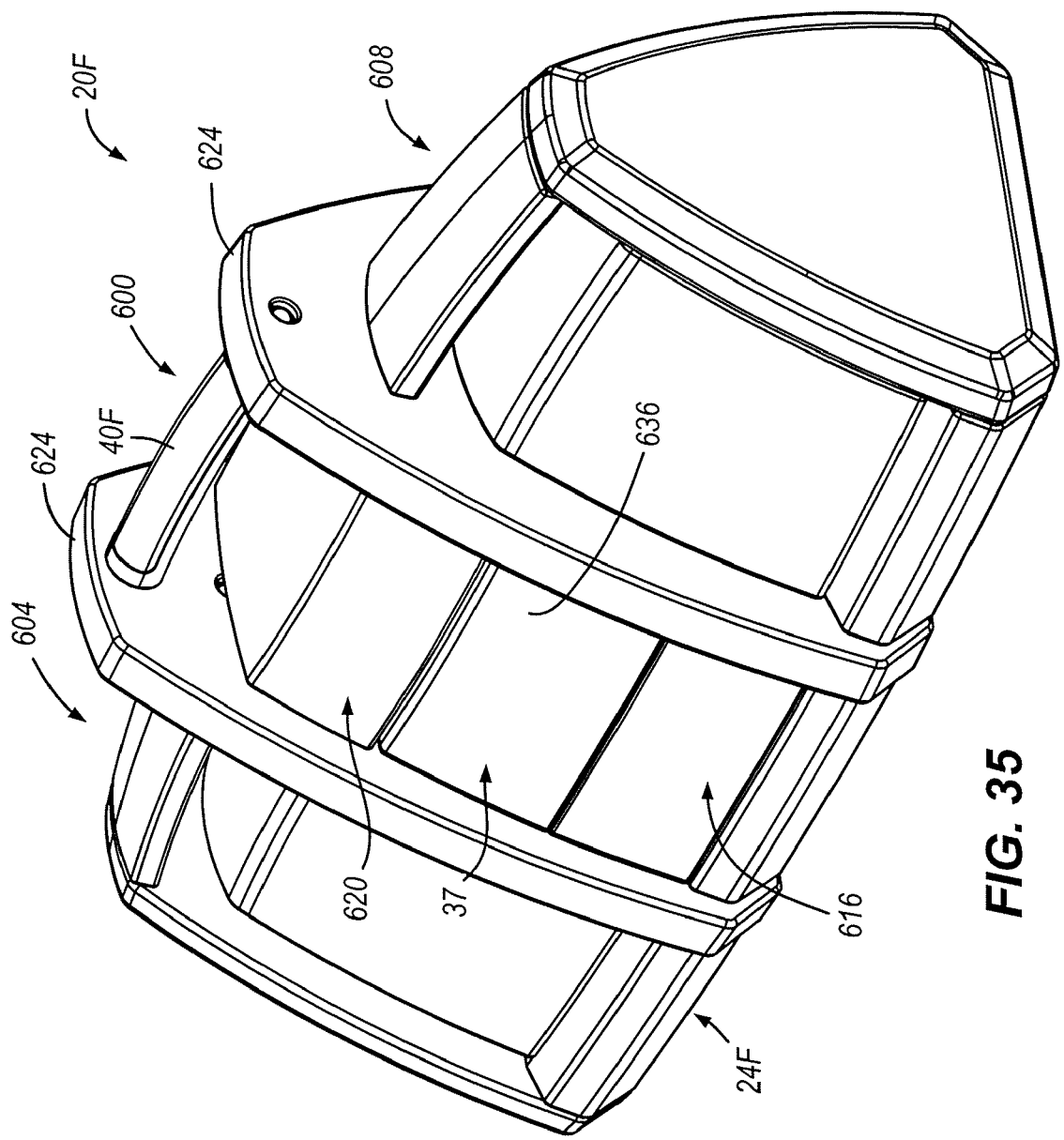
FIG. 35 is a rear perspective view of the electrical component shown in FIG. 34.
Figure 36:
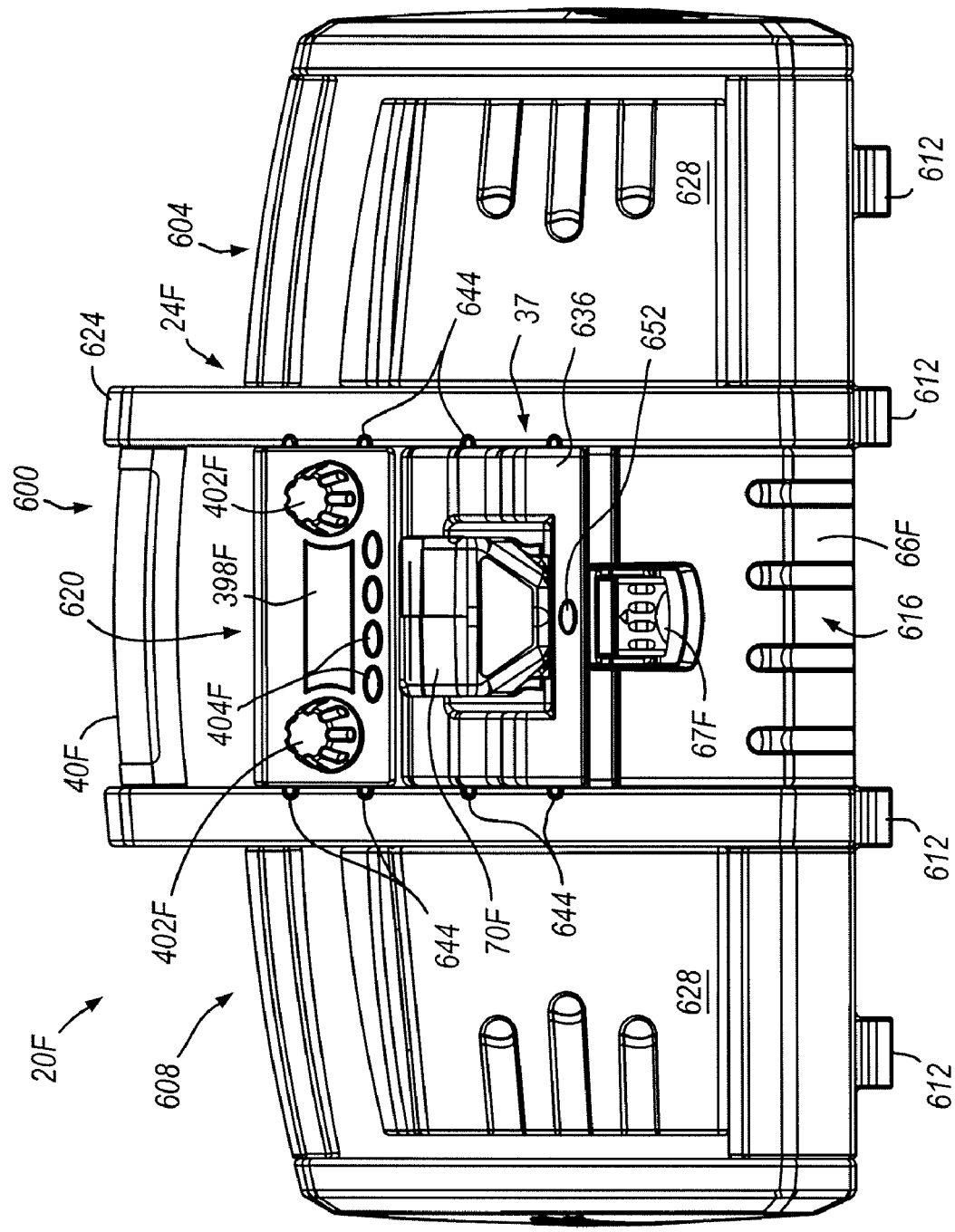
FIG. 36 is a front view of the electrical component shown in FIG. 34.
Figure 37:
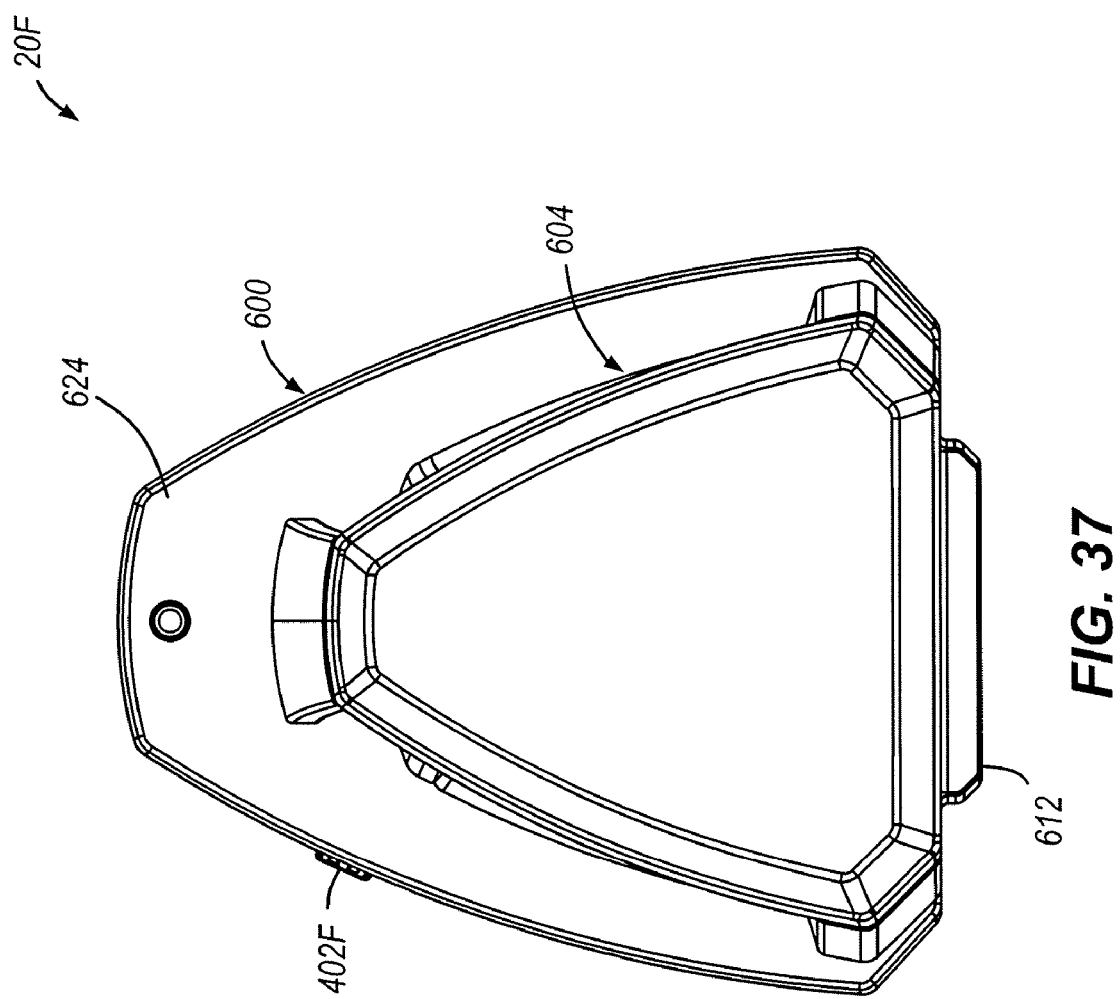
FIG. 37 is a right side view of the electrical component shown in FIG. 34.
Figure 38:
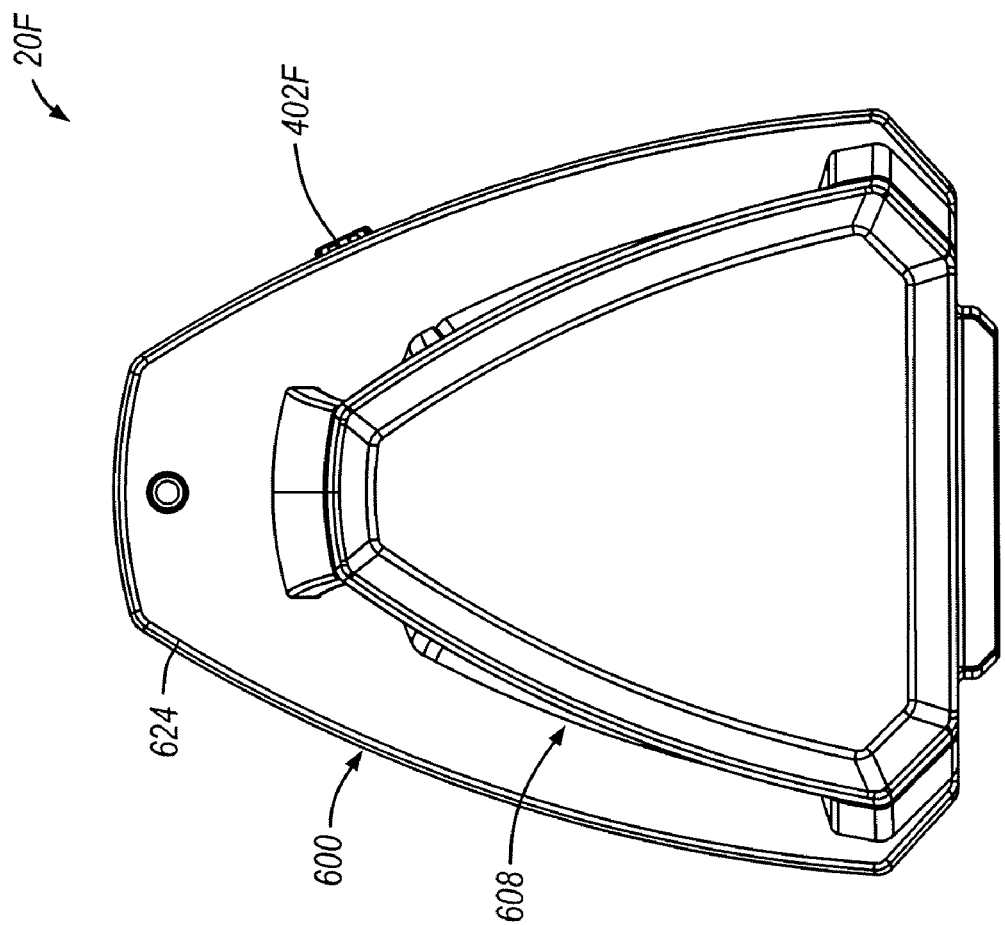
FIG. 38 is a left side view of the electrical component shown in FIG. 34.
Figure 39:
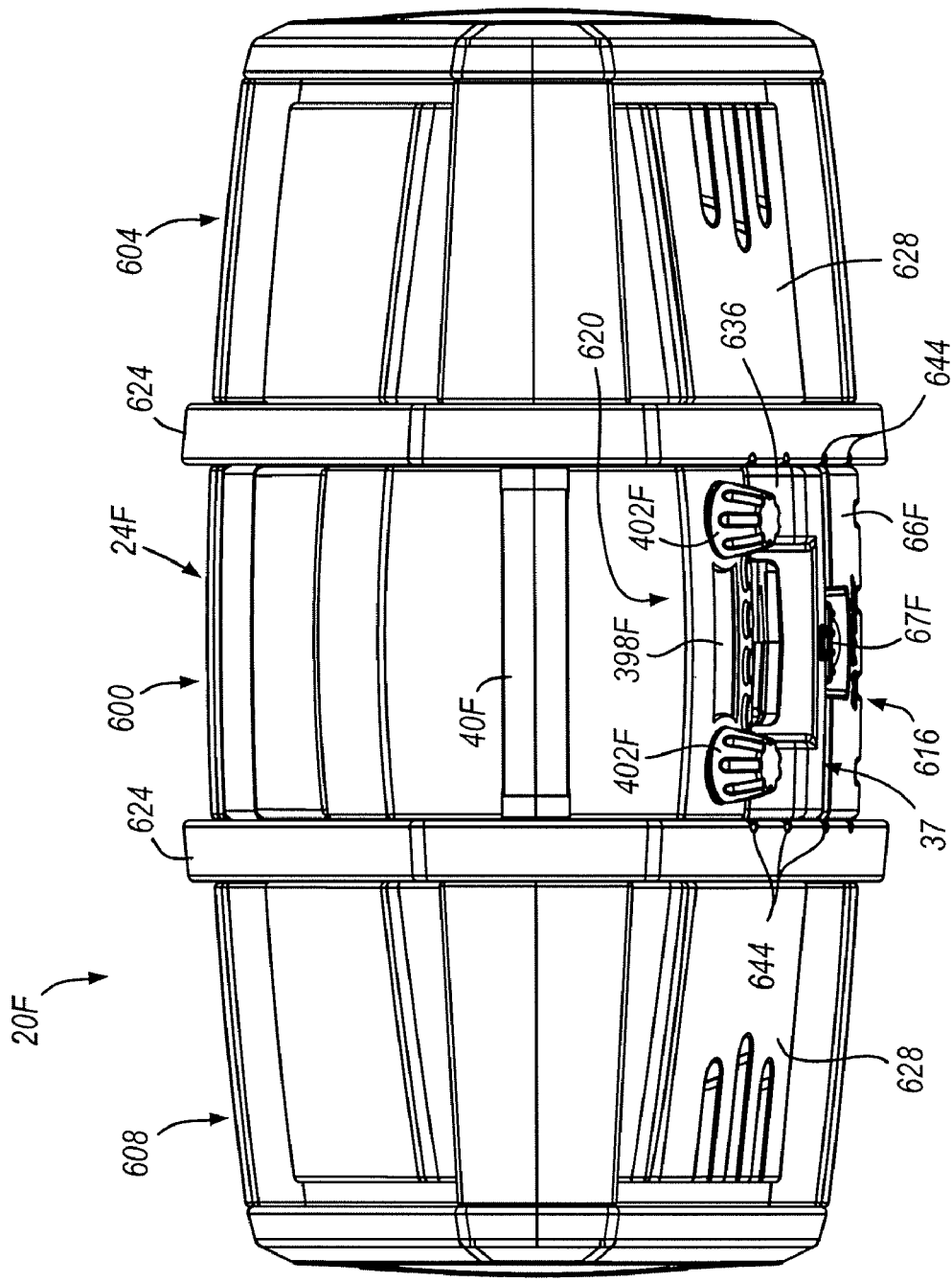
FIG. 39 is a top view of the electrical component shown in FIG. 34.
Figure 40:
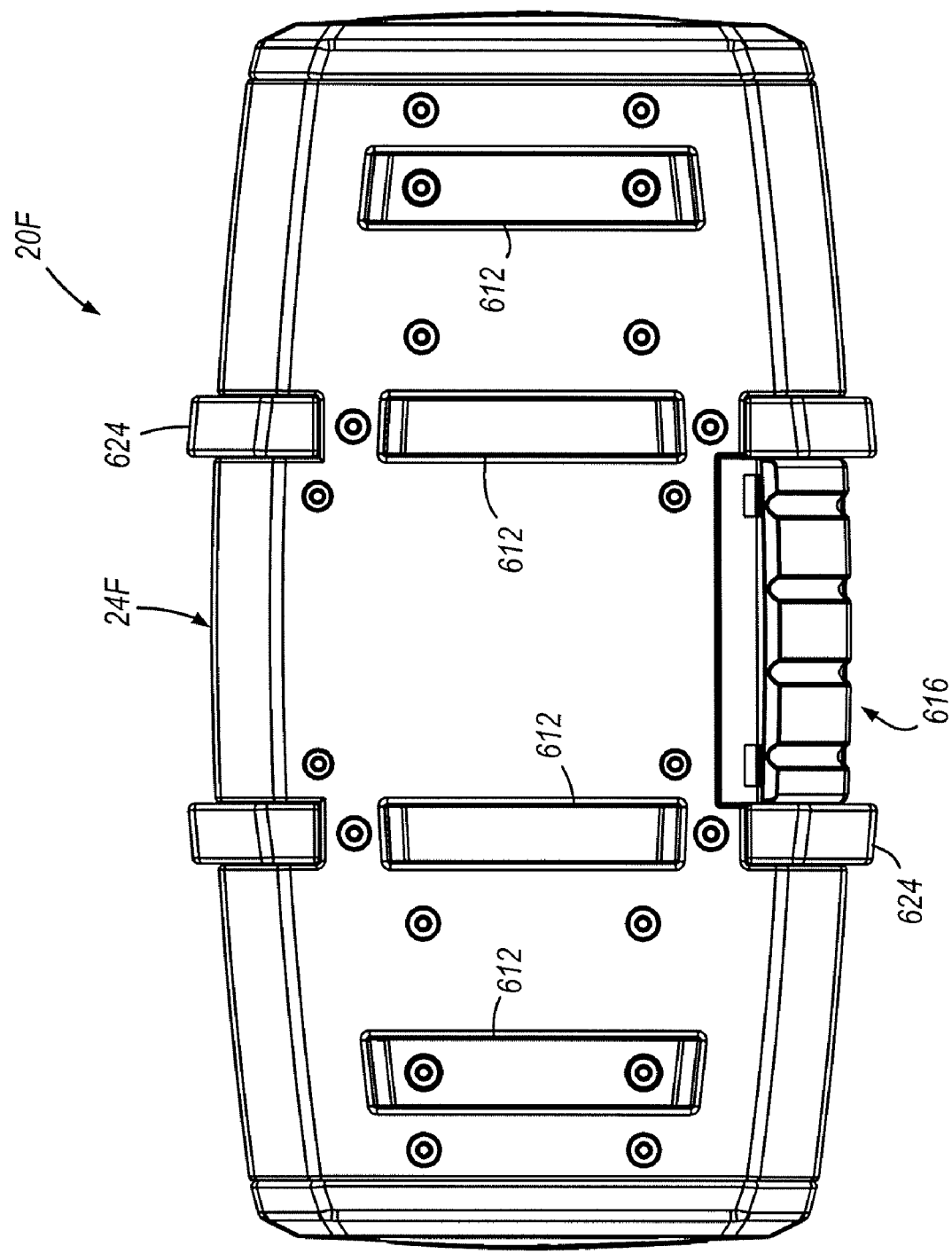
FIG. 40 is a bottom view of the electrical component shown in FIG. 34.

With reference to FIGS. 28 and 29, the electrical component 20 includes a MP3 player 572 that is supported by the housing 24. The MP3 player 572 can be a variety of MP3 players available for purchase from companies, such as, for example Apple Computer Inc., Celera, JVC Americas Corp., Koss, Panasonic, Philips, RCA, Rio, Sharper Image, Sony, etc.

With particular reference to FIG. 28, the MP3 player 572 is externally connected to the housing 24. The MP3 player 572 may be either rigidly connected to and non-removable from the housing 24 or may be selectively removable from the housing 24.

With particular reference to FIG. 29, the MP3 player 572 may be encased within the housing 24. In such constructions, the MP3 player 572 may be either rigidly connected to and non-removable from the housing or may be selectively removable from the housing. In constructions in which the MP3 player is encased within the housing 24, a surface of the MP3 player 572 may be flush with, slightly projecting outwardly from the external surface of the housing 24 or recessed below the external surface of the housing 24.

In some constructions (not shown), the MP3 player 572 may be covered with a cover (not shown) to protect the MP3 player 572 and/or to lock the MP3 player to the housing 24. In some constructions, the cover is transparent to allow an operator to view the MP3 player through the cover. In other constructions, the cover is not transparent and the MP3 player 572 is not viewable through the cover.

The MP3 player 572 includes a MP3 circuit (not shown) operable to play MP3 audio signals and a plurality of control buttons 576 for controlling the operation of the MP3 player 572, such as volume control, track selection, play mode (i.e., random or continuous play), etc. The MP3 circuit is electrically connected to the power cord 31 and is thereby electrically connected to the power source to power the MP3 circuit.

In some constructions, the MP3 player 572 may be electrically connected to both the battery 70 and to the power source. In such constructions, the MP3 player 572 may be powered by either of the battery 70 and the power source. Preferably, the MP3 player 572 will be powered primarily by the power source in such constructions. However, if the power cord 31 is unplugged from the power source, the MP3 player 572 will be powered by the battery 70. In other constructions, the MP3 player 572 may be powered solely by the battery 70.

The MP3 player 572 also includes a display portion 580 that is operable to display various information to an operator, such as, for example, volume level, current track selection and/or track title, number of total tracks, elapsed play time of current track, remaining play time for current track, selected play mode (i.e., random or continuous), messages, etc. The display portion 580 may be various types of displays, including analog, digital, etc., for electrical components. In the illustrated construction, the display portion 580 is a backlit LCD display.

The MP3 player 572 further includes internal memory (not shown). Additional memory can be added to the MP3 player 572 by providing a separate memory device (not shown), such as, for example, a memory stick, memory chip, etc., for the MP3 player 572. For example, the memory device is selectively insertable into and removable from the MP3 player 572.

Referring back to FIG. 29, in the illustrated construction, the electrical component 20 includes a memory device port 596 for receiving separate memory devices. The memory device port 596 is preferably shaped to accommodate one or more shapes of memory devices. For example, the memory device port 596 may have a rectangular shape to accommodate a rectangularly-shaped memory chip. The electrical component 20 may also include a port cover (not shown) to cover the port 596. The cover may cover the port 596 when the port 596 is unused or when the port 596 is both used and unused.

It should be understood that the electrical component 20 can be any combination of a radio, a battery charger and a MP3 player and can include any combination of an audio circuit, a battery charging circuit and a MP3 circuit. For example, the electrical component 20 can be a radio, a battery charger, a MP3 player, a radio/charger, a radio/MP3 player, a MP3 player/charger or a radio/charger/MP3 player and can include an audio circuit only, a battery charging circuit only, a MP3 circuit only, an audio and a battery charging circuit, an audio circuit and a MP3 circuit, a MP3 circuit and a battery charging circuit or an audio circuit, battery charging circuit and a MP3 circuit, respectively.

An alternative construction of an electrical component 20E is illustrated in FIGS. 30-33. Reference is made to the above discussion regarding the structure, operation, and alternatives of the electrical component 20 illustrated in FIGS. 1-29. Common elements are identified by the same reference numbers "E".

Referring to FIGS. 30-33, the electrical component 20E includes a plurality of power cells 584. The power cells 584 may be electrically connected to a power source via the power cord 31E and may be charged when the power cord 31E is plugged into the power source. In the illustrated construction, the power cells 584 are positioned within the housing 24E of the electrical component 20E (see FIG. 30).

In some constructions, the power cells 584 can be supported externally of the housing 24E. In constructions in which the power cells 584 are supported externally of the housing 24E, the power cells 584 may be housed within a separate power cell housing 588 (see FIGS. 32 and 33) or may be housed within an extension 592 (see FIG. 31) of the housing 24E or may not be housed in anything. Also, in such embodiments where the power cells 584 are supported externally of the housing 24E, the power cells 584 may be connected to the housing 24E, such as, for example, by fasteners, Velcro, etc., may be supported on some other surface, such as, for example the ground, a table, etc., or may be positioned along and in series with the power cord 31E (see FIG. 33). The electrical component 20E may also include a charging circuit (not shown but similar to charging circuit 28) in electrical communication with the power cells 584 and/or the battery 70.

In addition, the power cells 584 are electrically connected to an audio circuit (not shown) in order to produce audio signals. In some constructions, the audio circuit is only powered by the power cells 584 when the power cord 31E is both plugged into and not plugged into the power source.

In other constructions, the audio circuit can be powered by either the power cells 584 or by the power source. For example, the audio circuit can be powered by either or both the power cells 584 and the power source when the power cord 31E is plugged into the power source. When the power cord 31E is not plugged into the power source, the audio circuit and/or the MP3 circuit is powered by the power cells 584.

It should be understood that the power source (when the power cord 31E is plugged into the power source) can both charge a battery 70 positioned within the receptacle 44 and power the audio circuit. In such a case, the power source can also charge the power cells 584. It should also be understood that the power source can charge the power cells 584 and the battery 70 positioned within the receptacle 44, and the power cells 584 can power the audio circuit.

FIGS. 34-48 illustrate an alternative construction of an electrical component 20F embodying the invention. Reference is made to the above discussion regarding the structure, operation, and alternatives of the electrical component 20 illustrated in FIGS. 1-33. Common elements are identified by the same reference numbers "F".

As shown in FIGS. 34-40, the housing 24F generally includes a central portion 600, a right portion 604, and a left portion 608. In the illustrated construction, the central portion 600, right portion 604, and the left portion 608 are designed to have impact absorbing characteristics which protect the electrical component 20F from impacts at a jobsite, such as from falling from a height or having another object impact the electrical component 20F, which might normally damage the elements of the electrical component 20, such as, for example, the elements of the electrical circuit 28F, and/or create an electrical hazard in the electrical component 20F. For example, the housing 24F may be formed of energy/impact absorbing materials, such as, for example, high-density polyethylene (HDPE), and/or formed with energy/impact absorbing structures, such as, for example, bars, base edges, bumpers, bushings, ribs, honeycombs, energy-absorbing shapes, etc.

With continued reference to FIGS. 34-40, a plurality of support members 612 extend downwardly from the bottom surface of the electrical component 20F. The support members 612 provide support and sturdiness to the electrical component 20F when the electrical component 20F is positioned on a work surface. The central portion 600 includes a battery connection assembly 616, a battery charger 37, a control portion 620, a handle 40F, and a central frame 624 extending outward from the outer bounds of the battery connection assembly 616, the battery charger 37, the control portion 620 and the handle 40F to protect those components from impacts and to substantially prevent damage thereto from such impacts.

The right portion 604 and the left portion 608 are substantially mirror images of each other and include similar components. The right portion 604 and the left portion 608 each include a speaker 628 and a speaker frame 632 surrounding the speaker 628 to protect the speaker 628 from impacts and prevent damage to the speaker 628 from such impacts.

Figure 41:
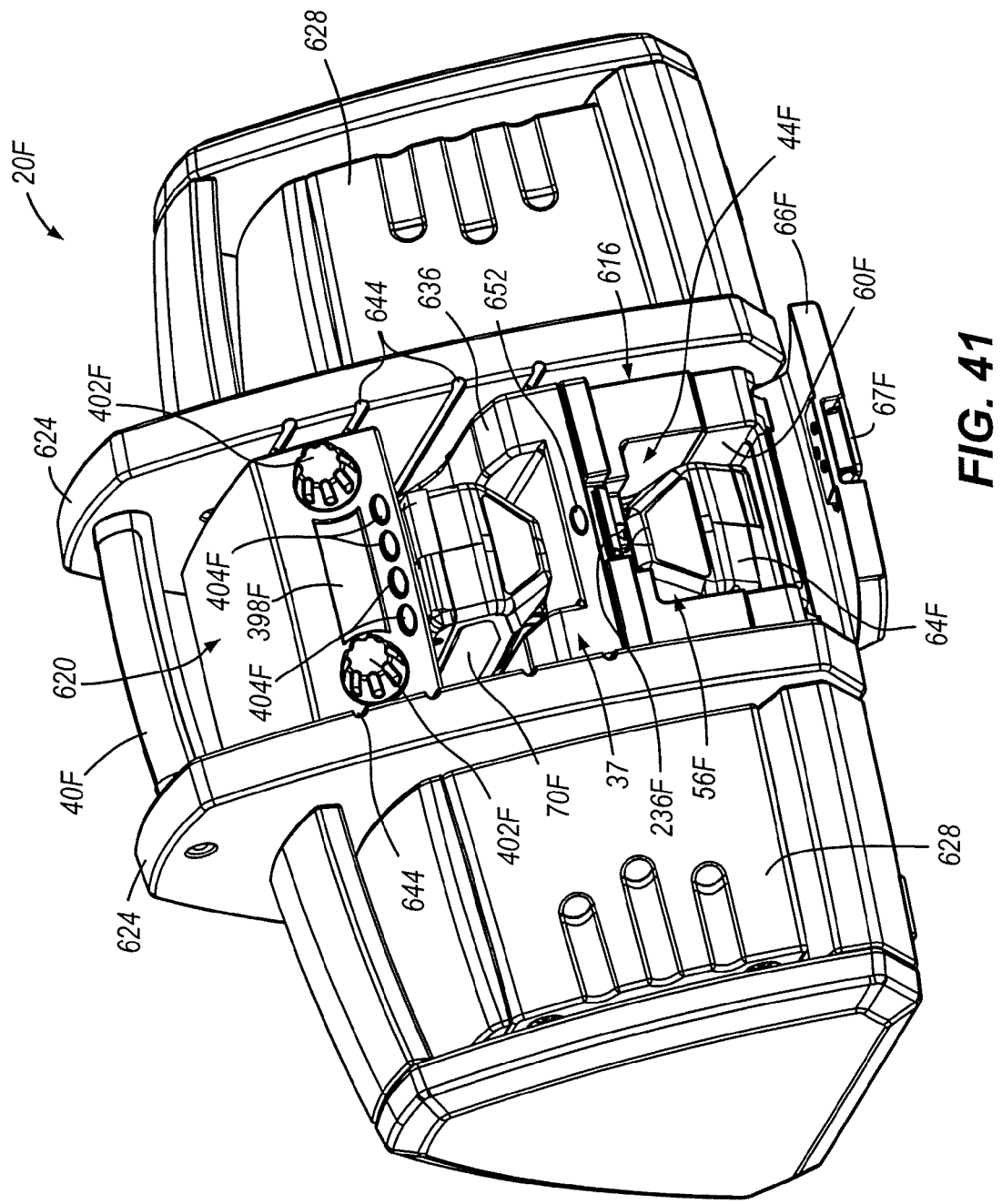
FIG. 41 is a front perspective view of the electrical component shown in FIG. 34, shown with a cover pivoted to an open position.
Figure 42:
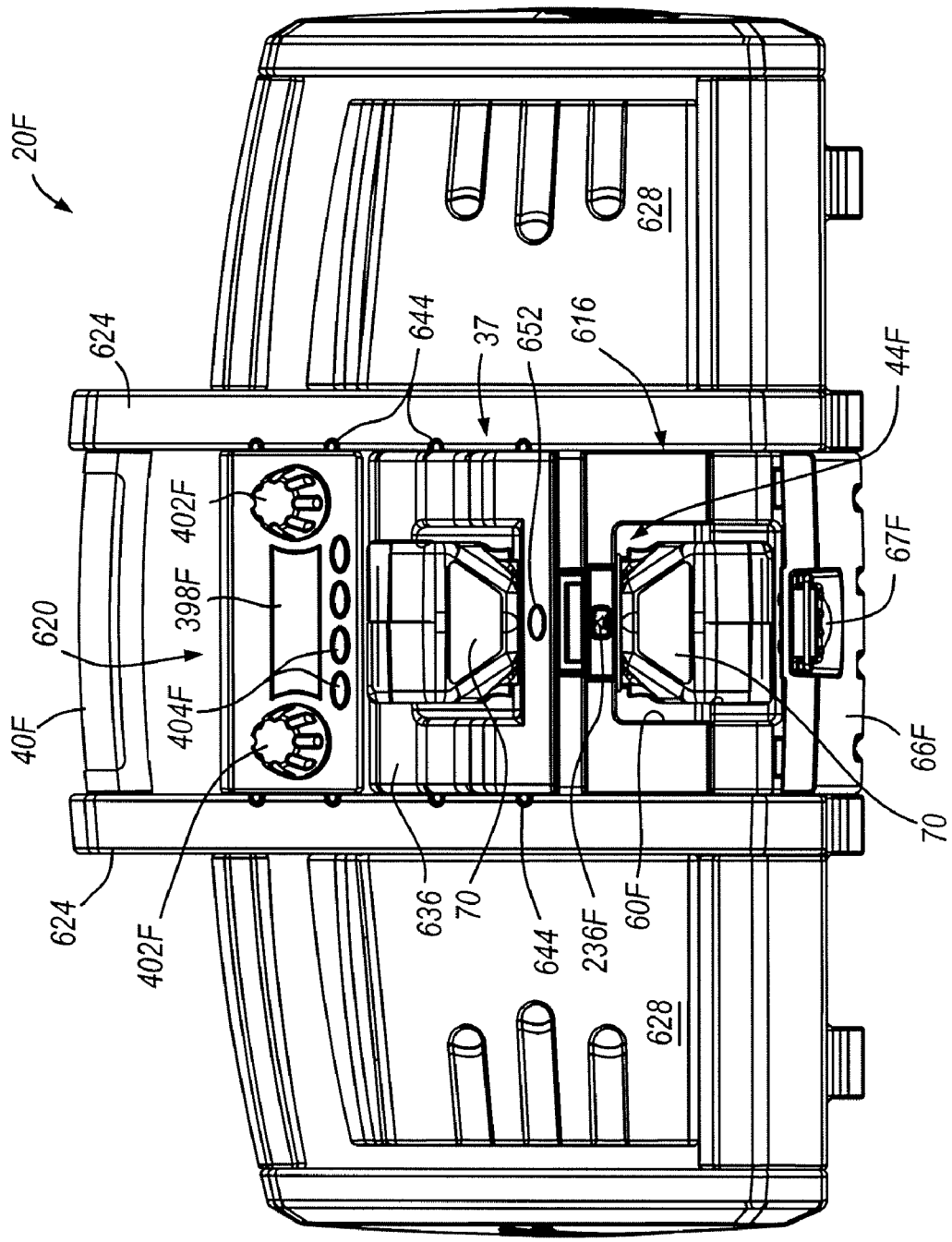
FIG. 42 is a front view of the electrical component shown in FIG. 34, shown with the cover pivoted to the open position.
Figure 43:
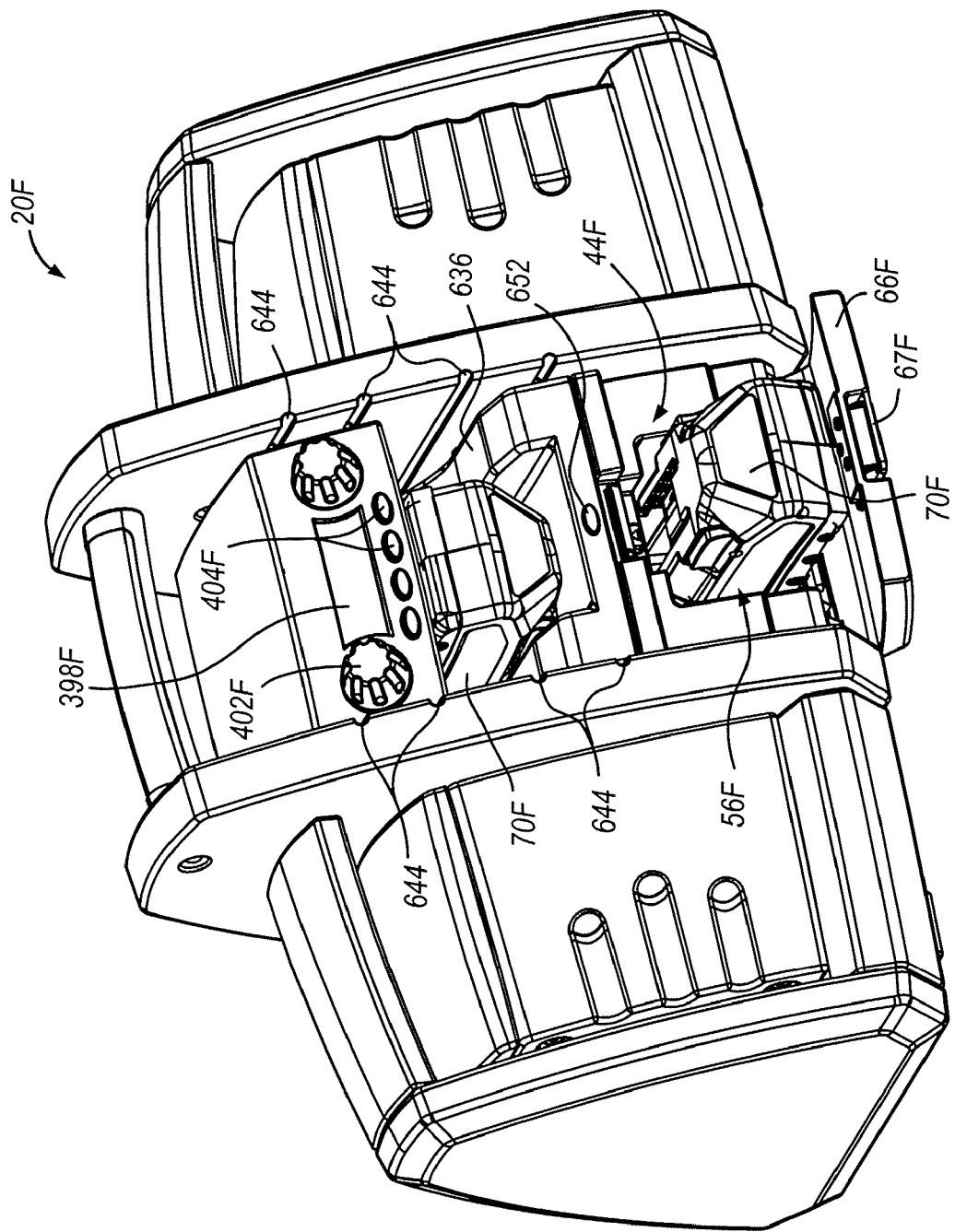
FIG. 43 is a front perspective view of the electrical component shown in FIG. 34, shown with the cover pivoted to an open position and a battery extending outwardly of a battery receptacle coverable by the cover.
Figure 45:
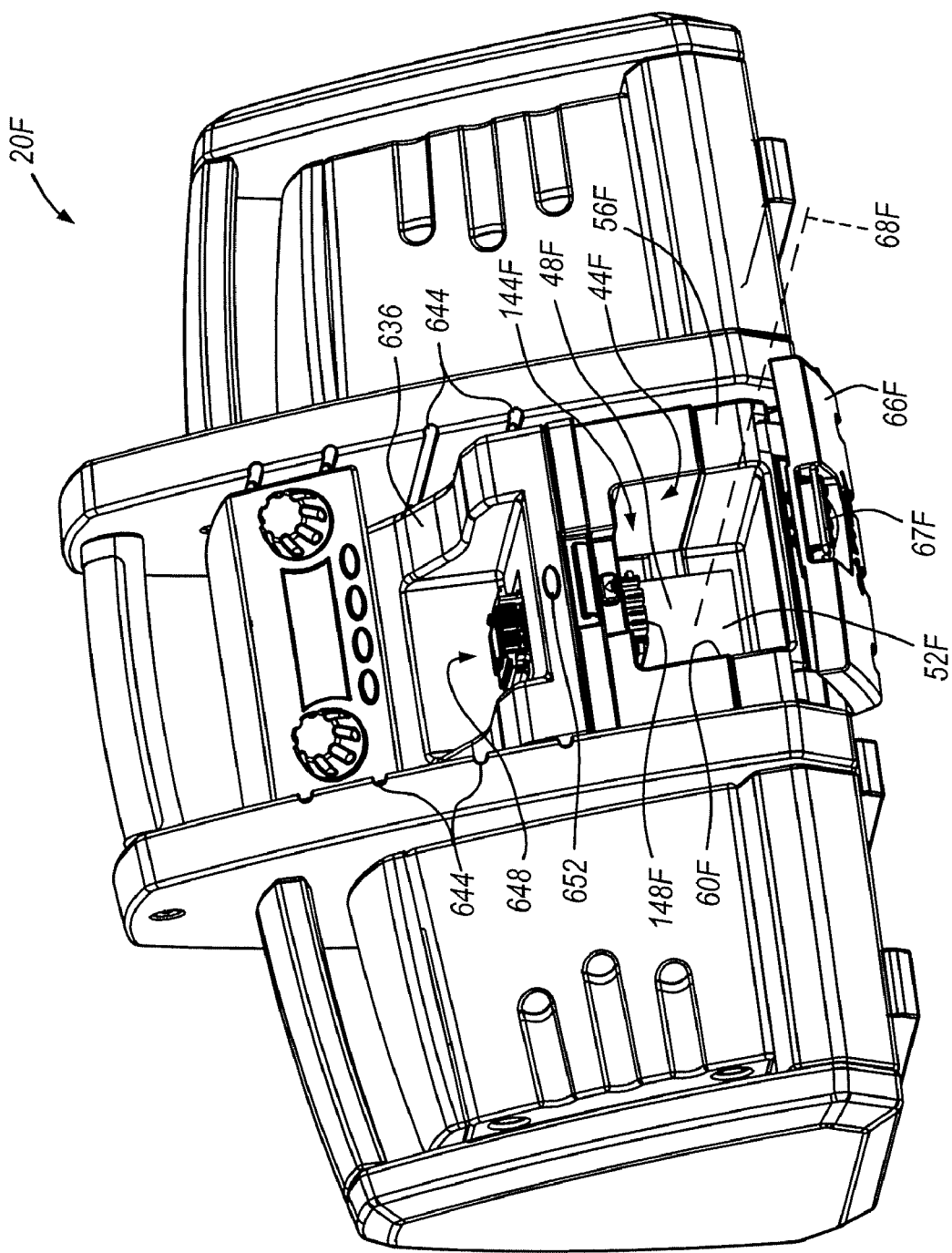
FIG. 45 is a front perspective view of the electrical component shown in FIG. 34, shown with the cover pivoted to the open position and without batteries connected to the electrical component.

With reference to FIGS. 41-42 and 45, in the illustrated construction, the battery connection assembly 616 defines a receptacle 44F having a closed end 48F, defined by a bumper 52F (discussed below), an open end 56F, and side walls 60F extending from the closed end 48F to the open end 56F. A battery 64F is inserted into the receptacle 44F along an insertion axis 68F. The battery 64F is electrically connected to the electrical circuit 28F to, in the illustrated construction, selectively provide power to the electrical circuit 28F. In some constructions, the battery 64F can selectively provide power to the electrical circuit and be charged by the charging circuit portion 30 of the electrical circuit 28.

With reference to FIGS. 34-45, the housing 24F includes a cover 66F pivotally connected to the central frame 624 for selectively closing the open end 56F of the receptacle 44F. A latching member 67F is selectively lockable to a portion of the central frame 624 (see FIGS. 34-40) to lock the cover 66F in a closed position (shown in FIGS. 34-40). In some constructions, a cover biasing member (not shown) is mounted on the interior surface of the cover 66F. When the cover 66F is closed, the biasing member engages and biases the battery 64F into the receptacle 44F to maintain proper electrical connection, as described below in more detail, during normal operations or during and after an impact condition. In the illustrated construction, the battery is a slide-on power tool battery 70 operable to power a power tool 71, such as, for example, a drill, a circular saw, a reciprocating saw, etc.

As shown in FIGS. 41 and 42, the central frame 624 supports an electrical connector assembly 144F positioned in the receptacle 44F. The connector assembly 144F includes a support portion 148F, a body portion 152F, a terminal assembly 156F, biasing members 160F, the bumper 52F, and a locking assembly 168F. In the illustrated construction, the support portion 148F and the terminal assembly 156F move within the receptacle 44F relative to the housing 24F, in a direction parallel to the insertion axis 68F, upon the insertion and ejection of the battery 70 into and out of the receptacle 44F, respectively. In part, this movement accommodates batteries of different sizes.

Referring to FIGS. 34-40 and 47, the battery charger 37 is supported by the central frame 624 and is selectively removable from the central frame 624. The battery charger 37 includes a charger housing 636 and a plurality of elongated projections 640 (see FIG. 47) extending from sides of the charger housing 636. The projections 640 are receivable in grooves 644 (see FIG. 47) defined in interior sides of the central frame 624. Any number of grooves 644 can be defined in the interior sides of the central frame 624 to provide the necessary engagement between the battery charger 37 and the central frame 624 and/or to provide a plurality of positions for supporting the battery charger 37 within the central frame 624.

In some constructions, the charger housing 636 defines grooves in sides thereof and a plurality of elongated projections extend from interior sides of the central frame 624, and the grooves and elongated projections are engageable to support the battery charger 37 within the central frame 624. In such constructions, the interior sides of the central frame 624 can include any number of projections to provide the necessary engagement between the battery charger 37 and the central frame 624 and/or to provide a plurality of positions for supporting the battery charger 37 within the central frame 624. It should be understood that the battery charger 37 can be supported by the central frame 624 in a variety of manners other than the described projection/groove engagement, such as, for example a ratchet-type engagement, a fastener engagement, integrally forming the battery charger with the central frame, etc.

In the illustrated construction, the battery charger 37 is movable between a locked condition, in which the battery charger 37 is inserted to its fullest extent within the central frame 624 and prevented from sliding forward, and an unlocked condition, in which the battery charger 37 is free to move relative to the central frame 624. The battery charger 37 can be locked to the central frame 624 in a variety of manners. For example, the projections 640 and grooves 644 and/or the side surfaces of the battery charger 37 and the central frame 624 may be appropriately sized to frictionally engage each other and to prevent movement relative to each other except when under a force, such as, for example an operator applying force to the battery charger 37 by pulling or pushing the battery charger 37.

Also for example, a positive locking arrangement, such as a separate locking member (not shown), can be provided between the battery charger 37 and central frame 624. Such a locking member can include a selectively retractable element that is connected to one of the battery charger 37 and the central frame 624 and that is engageable with another element, such as, for example, a projection or a recess, connected to the other of the battery charger 37 and the central frame 624. The retractable element can be retracted by a manipulateable lever engageable by an operator.

Figure 44:
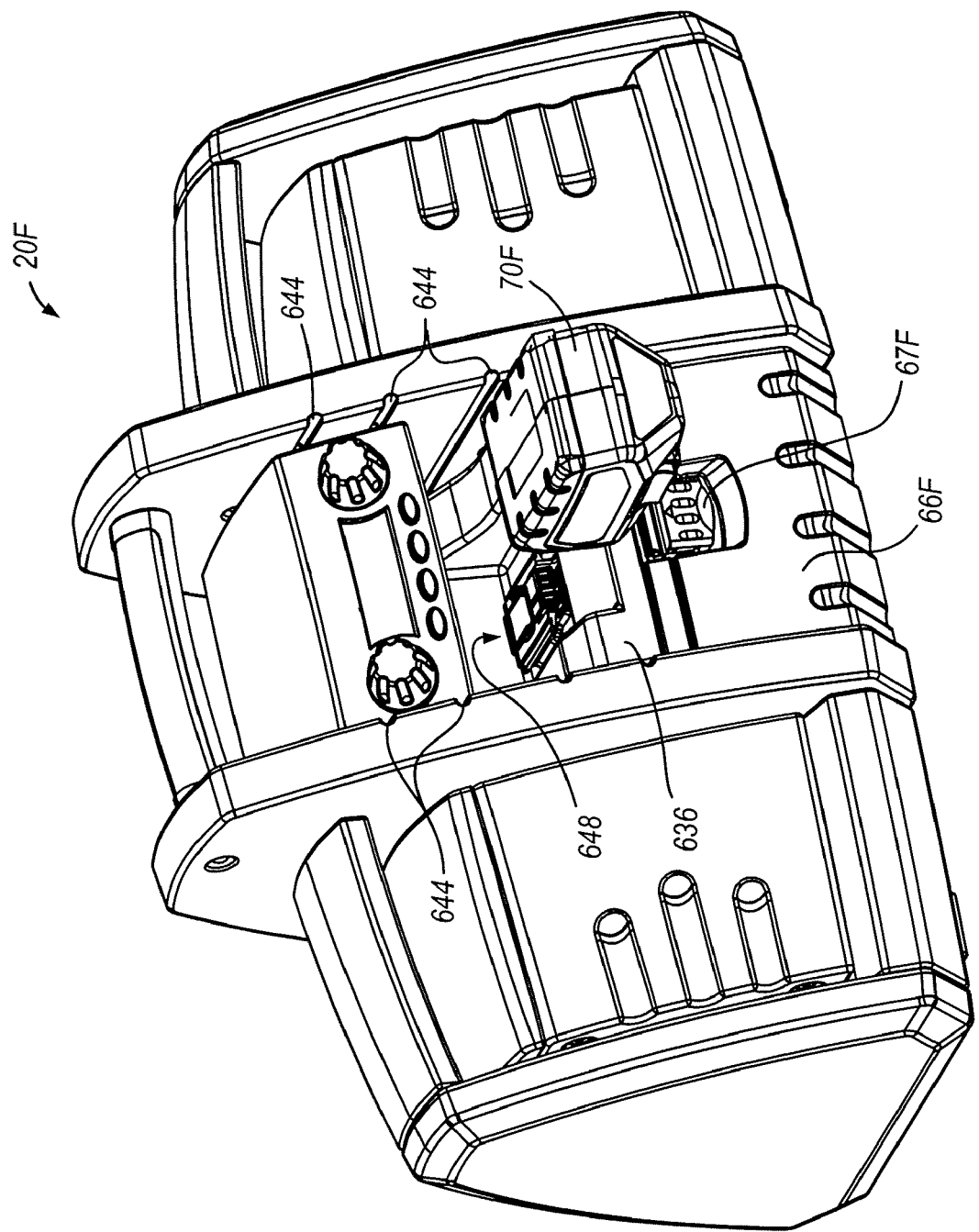
FIG. 44 is a front perspective view of the electrical component shown in FIG. 34, shown with a battery extending outwardly from the battery charger.

With particular reference to FIGS. 44 and 45, the battery charger 37 includes an electrical connector assembly 648 for supporting a battery and for electrically connecting the battery to the charging circuit portion 30F. The connector assembly 648 can have a variety of shapes and configurations and can be configured to accommodate a variety of battery sizes and shapes. In the illustrated construction, the connector assembly 648 is similar to the electrical connector assembly 144F shown in FIGS. 6-8 as discussed above. Reference is made to the above discussion regarding the structure, operation, and alternatives of the electrical connector assembly 144F shown in FIGS. 6-8.

In some constructions, the connector assembly 648 is similar to the electrical connector 144A shown in FIGS. 9 and 10. Reference is made to the above discussion regarding the structure, operation, and alternatives of the electrical connector assembly 144A shown in FIGS. 9 and 10.

It should be understood that, in some constructions, the battery may be locked in a position relative to the electrical connector assembly 648, and, in such constructions, the electrical connector assembly 648 includes an actuator 652 (similar to the actuators 236, 292 of the electrical connector assemblies 144, 144A) for unlocking the battery from the electrical connector assembly. The actuator 652 can operate in manners similar to the actuators 236, 292 or can operate in manners different than the actuators 236, 292.

It should also be understood that the electrical connector assembly 648, whether it is similar to electrical connector assembly 144, electrical connector assembly 144A, or some other electrical connector assembly, can include a variety of support portion types for supporting a variety of battery types. For example, the electrical connector assembly 648 can include support portions 148, 300, 348 or other battery support portions ranging in a variety of sizes, shapes and configurations for supporting complementary-shaped batteries.

Figure 46:
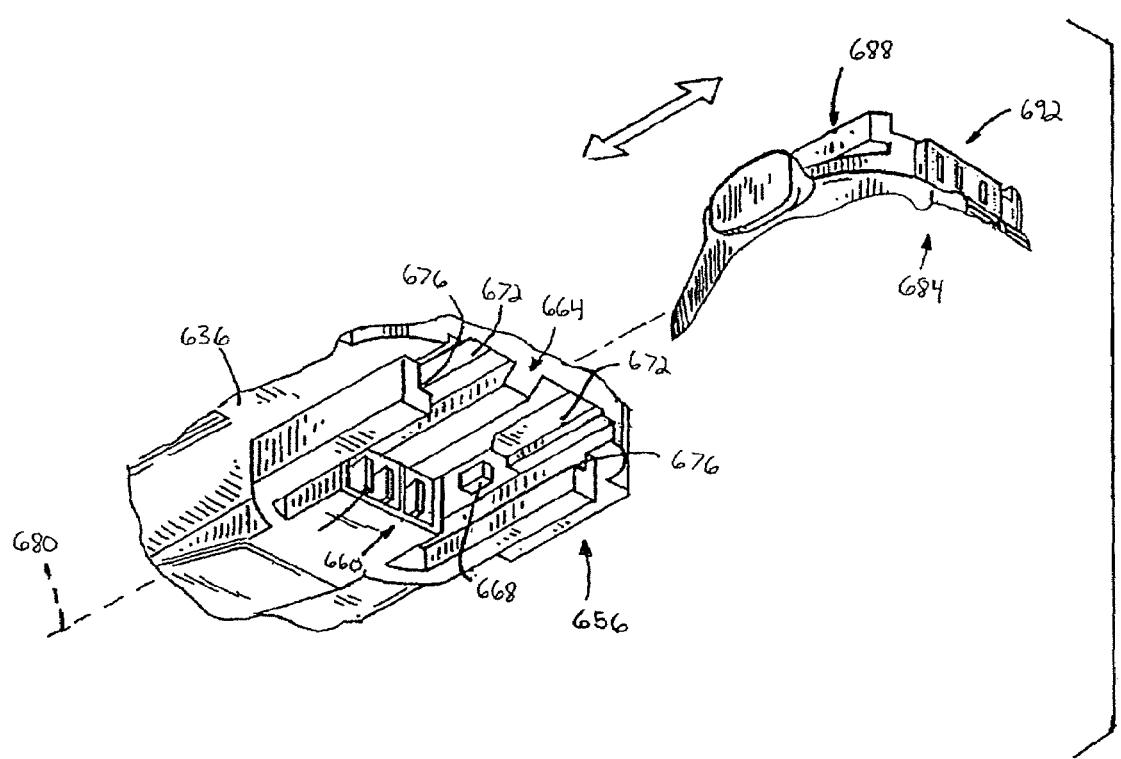
FIG. 46 is a partially broken, bottom perspective view of the battery charger and a connecting assembly of the electrical component shown in FIG. 34, shown in a disconnected condition.
Figure 47:
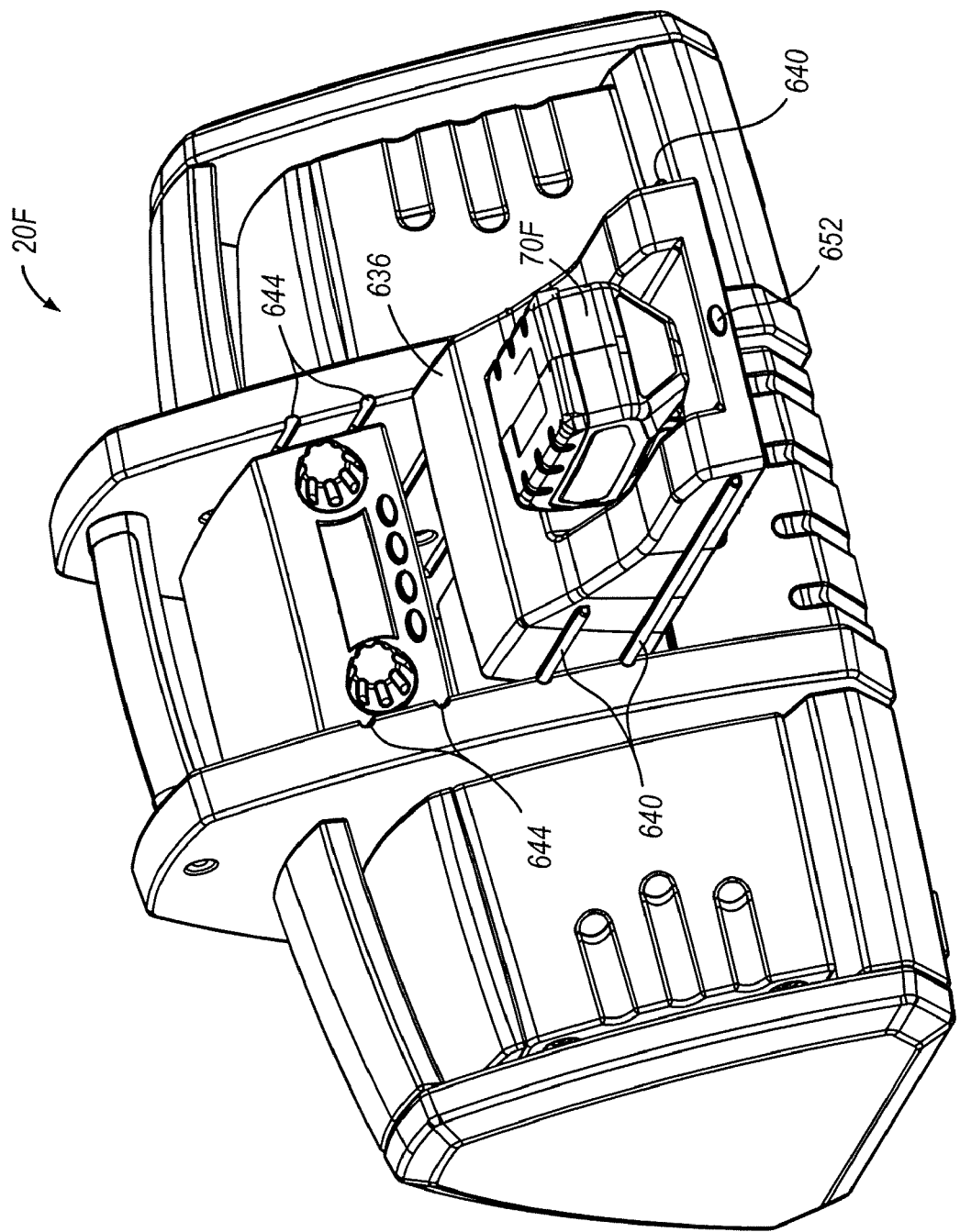
FIG. 47 is a front perspective view of the electrical component shown in FIG. 34, shown with the battery charger extended outwardly from the electrical component.

Referring to FIGS. 46 and 47, the battery charger 37 further includes a circuit connector assembly 656 for electrically connecting the charging circuit portion 30 of the electrical circuit 28F of the electrical component 20F with the battery charger 37 and, therefore, connecting the charging circuit portion 30 to the battery 70. In the illustrated construction, the circuit connector assembly 656 includes a battery charger terminal assembly 660, a battery charger support portion 664, and locking members or locking tabs 668 (one shown). The battery charger support portion 664 has a generally C-shaped cross-section provided by grooves 672 and rails 676 which extend parallel to a battery charger insertion axis (see FIG. 46). Locking tabs 668 are supported in the C-shaped support portion 664 and are movable perpendicular to the battery charger insertion axis 680.

With particular reference to FIG. 46, the electrical component 20F includes a housing electrical connector assembly 684 for engaging the circuit connector assembly 656 and for electrically connecting the battery charger 37 to the charging circuit portion 30. In the illustrated construction, the housing electrical connector assembly 656 includes a generally T-shaped housing support portion 688 and a housing terminal assembly. The support portion 664 of the battery charger 37 is complementary to the support portion 688 of the electrical component 20F, and, therefore, the complementary components physically and electrically connect the battery charger 37 to the electrical component 20F. The locking tabs 668 engage in recesses (not shown) on the housing support portion 688 to provide a battery charger locking assembly between the battery charger 37 and the electrical component 20F.

It should be understood that, in other constructions (not shown), the battery charger 37 may have a different type of slide-on circuit connector assembly 656, such as, for example, the circuit connector assembly 656 having a T-shaped cross-section. In such constructions, the housing electrical connector assembly 684 would have a complementary C-shaped cross-section support portion.

It should also be understood that, in other constructions (not shown), the battery charger 37 may have a circuit connector assembly 656 shaped similarly to a plug and socket type connection or a projection and receptacle type connection. In such constructions, one of the circuit connector assembly 656 and the housing electrical connector assembly 684 have a socket or receptacle and the other of the circuit connector assembly 656 and the housing electrical connector assembly 684 has a plug or projection insertable into the socket or receptacle to electrically connect the battery charger 37 to the charging circuit portion 30.

It should further be understood that the circuit connector assembly 656 and the housing electrical connector assembly 684 can have a variety of configurations as long as the configurations of the circuit connector assembly 656 and the housing electrical connector assembly 684 are complementary and enable electrical connection between the battery charger 37 and the electrical circuit 28.

It should be understood that, in other constructions (not shown), the battery charger 37 may include a power cord and plug which is connectable to a power source, such as through an outlet on the electrical component 20F, a pass-through plug on the power cord for the electrical component 20F. It should be understood that the battery charger 37 may be configured to operated and to charge a battery when disconnected and independent from the electrical component 20F.

It should also be understood that battery charger 37 is operable to support and charge batteries of varying lengths, sizes, and voltages. In the illustrated construction and with reference to FIG. 5, the slide-on battery 70 has a first dimension, such as an axial length, and another slide-on battery (shown in phantom in FIG. 5) has a second dimension, such as a second axial length, which is different than that of the first slide-on battery 70. The battery charger 37 is operable to receive and support both batteries and a variety of other batteries.

In addition, it should be understood that the battery charger 37 can receive and the electrical component 20F is usable with batteries having different battery chemistries (i.e., Lithium-based chemistries (Li, Li-ion, etc.), Nickel Metal Hydride (NiMH), Nickel Cadmium (NiCd), etc.). The electrical circuit 28F and the charging circuit portion 30 may include identification circuitry and structure necessary to identify the chemistry of the battery 70 to ensure proper charging and operation of the battery 70.

Further, it should be understood that in some constructions the electrical component 20F can receive a variety of different battery chargers 37 rather than a single battery charger. In such constructions, a broken or otherwise inoperable battery charger can be replaced with another battery charger so that the electrical component 20F is not left without its battery charging capability when the original battery charger is inoperable. Also, a battery charger having a different configuration can be connected to the electrical component 20 to accommodate batteries having different configurations.

Further, it should be understood that in some constructions the electrical component 20F can include a plurality of battery chargers for charging a plurality of batteries simultaneously. In such constructions, the housing 24F is configured to enable selective connection of the plurality of battery chargers thereto.

It should be understood that the electrical component 20F may be configured to receive, in place of the battery charger 37, a battery charger for another type of equipment, such as, for example, a cell phone.

Referring to FIGS. 34-40 and 48, the control portion 620 of the electrical component 20F controls the operation and operating mode(s) of the electrical component 20F and of the electrical circuit 28F. For example, the control portion 620 can control a radio mode, battery charging mode, a MP3 mode, a clock mode, etc. The control portion 620 includes adjustment knobs 402F for adjusting the volume and for tuning the radio. The control portion 620 also includes control buttons 404F for controlling other operations, such as pre-set radio station selection, equalization setting, etc. Preferably, the electrical component 20F includes a "PUNCH EQ" feature having several pre-set equalization settings. The "PUNCH EQ" button 404F is a color lit button using different colors (red, yellow, green) representing the different equalization setting and to indicate the current equalization setting.

The control portion 620 further includes a display portion 398F positioned on the front of the control portion 620. In the illustrated construction, the display portion 398F is a backlit LCD display. However, the display portion can be any appropriate type of display. The display portion is capable of displaying the status and operating condition of the electrical component 20F and of the electrical circuit 28F. For example, the display portion 398F displays the operating mode of the audio circuit portion 29F (i.e., AM, FM, AUX, MP3, etc.). If the audio circuit portion is operating in a radio mode, the display portion 398F displays the current station. If the charging circuit portion is charging a battery, the display portion 398F displays a charging symbol, such as, for example, a lightning bolt, the letters "CHRG", etc. If the audio circuit is operating a MP3 mode, the display portion 398F displays, for example, volume level, the current track selection and/or track title, elapsed time of current track, time remaining in current track, number of total tracks, play mode (i.e., random or continuous play), remaining memory, occupied memory, etc. The display portion 398F may also include a clock or other informational displays.

Figure 48:
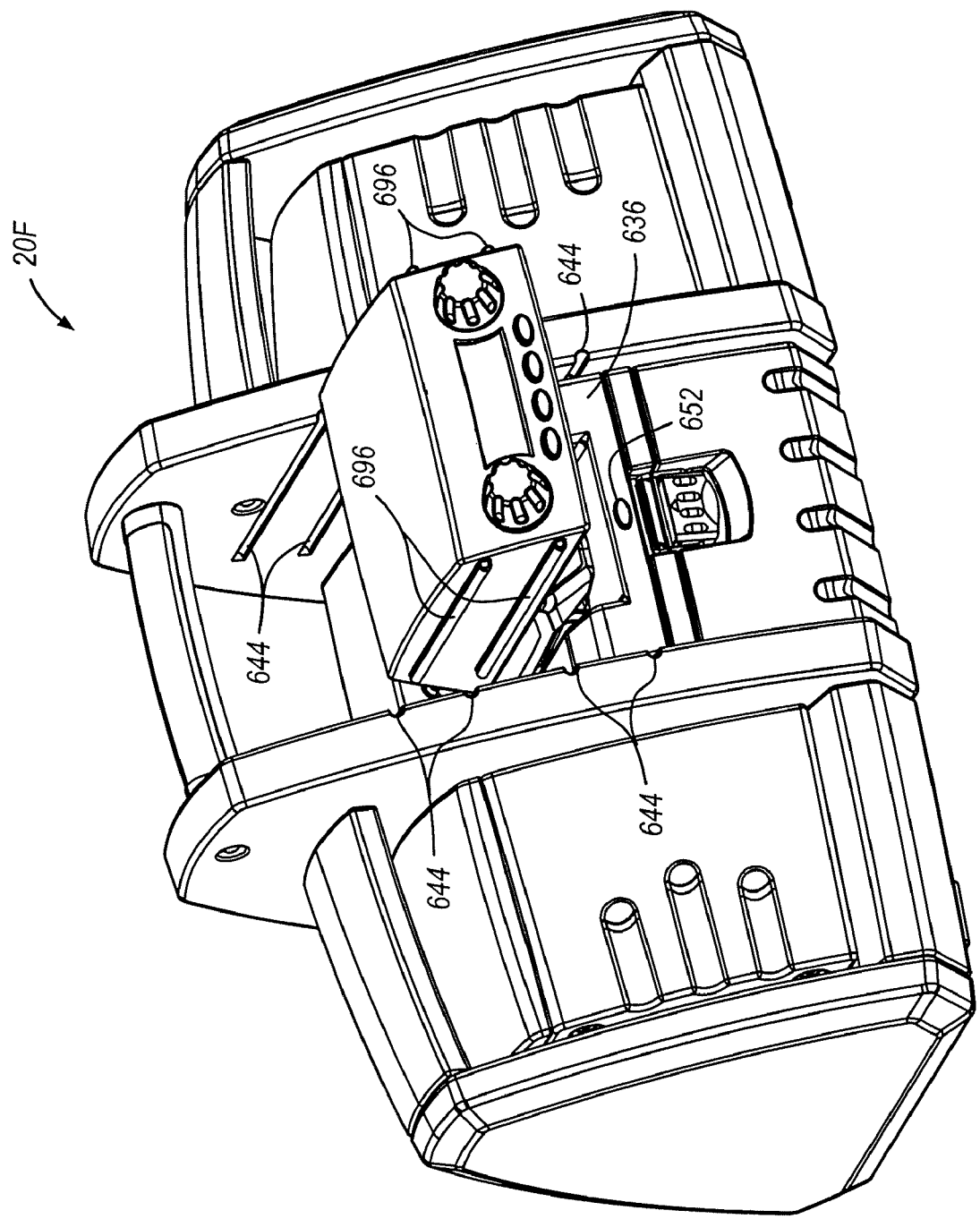
FIG. 48 is a front perspective view of the electrical component shown in FIG. 34, shown with a control portion extended outwardly from the electrical component.

With particular reference to FIG. 48, the control portion 620 may be selectively connectable to the central frame 624 of the housing 24F. In the illustrated construction, the control portion 620 includes a plurality of elongated projections 696 extending from sides of the control portion 620 that are receivable in the grooves 644 defined in the interior sides of the central frame 624. Reference is made to the above discussion regarding the structure, operation, and alternatives of the connectability of the battery charger 37 to the central frame 624. Connectability of the control portion 620 to the central frame 624 is similar to the structure, operation, and alternatives of the battery charger.

It should be understood that the battery charger 37 and the control portion 620 can be oriented differently with respect to each other within the central frame 624. For example, the battery charger 37 can be positioned above the control portion 620.

It should also be understood that the battery charger 37 and the control portion 620 are operable independently of each other, and, accordingly, the battery charger 37 and the control portion 620 can operate if the other is disconnected from the electrical component 20F.

It should be understood that, in some constructions, another electrical device, such as, for example, another audio component, may be substituted for the battery charger 37. It should also be understood that, in some constructions, another electrical device, such as, for example, another audio component, another control portion, another battery charger, may be substituted for the control portion 620.

Figure 49:
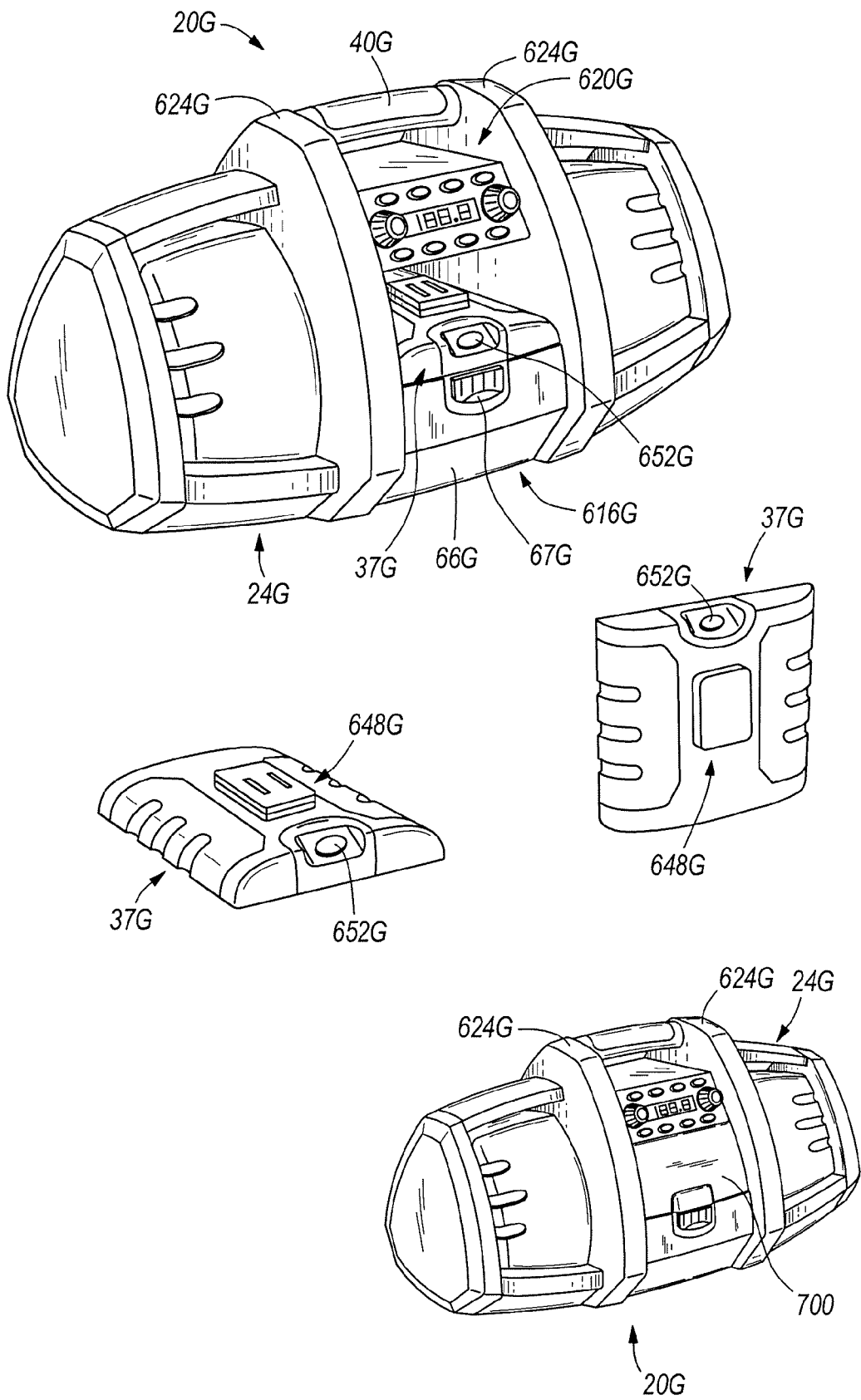
FIG. 49 is a plurality of front perspective views of an alternative construction of an electrical component.

An alternative construction of an electrical component 20G is illustrated in FIG. 49. Reference is made to the above discussion regarding the structure, operation, and alternatives of the electrical component 20 illustrated in FIGS. 1-48. Common elements are identified by the same reference numbers "G".

The electrical component 20G in this construction includes a selectively connectable battery charger 37G having a different configuration than the battery charger 37 of the electrical component 20F illustrated in FIGS. 34-48. The battery charger 37G in this construction is relatively thinner than the battery charger 37 of the electrical component 20F illustrated in FIGS. 34-48, however, this battery charger 37G has similar operations and alternatives to the battery charger 37 of the electrical component 20F illustrated in FIGS. 34-48. The electrical component 20G includes a cover plate 700 selectively connectable to the central frame 624G of the housing to cover the space occupiable by the battery charger 37F. The cover plate 700 can be connected to the central frame 624G when the battery charger 37G is both connected to and disconnected from the central frame 624G in order to cover the battery and the battery charger 37G or to cover the void left when the battery charger 37G is not connected, respectively.

It should be understood that the cover plate 700 can be used with any of the constructions of the electrical component 20 illustrated and described herein (both above and below) that include a space occupiable by a selectively connectable battery charger 37.

Figure 50:
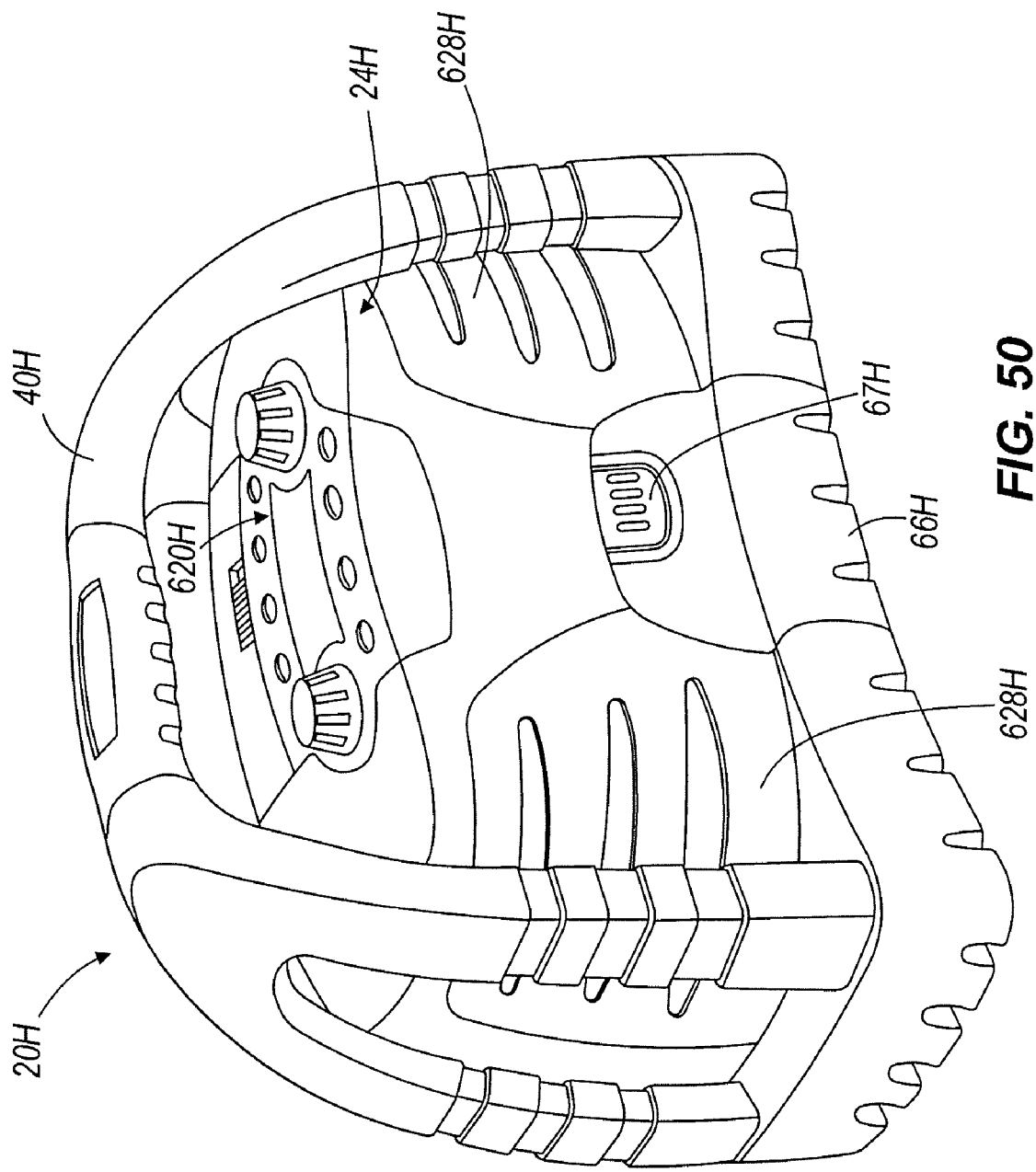
FIG. 50 is a front perspective view of another alternative construction of an electrical component.
Figure 51:
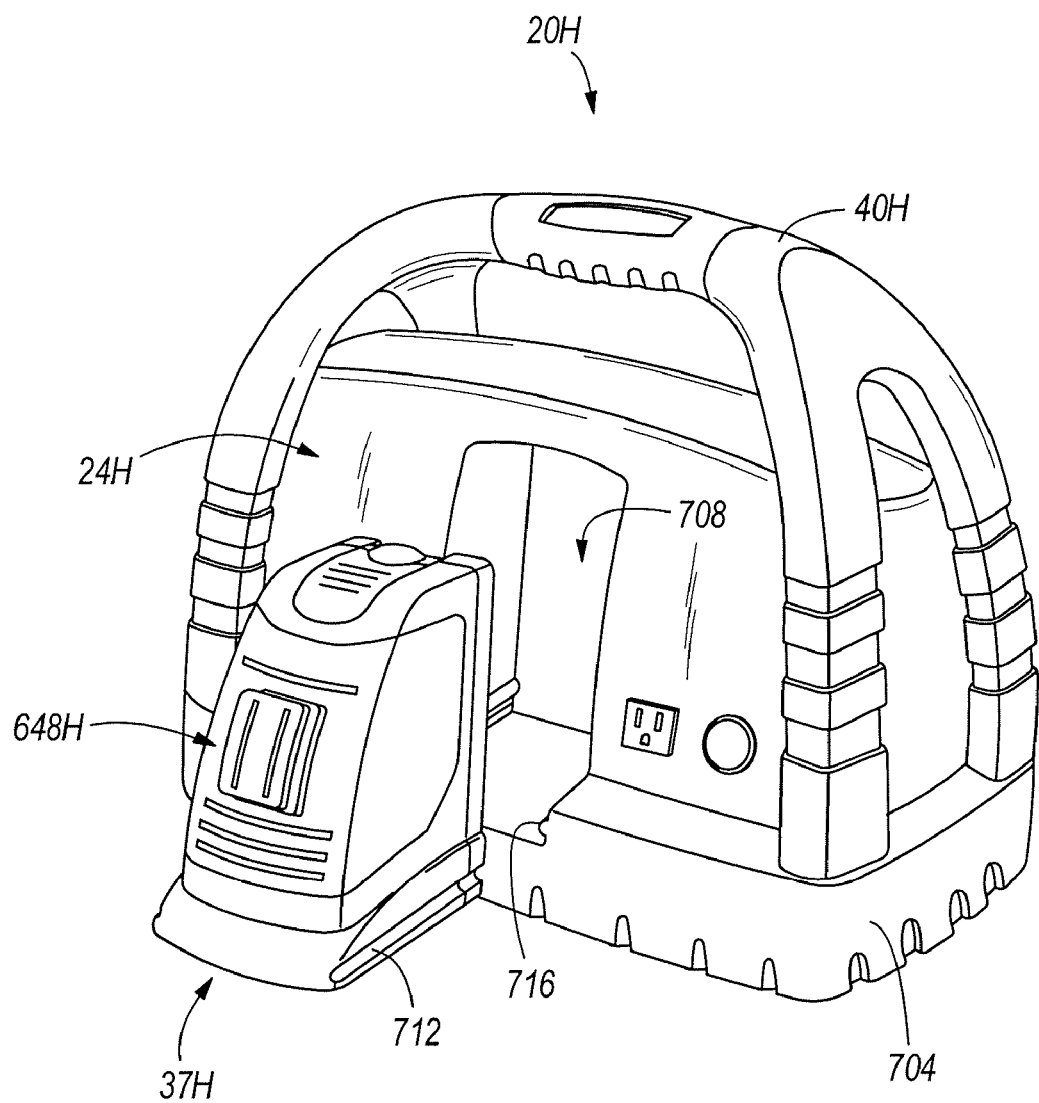
FIG. 51 is a rear perspective view of the electrical component shown in FIG. 50, shown with a battery charger removed.

An alternative construction of an electrical component 20H is illustrated in FIGS. 50 and 51. Reference is made to the above discussion regarding the structure, operation, and alternatives of the electrical component 20 illustrated in FIGS. 1-49. Common elements are identified by the same reference numbers "H".

The electrical component 20H includes a base 704, a housing 24H, and a handle 40H. The base 704 and handle 40H are designed to have impact absorbing characteristics which protect the electrical component 20H from impacts at a jobsite, such as from falling from a height or having another object impact the electrical component 20H, which might normally damage the elements of the electrical component 20H, such as, for example, the elements of the electrical circuit 28H, and/or create an electrical hazard in the electrical component 20H. For example, the base 704 or the handle 40H may be formed of energy/impact absorbing materials, such as, for example, high-density polyethylene (HDPE), and/or formed with energy/impact absorbing structures, such as, for example, bars, base edges, bumpers, bushings, ribs, honeycombs, energy-absorbing shapes, etc.

With particular reference to FIG. 51, a charger receptacle 708 is defined in the rear of the housing 24H and the base 704 for receiving a battery charger 37H. The battery charger 37H is selectively connectable to the electrical component 20H. In the illustrated construction, a recess 712 is defined in opposing sides of the battery charger 37H and a complementary projection 716 extends from each side of the charger receptacle 708. The battery charger 37H is inserted into the charger receptacle 708 by aligning the projections 716 with the recesses 712, inserting the projections 716 into the recess 712, and sliding the battery charger 37H along the projections 716. The battery charger 37H is inserted into the charger receptacle 708 until a rear surface of the battery charger 37H is substantially flush with the rear surface of the housing 24H and the base 704. One or both of the electrical component 20H and the battery charger 37H may include a locking member (not shown) for positively locking the battery charger 37H within the charger receptacle 708.

In the illustrated construction, the battery charger 37H includes a battery support portion 148H for supporting slide-on type power tool batteries. The support portion 148H has similar construction, operation, and alternatives to the slide-on type support portion 148 of the electrical component 20 illustrated in FIGS. 1-49.

It should be understood that the battery charger 37H can include battery support portions operable for supporting power tool batteries, such as, for example, tower power tool batteries, etc., other than slide-on type power tool batteries and have similar construction, operation, and alternatives to the battery support portions of the electrical component 20 illustrated in FIGS. 1-49 that have battery support portions for supporting power tool batteries other than slide-on power tool batteries.

It should also be understood that the battery charger 37H and charger receptacle 708 can be a variety of shapes and sizes as long as the battery charger 37H and charger receptacle 708 have a complementary shape and size.

It should be understood that, in some constructions, the receptacle 708 may be configured to receive and store other equipment when a charger 37H is not supported in the receptacle 708.

Figure 52:
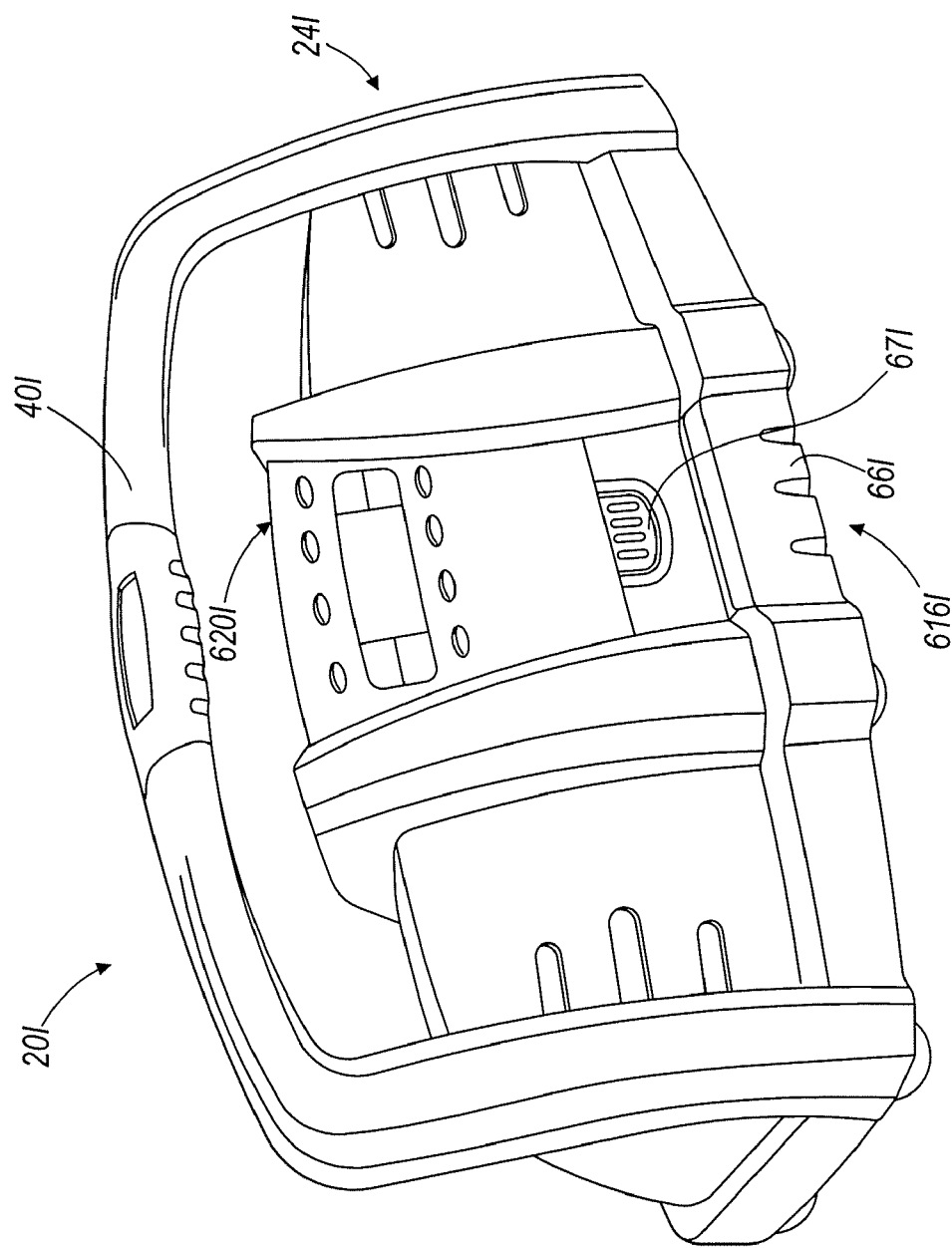
FIG. 52 is a front perspective view of yet another alternative construction of an electrical component.
Figure 53:
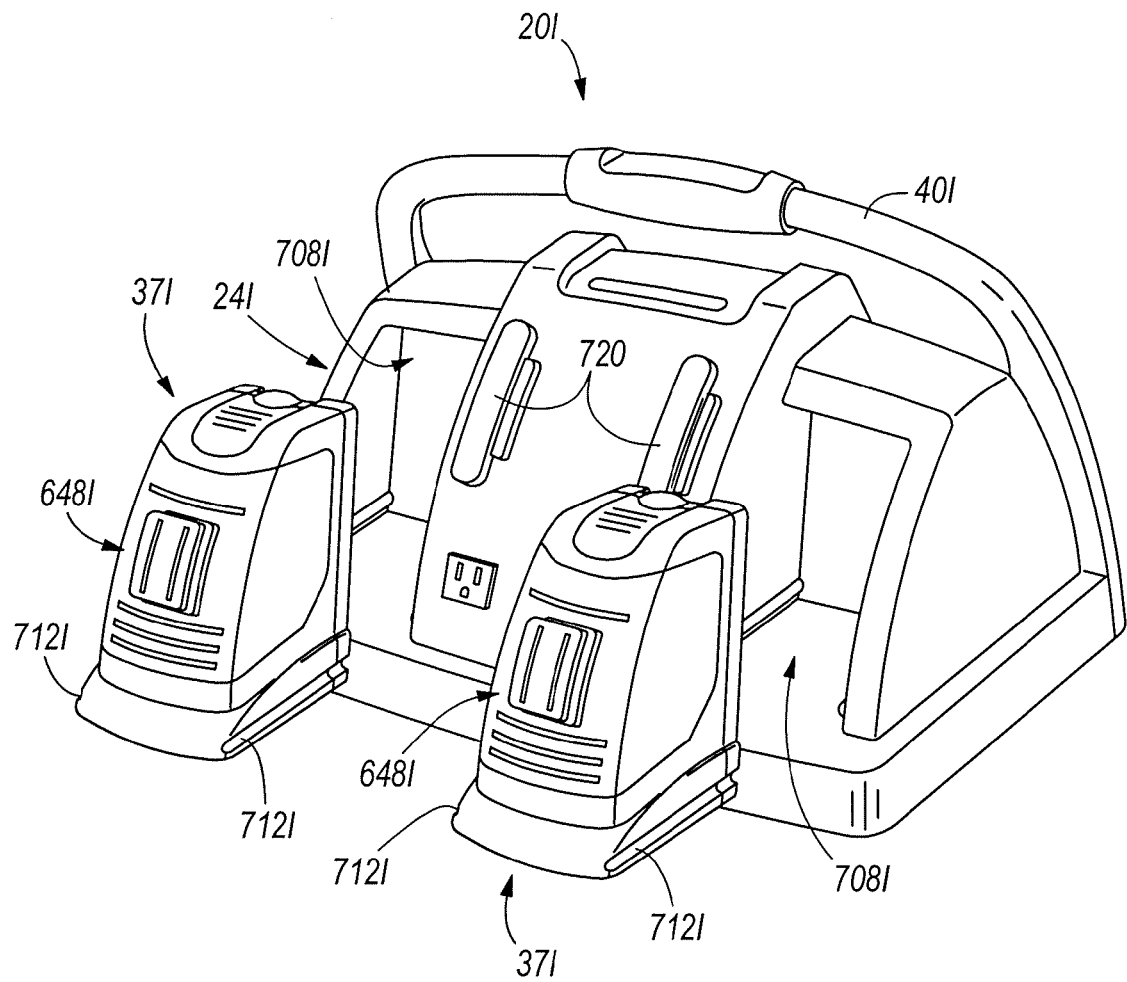
FIG. 53 is a rear perspective view of the electrical component shown in FIG. 52, shown with two battery chargers removed.

Another alternative construction of an electrical component 20I is illustrated in FIGS. 52-53. Reference is made to the above discussion regarding the structure, operation, and alternatives of the electrical component 20 illustrated in FIGS. 1-51. Common elements are identified by the same reference numbers "I".

The electrical component 20I includes a pair of bumpers 720 extending from the rear surface of the housing 24I and are designed to have impact absorbing characteristics which protect the electrical component 20I from impacts at a jobsite. The electrical component 20I also defines two charger receptacles 708I in the rear surface of the housing 24I for receiving the pair of battery chargers 37I. The battery chargers 37I and charger receptacles 708I in this construction are similar to the battery charger 37H and charger receptacle 708 of the electrical component 20H illustrated in FIGS. 50 and 51. Accordingly, reference is made to the discussion above regarding structure, operation, and alternatives of the electrical component 20H illustrated in FIGS. 50 and 51.

It should be understood that, in some constructions, another electrical device, such as, for example, another audio component, may be substituted for one or both of the battery chargers 37I.

It should be understood that, in some constructions, each receptacle 708I may be configured to receive and store other equipment when a charger 37I is not supported in the receptacle 708I.

It should be understood that any of the constructions of the electrical component 20 discussed herein and illustrated in any of the figures can include any number of battery chargers 37 for charging a corresponding number of batteries.

Figure 54:
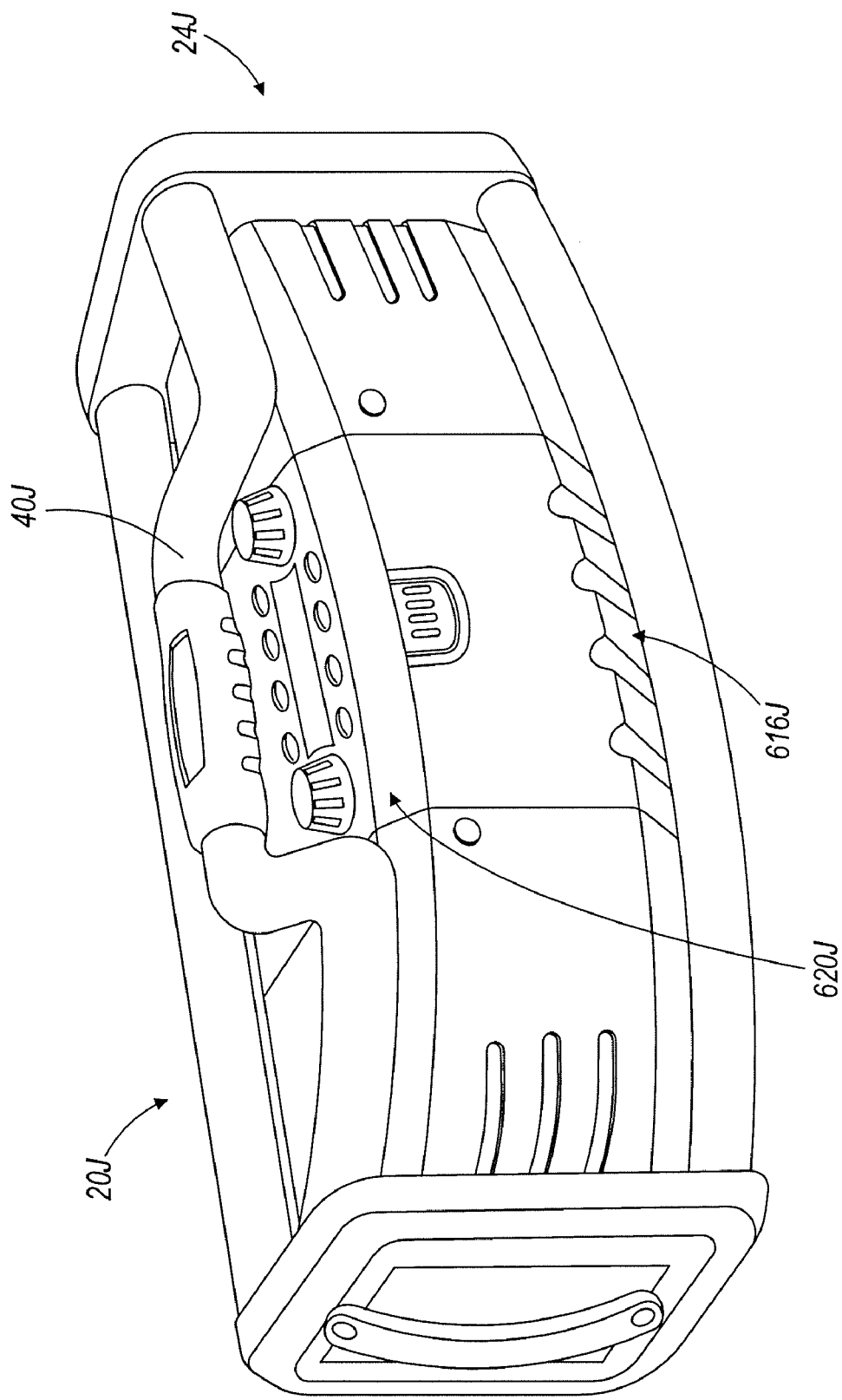
FIG. 54 is a front perspective view of another alternative construction of an electrical component.
Figure 55:
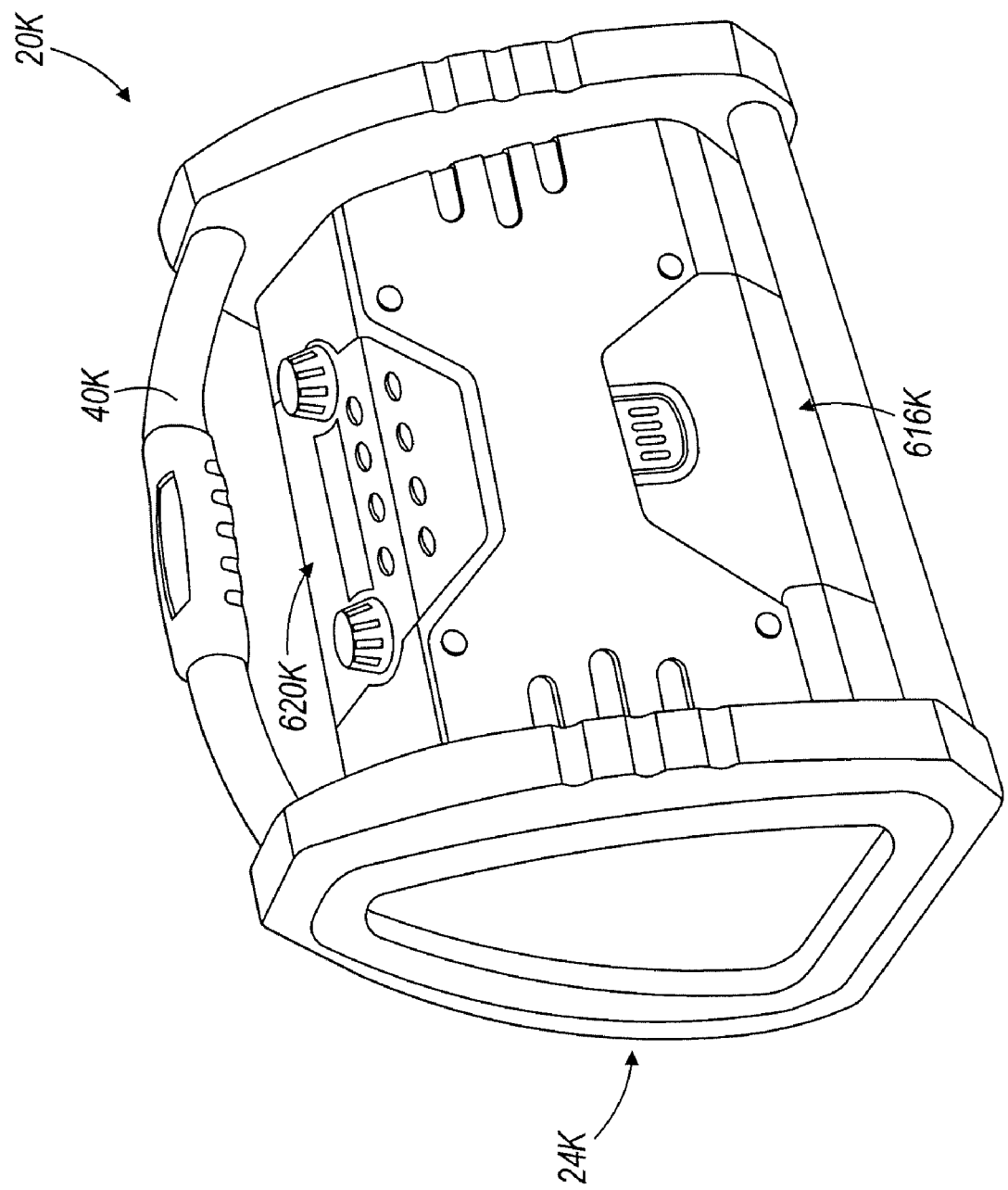
FIG. 55 is a front perspective view of yet another alternative construction of an electrical component.

Two other alternative constructions of an electrical component 20J, 20K are illustrated in FIGS. 54 and 55, respectively. Reference is made to the above discussion regarding the structure, operation, and alternatives of the electrical component 20 illustrated in FIGS. 1-53. Common elements are identified by the same reference numbers "J" and "K", respectively. The electrical components 20J and 20K may include one or more battery chargers (not shown) similar to the battery chargers 37, 37G, 37H and 37I, as described above.

Figure 56:
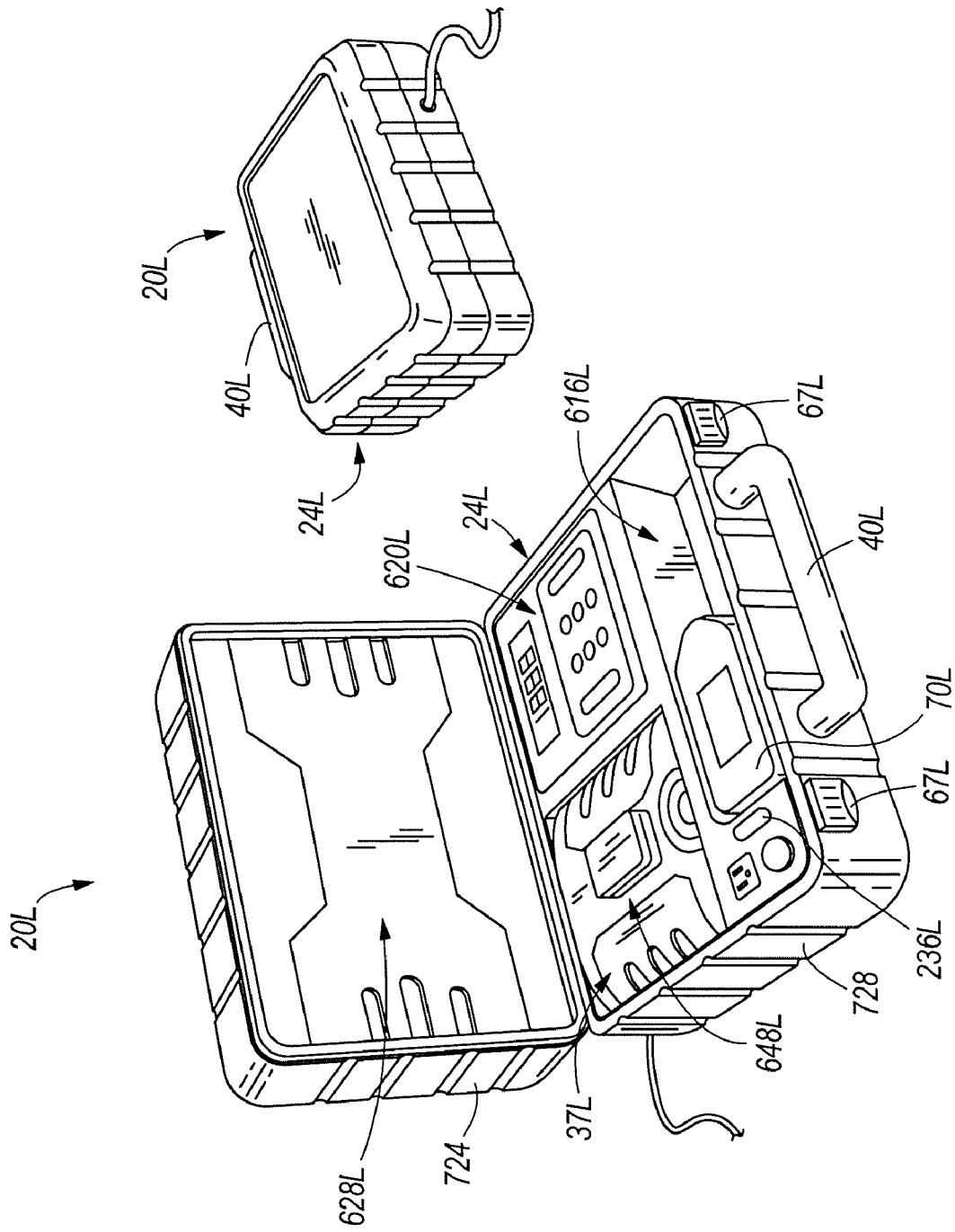
FIG. 56 is a pair of front perspective views of another alternative construction of an electrical component, shown in an open condition and in a closed condition.

Another alternative construction of an electrical component 20L is illustrated in FIG. 56. Reference is made to the above discussion regarding the structure, operation, and alternatives of the electrical component 20 illustrated in FIGS. 1-55. Common elements are identified by the same reference numbers "L".

The electrical component 20L includes a housing 24L having a first portion 724 and a second portion 728 pivotally connected to one another generally in the form of a briefcase, suitcase, tool box, etc. In the illustrated construction, the first portion 724 and the second portion 728 are designed to have impact absorbing characteristics which protect the electrical component 20L from impacts at a jobsite, such as from falling from a height or having another object impact the electrical component 20L, which might normally damage the elements of the electrical component 20L, such as, for example, the elements of the electrical circuit 28L, and/or create an electrical hazard in the electrical component 20L. For example, the first portion 724 and the second portion 728 may be formed of energy/impact absorbing materials, such as, for example, high-density polyethylene (HDPE), and/or formed with energy/impact absorbing structures, such as, for example, bars, base edges, bumpers, bushings, ribs, honeycombs, energy-absorbing shapes, etc.

The electrical component 20L has an open position (the left perspective view in FIG. 56) and a closed position (the right perspective view in FIG. 56). The speakers 628L are supported in the first portion 724 of the housing 24L, and the battery connection assembly 616L, the battery charger 37L, and the control portion 620L are supported in the second portion 728 of the housing 24L. In the illustrated construction, the receptacle 44L of the battery connection assembly 616L is large enough to support multiple batteries 70L. In some constructions, only one of the batteries 70L is electrically connected to the electrical component 20L by the electrical connector assembly 144L. In other constructions, multiple batteries 70L are connected to the electrical component 20L by multiple electrical connector assemblies 144L. In such constructions, an actuator 236L is operable to disconnect either one or both of the batteries 70L from the electrical connector assemblies 144L. The electrical component 20L may include additional receptacles (not shown) to support and retain other equipment, such as, for example, a power tool, a power tool accessory (e.g., drill bits, saw blades, lights, etc.), additional audio components (e.g., an auxiliary audio device connectable with the audio circuit), electronic devices (e.g., a cell phone, a PDA, etc.), etc.

In the illustrated construction, the battery charger 37L is selectively connectable to the housing 24L in a manner similar to the battery charger 37 of the electrical component 20 illustrated in FIGS. 1-55. Reference is made to the above discussion regarding the structure, operation, and alternatives of the battery charger 37 of the electrical component 20 illustrated in FIGS. 1-55.

Also, in the illustrated construction, a pair of locking or latching members 67L are operable to lock the first portion 724 and the second portion 728 together, thereby locking the electrical component 20L in the closed position. Any number of latching members 67L can be used to lock the first portion 724 to the second portion 728.

Although particular constructions of the present invention have been shown and described, other alternative constructions will be apparent to those skilled in the art and are within the intended scope of the present invention. Thus, the present invention is to be limited only by the claims.

We claim:

1. A combination comprising:
   an electrical component including
     a housing defining a receptacle,
     an electrical component connector assembly located within the receptacle, and
     an electrical circuit supported by the housing; and
   a battery charger removably connectable to the electrical component, the battery charger including a battery charger housing, wherein the battery charger housing is at least partially positioned within the receptacle when the battery charger is connected to the electrical component, a charging circuit supported by the battery charger housing and electrically connectable to a battery and to the power source, the charging circuit operable to charge the battery, and a battery charger connector assembly electrically connectable to the electrical component connector assembly.

2. The combination of claim 1, further comprising a locking mechanism for selectively locking the battery charger to the electrical component.

3. The combination of claim 2, wherein the locking mechanism includes an actuator manipulatable by a user to unlock the battery charger from the electrical component.

4. The combination of claim 1, wherein the battery charger housing is completely positioned within the receptacle when the battery charger is connected to the electrical component.

5. The combination of claim 1, wherein the battery charger connector assembly supports the battery.

6. The combination of claim 1, wherein one of the electrical component and the battery charger includes a projection and the other of the electrical component and the battery charger includes a groove, the projection being positionable and movable within the groove to guide the battery charger into and out of the receptacle.

7. The combination of claim 1, wherein the receptacle is a first receptacle and the battery charger is a first battery charger, the electrical component housing further defining a second receptacle, and the combination further comprising:

a second battery charger removably connectable to the electrical component and at least partially positioned within the second receptacle when connected to the electrical component, the second battery charger including a second battery charger housing, and a second charging circuit supported by the second battery charger housing and electrically connectable to a battery and to the power source, the second charging circuit operable to charge the battery.

8. A combination comprising:

a radio including a radio housing defining a receptacle, and an audio circuit supported by the radio housing, the audio circuit operable to produce an audio signal and being electrically connectable to a power source; and a battery charger removably connectable to the radio, the battery charger including a battery charger housing, wherein the battery charger housing is at least partially positioned within the receptacle when the battery charger is connected to the radio, and a charging circuit supported by the battery charger housing and electrically connectable to a battery and to the power source, the charging circuit operable to charge the battery.

9. The combination of claim 8, further comprising a locking mechanism for selectively locking the battery charger to the radio.

10. The combination of claim 9, wherein the locking mechanism includes an actuator manipulatable by a user to unlock the battery charger from the radio.

11. The combination of claim 8, wherein the battery charger housing is completely positioned within the receptacle when the battery charger is connected to the radio.

12. The combination of claim 8, wherein the battery charger includes an electrical connector assembly for supporting the battery and for electrically connecting the battery to the charging circuit.

13. The combination of claim 8, wherein one of the radio and the battery charger includes a projection and the other of the radio and the battery charger includes a groove, the projection being positionable and movable within the groove to guide the battery charger into and out of the receptacle.

14. The combination of claim 8, wherein the radio further includes a radio connector assembly and the battery charger further includes a battery charger connector assembly, wherein the battery charger connector assembly engages the radio connector assembly to electrically connect the battery charger to the radio.

15. The combination of claim 8, wherein the receptacle is a first receptacle and the battery charger is a first battery charger, the radio housing further defining a second receptacle, and the combination further comprising:

a second battery charger removably connectable to the radio and at least partially positioned within the second receptacle when connected to the radio, the second battery charger including a second battery charger housing, and a second charging circuit supported by the second battery charger housing and electrically connectable to a battery and to the power source, the second charging circuit operable to charge the battery.

* * * * *